(12) United States Patent
Burr et al.

(10) Patent No.: US 9,927,902 B2
(45) Date of Patent: Mar. 27, 2018

(54) METHOD, APPARATUS, AND SYSTEM FOR DISTRIBUTED PRE-PROCESSING OF TOUCH DATA AND DISPLAY REGION CONTROL

(71) Applicant: Intel Corporation, Santa Clara, CA (US)

(72) Inventors: Jeremy Burr, Portland, OR (US); Gokul Subramaniam, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/126,906

(22) PCT Filed: Sep. 19, 2013

(86) PCT No.: PCT/US2013/060506
§ 371 (c)(1),
(2) Date: Dec. 17, 2013

(87) PCT Pub. No.: WO2014/107197
PCT Pub. Date: Jul. 10, 2014

(65) Prior Publication Data
US 2014/0327630 A1 Nov. 6, 2014

Related U.S. Application Data

(60) Provisional application No. 61/749,386, filed on Jan. 6, 2013.

(51) Int. Cl.
*G06F 3/041* (2006.01)
*G06F 3/0488* (2013.01)
(Continued)

(52) U.S. Cl.
CPC .......... *G06F 3/0416* (2013.01); *G06F 1/3265* (2013.01); *G06F 3/016* (2013.01);
(Continued)

(58) Field of Classification Search
CPC ...... G06F 3/0488; G06F 3/016; G06F 3/0416; G06F 3/0418; G06F 1/3265; G09G 5/006; G09G 2320/08
See application file for complete search history.

(56) References Cited

U.S. PATENT DOCUMENTS 8,327,296 B2 * 12/2012 Arscott ................. G06F 3/0416
715/769
8,370,762 B2 * 2/2013 Abbott ................ G06F 3/04817
345/173
(Continued)

FOREIGN PATENT DOCUMENTS

CN 101203821 6/2008
CN 101395562 3/2009
(Continued)

OTHER PUBLICATIONS

Taiwan Patent Office, Taiwanese Office Action dated Sep. 3, 2015, in Taiwanese Patent Application No. 103100187.
(Continued)

*Primary Examiner* — Sejoon Ahn
(74) *Attorney, Agent, or Firm* — Trop, Pruner & Hu, P.C.

(57) ABSTRACT

In an embodiment, a system includes a peripheral controller to interface with a touch controller and to communicate mapping information to identify primary and secondary regions of a display. The touch controller includes logic to filter touch data when it is for a touch within the secondary region and to communicate the touch data to the peripheral controller when it is for the user touch within the primary region. In an embodiment, display logic may determine when and how to use a display bezel area for displaying content, via a combination of criteria. Decision vectors (such as sensors, device configuration, content type, primary display activity) may enable/disable display areas for rendering, with independent control of each side of the bezel. Content can be rendered based on primary display content, environment, other devices and user preferences. Other embodiments are described and claimed.

15 Claims, 33 Drawing Sheets

(51) Int. Cl.
  *G06F 3/01* (2006.01)
  *G06F 1/32* (2006.01)
  *G09G 5/00* (2006.01)
(52) U.S. Cl.
  CPC .......... *G06F 3/0418* (2013.01); *G06F 3/0488* (2013.01); *G09G 5/006* (2013.01); *G09G 2320/08* (2013.01)

(56) References Cited

U.S. PATENT DOCUMENTS

| | | | |
|---|---|---|---|
| 8,552,999 B2* | 10/2013 | Dale | G06F 3/04886 345/173 |
| 8,560,975 B2* | 10/2013 | Beaver | G06F 3/0488 345/156 |
| 2005/0052434 A1* | 3/2005 | Kolmykov-Zotov | G06F 3/038 345/179 |
| 2005/0185364 A1* | 8/2005 | Bell | G06F 3/0488 361/679.41 |
| 2006/0034042 A1* | 2/2006 | Hisano | G06F 1/1616 361/679.04 |
| 2006/0197753 A1* | 9/2006 | Hotelling | G06F 1/1626 345/173 |
| 2007/0046618 A1* | 3/2007 | Imai | G06F 1/3265 345/102 |
| 2007/0113199 A1 | 5/2007 | Lausterer et al. | |
| 2007/0152977 A1* | 7/2007 | Ng | G06F 3/03547 345/173 |
| 2007/0157089 A1 | 7/2007 | Van Os et al. | |
| 2008/0062150 A1* | 3/2008 | Lee | G06F 3/0416 345/175 |
| 2008/0129699 A1* | 6/2008 | Cho | H04M 1/0208 345/168 |
| 2009/0138827 A1* | 5/2009 | Van Os | G06F 3/04817 715/846 |
| 2009/0174679 A1* | 7/2009 | Westerman | G06F 3/03547 345/173 |
| 2009/0228825 A1* | 9/2009 | Van Os | G06F 3/0488 715/780 |
| 2009/0278812 A1* | 11/2009 | Yasutake | G06F 3/04815 345/173 |
| 2009/0303187 A1* | 12/2009 | Pallakoff | G06F 3/04886 345/169 |
| 2010/0029327 A1 | 2/2010 | Jee | |
| 2010/0042950 A1* | 2/2010 | Hsieh | G06F 3/04886 715/835 |
| 2010/0053164 A1* | 3/2010 | Imai | G06F 3/011 345/427 |
| 2010/0103074 A1* | 4/2010 | Chu | G06F 3/1431 345/1.3 |
| 2010/0157543 A1 | 6/2010 | Shohet et al. | |
| 2010/0245286 A1* | 9/2010 | Parker | G06F 3/0416 345/174 |
| 2010/0273533 A1 | 10/2010 | Cho | |
| 2010/0333006 A1* | 12/2010 | Ostergard | G02B 26/005 715/768 |
| 2011/0047459 A1* | 2/2011 | Van Der Westhuizen | G06F 1/1692 715/702 |
| 2011/0107226 A1 | 5/2011 | Heo | |
| 2011/0128244 A1 | 6/2011 | Cho et al. | |
| 2011/0268218 A1 | 11/2011 | Kang et al. | |
| 2012/0026376 A1* | 2/2012 | Goran | H04N 9/3173 348/333.1 |
| 2012/0032945 A1* | 2/2012 | Dare | G06F 3/0481 345/418 |
| 2012/0038571 A1 | 2/2012 | Susani | |
| 2012/0121208 A1 | 5/2012 | Moriya et al. | |
| 2012/0154336 A1* | 6/2012 | Lee | G06F 1/3259 345/175 |
| 2012/0191542 A1* | 7/2012 | Nurmi | A61B 5/16 705/14.54 |
| 2013/0190046 A1* | 7/2013 | Noh | H04M 1/72527 455/556.1 |
| 2013/0232353 A1* | 9/2013 | Belesiu | G06F 1/1618 713/320 |
| 2013/0328797 A1* | 12/2013 | Al-Dahle | G06F 3/0416 345/173 |
| 2014/0043247 A1* | 2/2014 | Singh | G06F 1/3218 345/173 |
| 2014/0051482 A1 | 2/2014 | Makiguchi | |
| 2014/0184526 A1* | 7/2014 | Cho | G06F 3/041 345/173 |
| 2014/0348434 A1* | 11/2014 | Xu | G06K 9/0055 382/228 |

FOREIGN PATENT DOCUMENTS

| | | |
|---|---|---|
| CN | 101482785 | 7/2009 |
| CN | 101640712 | 2/2010 |
| CN | 101667098 | 3/2010 |
| CN | 102054023 | 5/2011 |
| CN | 102238280 | 11/2011 |
| JP | 2005295399 | 10/2005 |
| JP | 2012103956 | 5/2012 |
| JP | 2012513169 | 6/2012 |
| JP | 2012234386 | 11/2012 |
| KR | 10-2006-0123871 | 3/2007 |
| KR | 10-2010-004216 | 4/2010 |
| KR | 10-2010-007531 | 7/2010 |
| KR | 10-2012-004279 | 5/2012 |
| KR | 10-2012-005803 | 6/2012 |
| TW | 201133325 | 10/2011 |
| TW | 201351227 | 12/2013 |
| WO | 2006094308 | 9/2006 |

OTHER PUBLICATIONS

International Searching Authority, "Notification of Transmittal of the International Search Report and the Written Opinion of the International Searching Authority," dated Jan. 21, 2014, in International application No. PCT/US2013/060506.
Korean Intellectual Property Office, Notice of Preliminary Rejection dated Jan. 20, 2016 in Korean Patent Application No. 10-2014-7027105. (Translation Redacted).
Japan Patent Office, Japanese Notice of Reason for Rejection dated Oct. 20, 2015 in Japanese Patent Application No. 2015-503692.
Korean Intellectual Property Office, Office Action dated Sep. 21, 2016 in Korean Patent Application No. 10-2014-7027105.
State Intellectual Property Office of the People's Republic of China, Office Action dated Dec. 2, 2016 in Chinese Patent Application No. 201380018727.6.
Korean Intellectual Property Office, Office Action dated Jul. 18, 2016 in Korean Patent Application No. 10-2014-7027105.
State Intellectual Property Office of The People's Republic of China, Second Office Action dated Aug. 2, 2017, in Chinese Patent Application No. 201380018727.6.

* cited by examiner

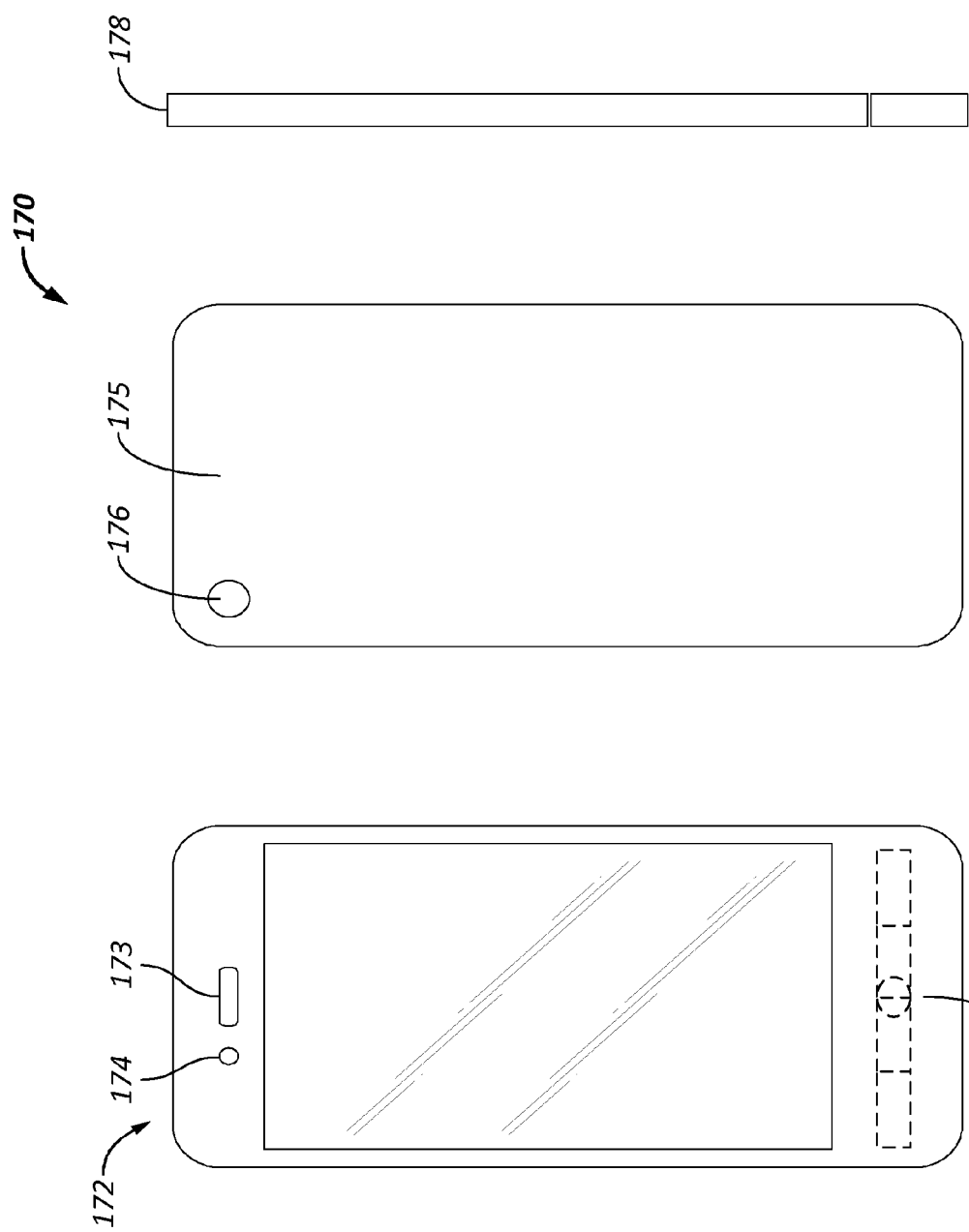

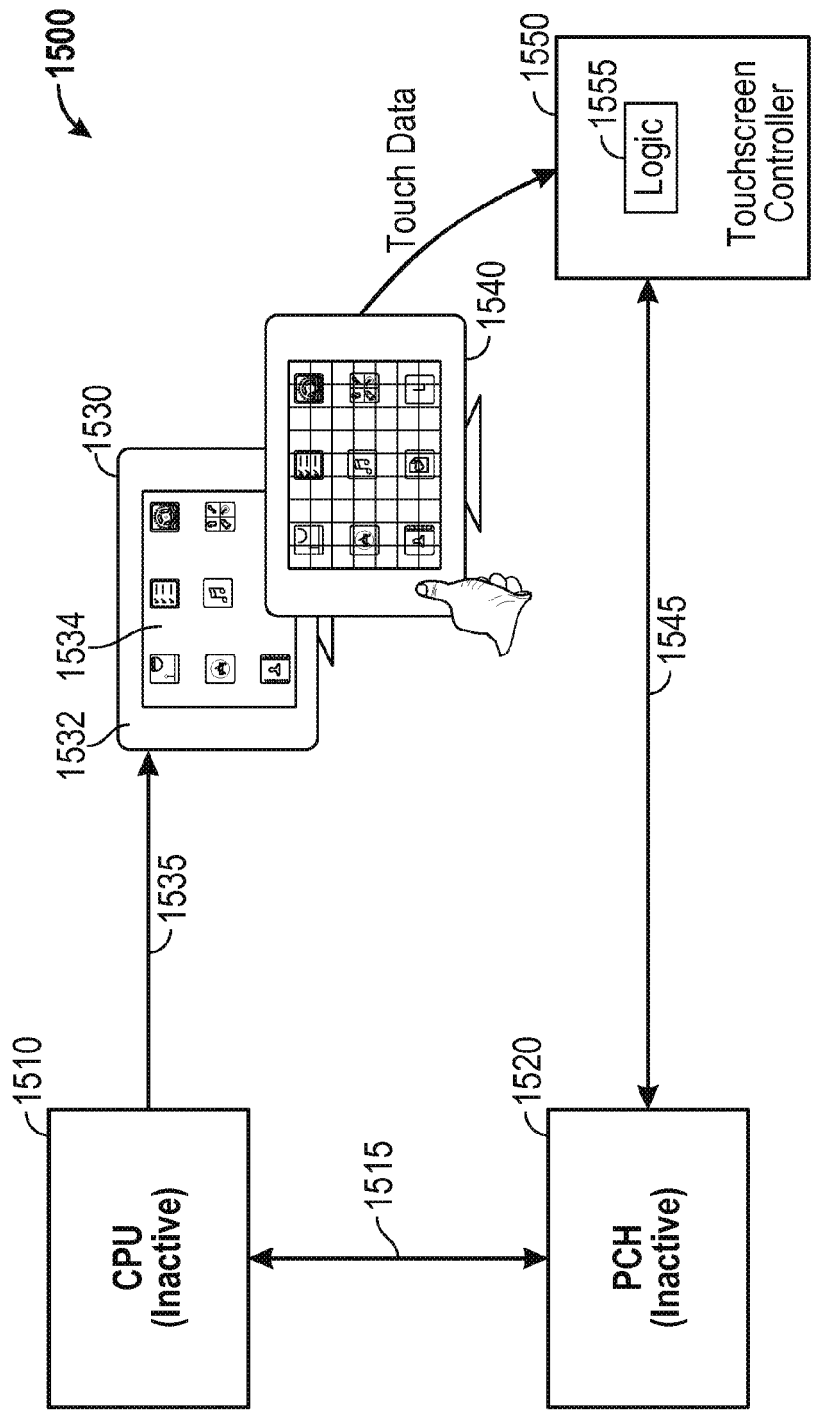

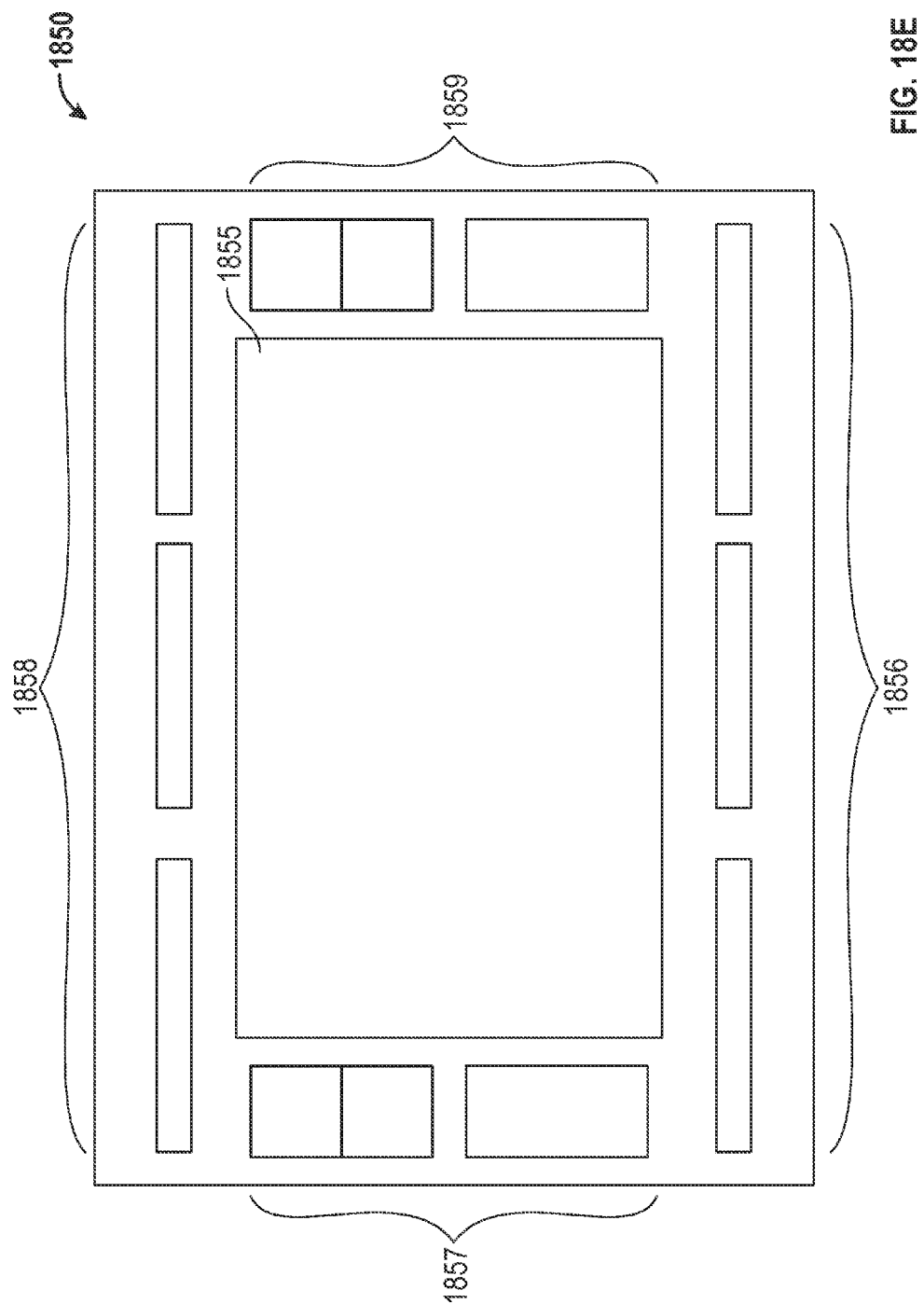

METHOD, APPARATUS, AND SYSTEM FOR DISTRIBUTED PRE-PROCESSING OF TOUCH DATA AND DISPLAY REGION CONTROL

This application claims the benefit of U.S. Provisional Application No. 61/749,386, filed on Jan. 6, 2013.

TECHNICAL FIELD

This disclosure pertains to computing systems, and in particular to controlling display content and power consumption of the computing device.

BACKGROUND

As technology advances, users become accustomed to having greater amounts of features and functionality in smaller packages. This trend dominates consumer electronics, where users seek out the latest in small, lightweight form factors for computing and communication, with many devices converging into a single system having computation and communication capabilities. Nevertheless current systems have drawbacks or tradeoffs with regard to their capabilities, form factors or both.

Many current systems are configured to receive user input by way of a touch mechanism. Some of these mechanisms are relatively primitive and do not effectively receive accurate touch information, requiring significant processing. Typically, user touch processing is performed in a processor of a system such as a central processing unit (CPU). Such processing thus consumes resources that could otherwise be devoted to other tasks.

Another issue with regard to a variety of form factor devices is that a display configuration is typically fixed, or if adjustable, the configuration is user controlled by a user. Such control prevents flexibility when a given device is used in a variety of different form factor modes and/or contexts. Furthermore, requiring a user to re-configure a display mode for a variety of different contexts increases complexity and user frustration. Also, a bezel area in current clamshell and tablet client form factors are not used for display rendering.

BRIEF DESCRIPTION OF THE DRAWINGS

FIG. 1H illustrates another embodiment of a computing system.

FIG. 15A is a block diagram of a portion of a system illustrating invalid touch region handling in accordance with an embodiment of the present invention.

FIGS. 18A-18E are graphical illustrations of dynamic control of content rendering in different regions of a display in accordance with various embodiments.

DETAILED DESCRIPTION

Figure 1A:
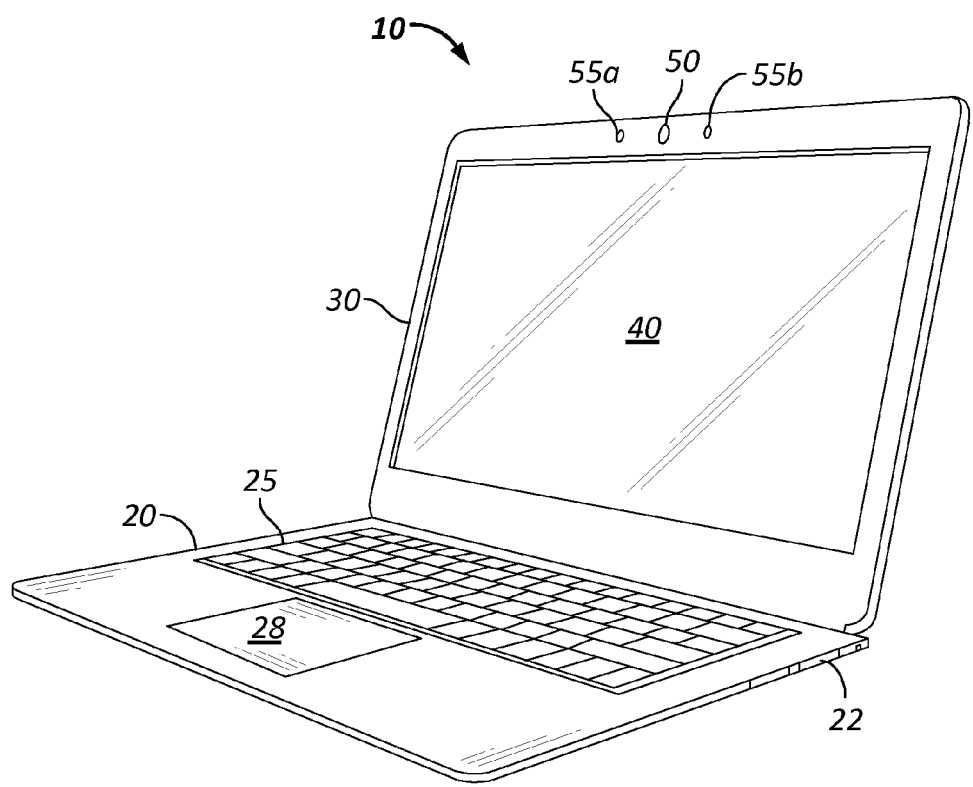
FIG. 1A illustrates one embodiment of a computing system.

In the following description, numerous specific details are set forth, such as examples of specific types of processors and system configurations, specific hardware structures, specific architectural and micro architectural details, specific register configurations, specific Ultrabook™ characteristics, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabook™ and may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught herein. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

Furthermore, although the following embodiments are sometimes described with reference to a processor, other embodiments are applicable to other types of integrated circuits and logic devices. Similar techniques and teachings of embodiments of the present invention may be applied to other types of circuits or semiconductor devices that benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and may be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

And even though some of the examples below describe instruction handling and distribution in the context of execution units and logic circuits, other embodiments of the present invention may be accomplished by way of data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions may be used to cause a general-purpose or special-purpose processor that is programmed with the instructions to perform methods of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, embodiments of methods of the present invention might be performed by specific hardware components that contain fixed-function logic for performing the steps, or by any combination of programmed computer components and fixed-function hardware components.

The method and apparatus described herein are primarily discussed below in reference to an ultrathin and/or ultraportable notebook/laptop, such as an Ultrabook™. Yet as stated above, the apparatus' and methods described herein are not so limited, as they may be implemented in conjunction with any integrated circuit device, electronic device, or computing system.

Referring now to FIG. 1A, an illustration of an embodiment of a computing device/system is illustrated. Various commercial implementations of system 10 may be provided. As one example, system 10 corresponds to an Ultrabook™, an Apple® MacBook Air, an Acer® Aspire, an LG® Xnote, a Dell® Inspiron, a Dell® XPS, an NEC® LaVie, an MSI® S20, an Asus® Transformer, a Sony® VAIO, an HP® EliteBook, HP Folio, a Toshiba® Protege, an Asus® Zenbook, an Asus® TaiChi, a Lenovo® Ideapad, a Lenovo® Yoga™, another ultralight and thin computing device, or any known and/or available ultralight, ultrathin, and/or ultraportable computing platform. As a first example, an ultraportable computing device includes any thin and/or light device capable of performing computing tasks (e.g. user input/output, execution of instruction/code, or network connection, etc.), such as a thin and/or light notebook, laptop, e-reader, tablet, and hybrid thereof (e.g. a notebook that is convertible into a tablet, e-reader, etc.). However, an ultraportable computing device or system is not limited to the examples provided above. In fact, as the world of computing becomes more compact and efficient, what is currently considered thin, light, and portable may later be interpreted as large or heavy. Therefore, in one embodiment, thin and light is viewed from the perspective of the current market or known future market for small computing devices. Alternatively, thin and light may be viewed at the time any interpretation of this disclosure is being made.

For example, in one embodiment an Ultrabook™ includes one or more of the following characteristics: (1) thinner than 18 mm for displays less than 14 inches, thinner than 21 mm for 14 inches and larger displays, and thinner than 23 mm for hybrid or convertible versions; (2) wake in less than a specified time, e.g. any range of 0.1-7 seconds from hibernation, such as an Advanced Configuration and Power Interface (ACPI) specification (see, Advanced Configuration and Power Interface Specification, revision 3.0b, Oct. 10, 2006) power state S4-S8; screen display to be switched on within 3 seconds of activating the power on button; at least 7 days standby battery life with Always Fresh Data; minimum of any range within 5-24 hours of battery life as measured by a common industry tool; one or more touch screen displays; include specific hardware, software and/or firmware (e.g., Intel® Management Engine, Intel® Anti-Theft Technology, Intel® Identify Protection Technology, Intel® Smart Connect Technology, etc.); include a specific type of storage or hard drive (e.g., a solid state drive and/or a drive with a minimum transfer rate of any amount within the range of 80-1000 MB/s and any minimum size within the range of 16 GB to 10 TB.

In one embodiment, one or more of the illustrated characteristics are part of an Ultrabook™ definition. Note that these characteristics are purely illustrative based on the current market view. And as aforementioned the embodiments of Ultrabooks™ may similarly adapt to future market conditions, which potentially redefine the definition of an Ultrabook™ (i.e., the characteristics and ranges therefore may be reduced (or increased depending on the metric) based on the changing computing ecosystem).

With reference to FIG. 1A, system 10, in one embodiment, includes a base portion 20 which may be configured via a lightweight chassis. As one example, the base portion includes substantially all of the electronics circuitry of the system; however, this is not required as other components may be placed in different section of system 10 (e.g., in the display 40, lid portion 30, or other known section of an ultrathin, ultralight computing device). For user interfaces, a keyboard 25 and a touchpad 28 are provided in base portion 20. Yet, any known device for providing input to a computer system or computing device may be utilized. For example, the sensors described herein may be utilized in conjunction with (or in place of) a keyboard, mouse, etc. to receive input from a user and perform computing tasks. In addition, various ports for receiving peripheral devices, such as universal serial bus (USB) ports (including a USB 3.0 port), a Thunderbolt™ port, video ports (e.g. a micro high definition media interface (HDMI) or mini video graphics adapter (VGA), memory card ports such as a SD card port, and audio jack, among others) may be present, generally indicated at location 22 on a side of the chassis (in other embodiments user-accessible ports may be present on the opposing chassis side or other surface of system 10). In addition, a power port may be provided to receive DC power via an AC adapter (not shown in FIG. 1A). Note these ports are purely illustrative. As the size of ultraportable computing devices becomes smaller, less external ports may be provided. Instead, communication may be performed through wireless communication techniques similar to Bluetooth, Near Field Communication, Wi-Fi, sensors, etc. Moreover, power may be received through alternative connections (or even wirelessly in some embodiments).

As further seen, a lid portion 30 may be coupled to base portion 20 and may include one or more display(s) 40, which in different embodiments can be a liquid crystal display (LCD) or an organic light emitting diode (OLED). However, any display technology, such as an e-ink screen, may be utilized as display 40. Furthermore, in the area of display 40, touch functionality, in one embodiment, is provided such that a user is able provide user input via a touch panel co-located with display 40. In another embodiment, which is not illustrated, multiple displays may be provided (e.g., a traditional display and an e-ink screen, different display types, or multiple displays of the same type). Lid portion 30 may further include various capture devices, including a camera device 50, which is capable to capture video and/or still information. In addition, one or more microphones, such as dual microphones 55a and 55b, may be present to receive user input via the user's voice. Although shown at this location in FIG. 1A, the microphone, which can be one or more omnidirectional microphones, may be in other locations in other embodiments.

As will be described further below, system 10, in one embodiment, is configured with particular components and circuitry to enable a high end user experience via a combination of hardware and software of the platform. For example, using available hardware and software, perceptual computing may enable a user to interact with the system via voice, gesture, touch and in other ways. Here, different sensor are potentially included to detect, utilize, or provide sense information (e.g., visual, auditory, olfactory, kinesthetic, gustatory, 3D perception, temperature, pressure, gas/liquid/solid chemical/molecular makeup sensor, humidity, or any other known sense). Sensors and handling of such information is discussed below in more detail.

In addition, this user experience may be delivered in a very light and thin form factor system that provides high performance and low-power capabilities, while also enabling advanced features such as instant on and instant connect (also known as Always On Always Connected), so that the system is capable of being put in to a low power state (e.g., sleep mode, standby, or other known low power mode) and directly awaken and be available to the user instantly (e.g., within less than one, two, five, or seven seconds of exiting the sleep mode). Furthermore upon such wake-up the system, in one embodiment, is connected to networks such as a local network, Wi-Fi network, the Internet, etc.; providing similar performance to that available in smartphones and tablet computers, which lack the processing and user experience of a fully featured system such as that of FIG. 1A. Of course, although shown at this high level in the illustration of FIG. 1A, understand that additional components may be present within the system, such as loud speakers, additional displays, capture devices, environmental sensors and so forth, details of which are discussed further below.

Figure 1B:
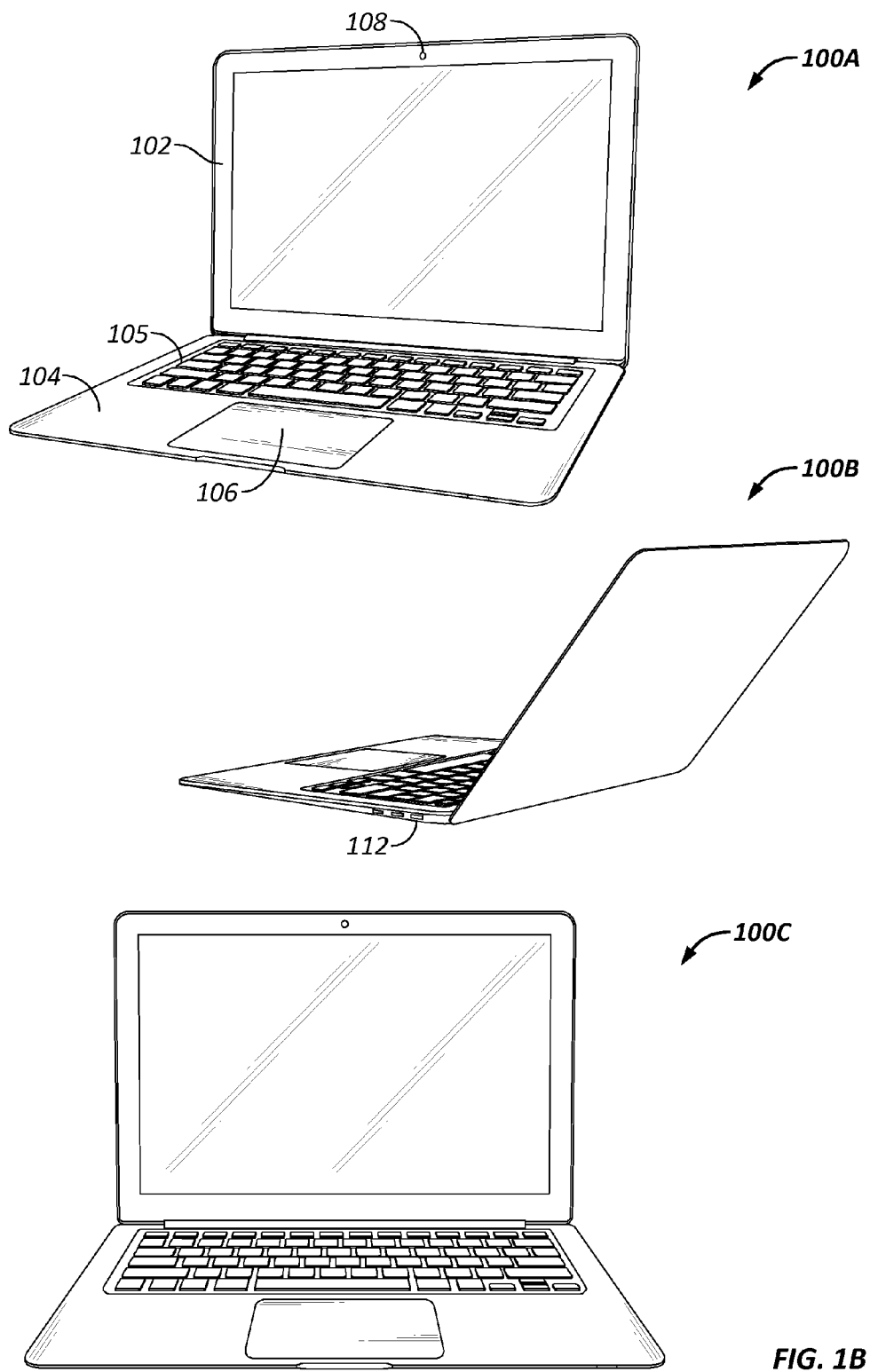
FIG. 1B illustrates another embodiment of a computing system.

Referring now to FIG. 1B, shown are illustrations of a representative computing system in accordance with an embodiment of the present invention. As shown in FIG. 1B, system 10 corresponds to an Ultrabook™, an Apple® MacBook Air, an Acer® Aspire, an LG® Xnote, a Dell® Inspiron, a Dell® XPS, an NEC® LaVie, an MSI® S20, an Asus® Transformer, a Sony® VAIO, an HP® EliteBook, HP® Folio, a Toshiba® Protege, an Asus® Zenbook, an Asus® TaiChi, a Lenovo® Ideapad, a Lenovo® Yoga, another ultralight and thin computing device, or any known and/or available ultralight, ultrathin, and/or ultraportable computing platform. This system may be of relatively small size and weight. For example, the system, in one embodiment, is formed of an ultrathin and ultralight unibody aluminum (or carbon) construction and can weigh less than 3 pounds, with dimensions of a width of approximately 12.8 inches, a depth of 8.9 inches and a Z-height of less than approximately 0.7 inches, and with a tapered design such that at a front edge, the height may be less approximately 0.1 inches. In one embodiment, system 10 includes an Intel®-based processor, and may include 2/4/8/12/16/32/64 GB of system memory, along with an integrated graphics processor.

As seen in FIG. 1B the display may take up substantially all of the size of a lid portion 102. As seen, a bezel of this lid portion 102 includes an integrated camera 108. As an example, camera 108 includes an integrated FaceTime camera. As further seen in FIG. 1B in view 100A, a base portion 104 can include a keyboard 105 (generally) and a touchpad 106. In some implementations, keyboard 105 is backlit and leverages an environmental sensor, such as an ambient light sensor, to detect changes in lighting conditions and adjust the display and keyboard brightness accordingly.

As seen in a side view 100B of FIG. 1B, the base portion has a tapered profile from a relatively thin leading front edge to a wider rear edge. As seen, external ports can adapted within this shown side portion. In the embodiment shown, ports 112 (generally) include a Thunderbolt™ port, a USB 2.0 port and a card reader port (which can be used to receive, e.g., SD cards). In an embodiment, one or more of the ports are an IO port that provides 10 gigabits per second (Gbps) of full-duplex bandwidth per channel. This port may concurrently support data (e.g., via PCIe™) and display connections (e.g., a Display Port connection) over a single cable. Peripheral products are typically connected to this port using electrical or optical cables. Using such a port, multiple, high-performance, PCIe™ and Display Port devices attach to a platform through a single physical connector. Using such an interconnect, a user potentially adds high-performance features to a platform over a cable, daisy chaining multiple devices including one or more displays, storage devices, video capture devices, and so forth. On the other side portion, additional ports, including another USB port, a headphone port, a microphone, and a power adapter may also be provided.

View 100C shows an opened view of the platform. Although shown at this high level of illustration in FIG. 1B, understand that additional features may be present in other embodiments. In some embodiments, touch pad 106 includes a multi-touch trackpad to receive a variety of user inputs (e.g., different numbers of fingers, types of movements, gestures, or so forth) that translates into different user commands. In one embodiment, the trackpad is implemented as an at least semi-transparent window. However, touchpad 106 (and even keyboard 105) may be replaced or omitted as sensory user input advances.

Figure 1C:
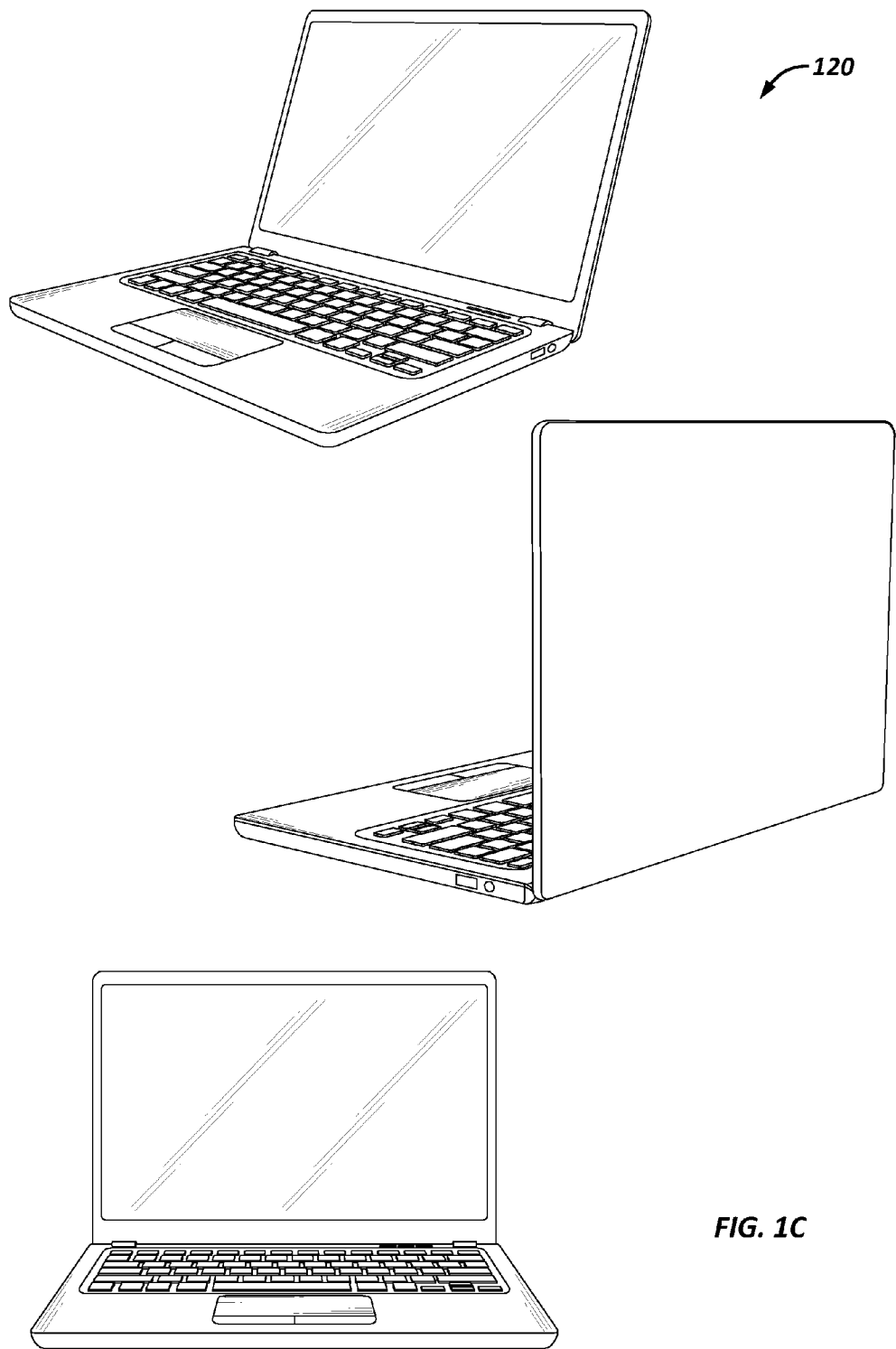
FIG. 1C illustrates another embodiment of a computing system.

Turning next to FIG. 1C, other illustrations of another ultra-thin form factor device in accordance with an embodiment of the present invention is depicted. As shown in the various views of the system 120 in one representation corresponds to an Ultrabook™, an Apple® MacBook Air, an Acer® Aspire, an LG® Xnote, a Dell® Inspiron, a Dell® XPS, an NEC® LaVie, an MSI® S20, an Asus® Transformer, a Sony® VAIO, an HP® EliteBook, HP® Folio, a Toshiba® Protege, an Asus® Zenbook, an Asus® TaiChi, a Lenovo® Ideapad, a Lenovo® Yoga, another ultralight and thin computing device, or any known and/or available ultralight, ultrathin, and/or ultraportable computing platform. As seen, system 120 may include a lid portion and a base portion, with the lid portion including a display and the base portion including a keyboard and touch pad. Note that in comparison to FIGS. 1A-1B, which have a tapered base design, system 120 has a more even base height.

In one embodiment, system 120 includes one or more of the following features: a diagonal display size of between 10 and 14 inches, a backlight chiclet keyboard, a height between 0.4 and 1 inch, a length of between 10 and 14 inches, a width between 5 and 10 inches, a USB port, a headphone/microphone jack, an HDMI port, an AC power port, an expansion slot, a rated batter life of over 7 hours, a solid state hard drive of between 64 GB-512 GB, an integrated graphics chip, an SODIMM memory slot, and a weight for between 1-4 pounds.

Figure 1D:
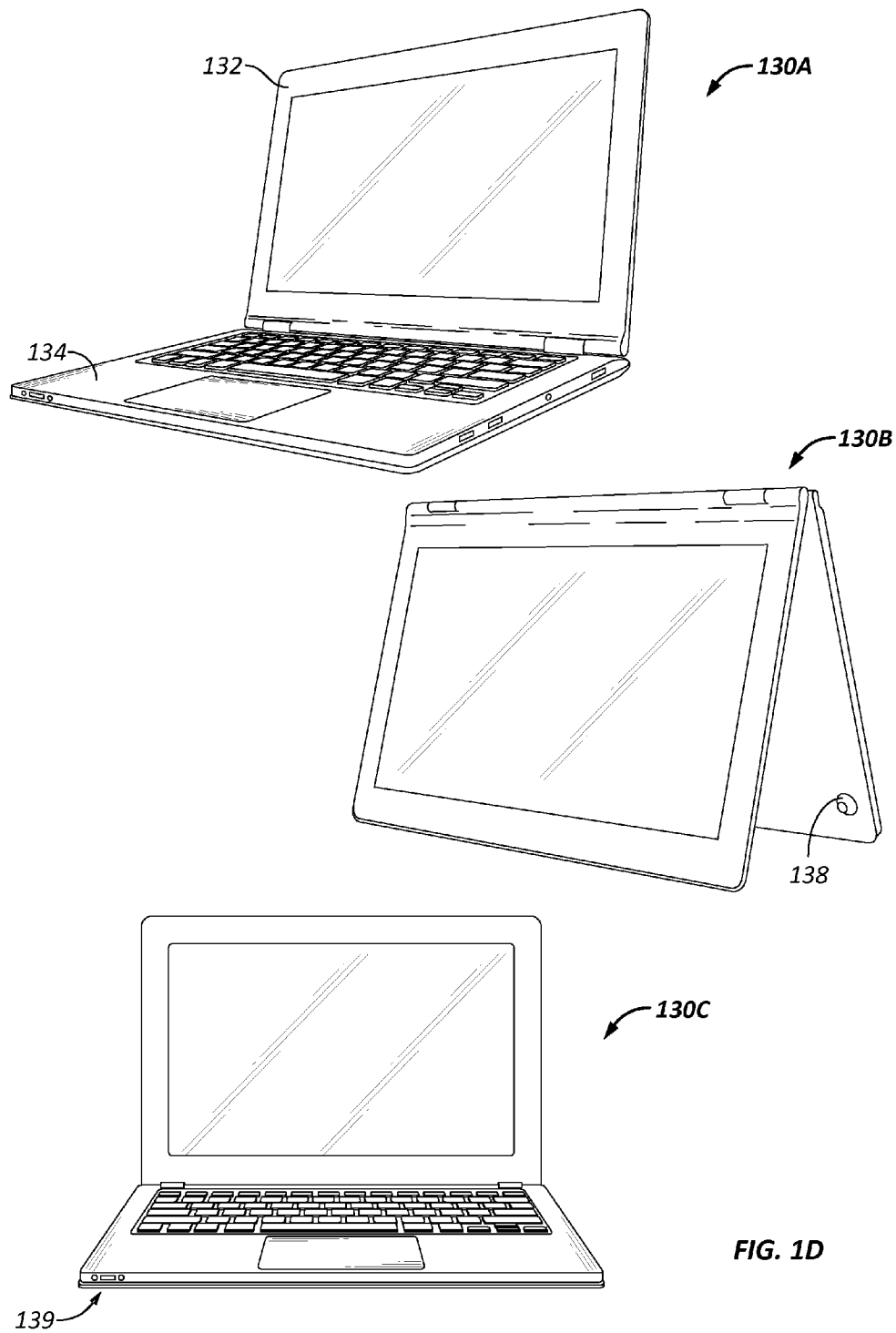
FIG. 1D illustrates another embodiment of a computing system.

Referring now to FIG. 1D, shown are illustrations of an example convertible form factor ultrathin system in accordance with an embodiment of the present invention. As shown in the various views of the system 130 in one representation corresponds to an Ultrabook™, an Apple® MacBook Air, an Acer® Aspire, an LG® Xnote, a Dell® Inspiron, a Dell® XPS, an NEC® LaVie, an MSI® S20, an Asus® Transformer, a Sony® VAIO, an HP® EliteBook, HP® Folio, a Toshiba® Protege, an Asus® Zenbook, an Asus® TaiChi, a Lenovo® Ideapad, a Lenovo® Yoga, another ultralight and thin computing device, or any known and/or available ultralight, ultrathin, and/or ultraportable computing platform. Lenovo® IdeaPad Yoga, Samsung® Series 5 and other newer series, Dell® Duo, Dell® XPS 12, Asus® Transformer, are a few specific illustrative examples of systems that act as a convertible form factor to provide both laptop and tablet computing environments. Some of them include foldable designs, while others include flip, fold, slide, or detach designs to accomplish the conversion between ultrathin notebook to a tablet. As an example, the system is of relatively ultrathin size and weight, e.g., having a thickness of much less than one inch, e.g., approximately 0.67 inches and a weight of approximately 3 pounds. The screen size may be between 10-14 inches in size, and can generally extend the full width and length of the system.

To further illustrate the convertible nature, a folding design is depicted in the transitions between 130A-130C. As seen in first view 130A, the system includes a lid portion 132 and a base portion 134, with the lid portion including a display and the base portion including a keyboard and touch pad. In addition to this conventional view and operating mode, the system is also operable in a stand mode, shown at view 130B, via swiveling of a hinge assembly, for greater ease of display. Alternatively (not shown), the surface 134 having the trackpad and keyboard may face down, while the display 132 is folded up toward a user for to provide another stand mode. As illustrated, camera 138 is present on the rear portion of lid portion 132. However, a camera may be provided on surface 132 to provide video and camera like features when system 130B is in stand mode. Also as seen in view 130C, various indicator LEDs 139 may be present on a front side of base portion 134. Various buttons, switches and ports (such as those described above) may be provided on the width sides of base portion 134.

In one embodiment, system 130A-130C includes one or more of the following features, a 12-14 inch display, a capacitive multi-touch display, a resolution of at least 1600× 900, a thickness of less than 17 mm, a weight of under 4 pounds, a flip hinge, system memory in the range of 4-16 GB, a solid state drive of 128-512 GB, an High Definition (HD) webcam, a USB port, a wireless LAN connection module, a Bluetooth connection module, and at least 6 hours of rated battery life.

Figure 1E:
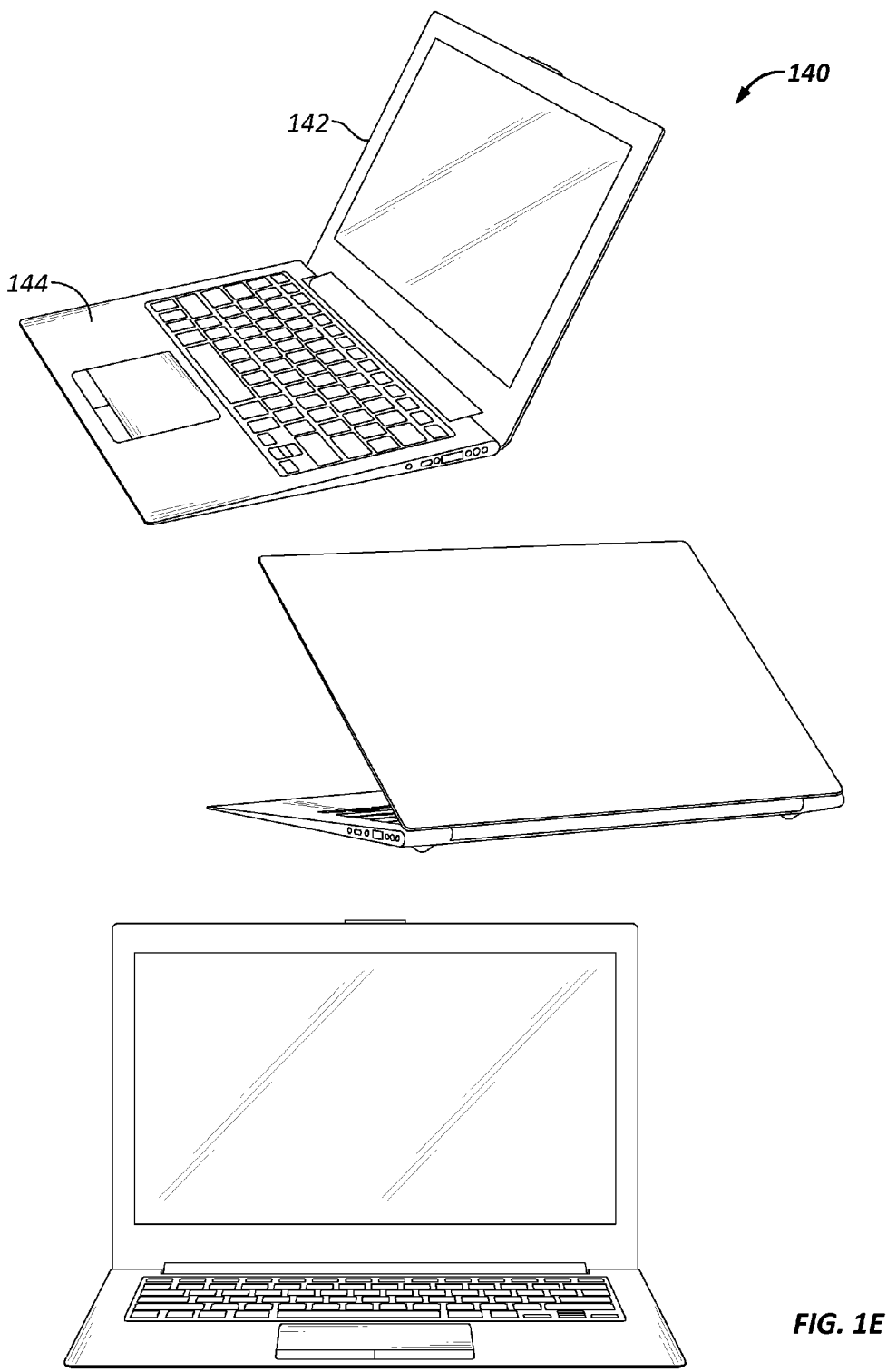
FIG. 1E illustrates another embodiment of a computing system.

FIG. 1E shows illustrations of another ultrathin system in accordance with an embodiment of the present invention. As shown in FIG. 1E, system 140, in one representation corresponds to an Ultrabook™, an Apple® MacBook Air, an Acer® Aspire, an LG® Xnote, a Dell® Inspiron, a Dell® XPS, an NEC® LaVie, an MSI® S20, an Asus® Transformer, a Sony® VAIO, an HP® EliteBook, HP® Folio, a Toshiba® Protege, an Asus® Zenbook, an Asus® TaiChi, a Lenovo® Ideapad, a Lenovo® Yoga, another ultralight and thin computing device, or any known and/or available ultralight, ultrathin, and/or ultraportable computing platform. As seen in the various illustrations, system 140 may have a very thin profile and can have a Z-height of 3 mm at a front side of base portion 144, extending to a Z-height of 9 mm at a rear portion of base portion 144. In this way, a sleek design is provided.

In one embodiment, system 140 includes one or more of the following features: a height of less than 10 mm, system memory of 4, 6, 8, or 12 GB, a screen size of between 10-12 inches, a resume of less than 2 seconds, a mini VGA port, a USB port, a micro HDMI port, a 128, 256, or 512 GB solid state hard drive, a battery rated for over 5 hours operation, a digital microphone, an illuminated keyboard, and an HD camera.

Figure 1F:
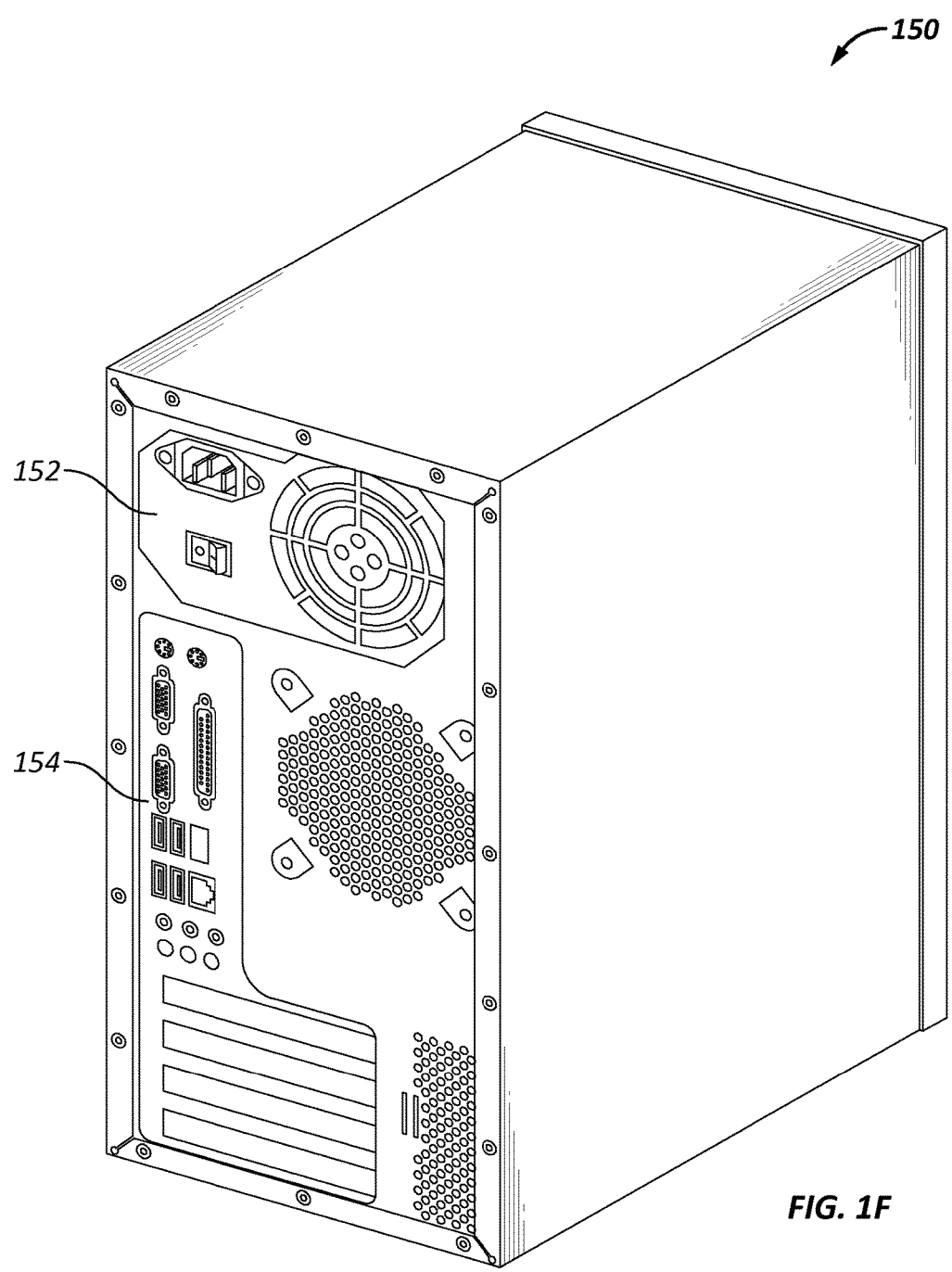
FIG. 1F illustrates another embodiment of a computing system.

Referring now to FIG. 1F, shown is an illustration of a desktop computer 150 in accordance with an embodiment of the present invention. The view of FIG. 1F is a rear view that shows various ports and other features of the system. As seen, in a power portion 152, a power cord adapter is provided, along with a power switch and a fan plate. In a connection portion 154, various adapters to provide external connection to various peripherals including displays, printers, networks, peripheral devices including audio, video and so forth are also provided via one or more parallel ports, serial ports, USB ports, Ethernet/RJ45 ports, and so forth. In addition, multiple slots for expansion cards may also be provided.

Figure 1G:
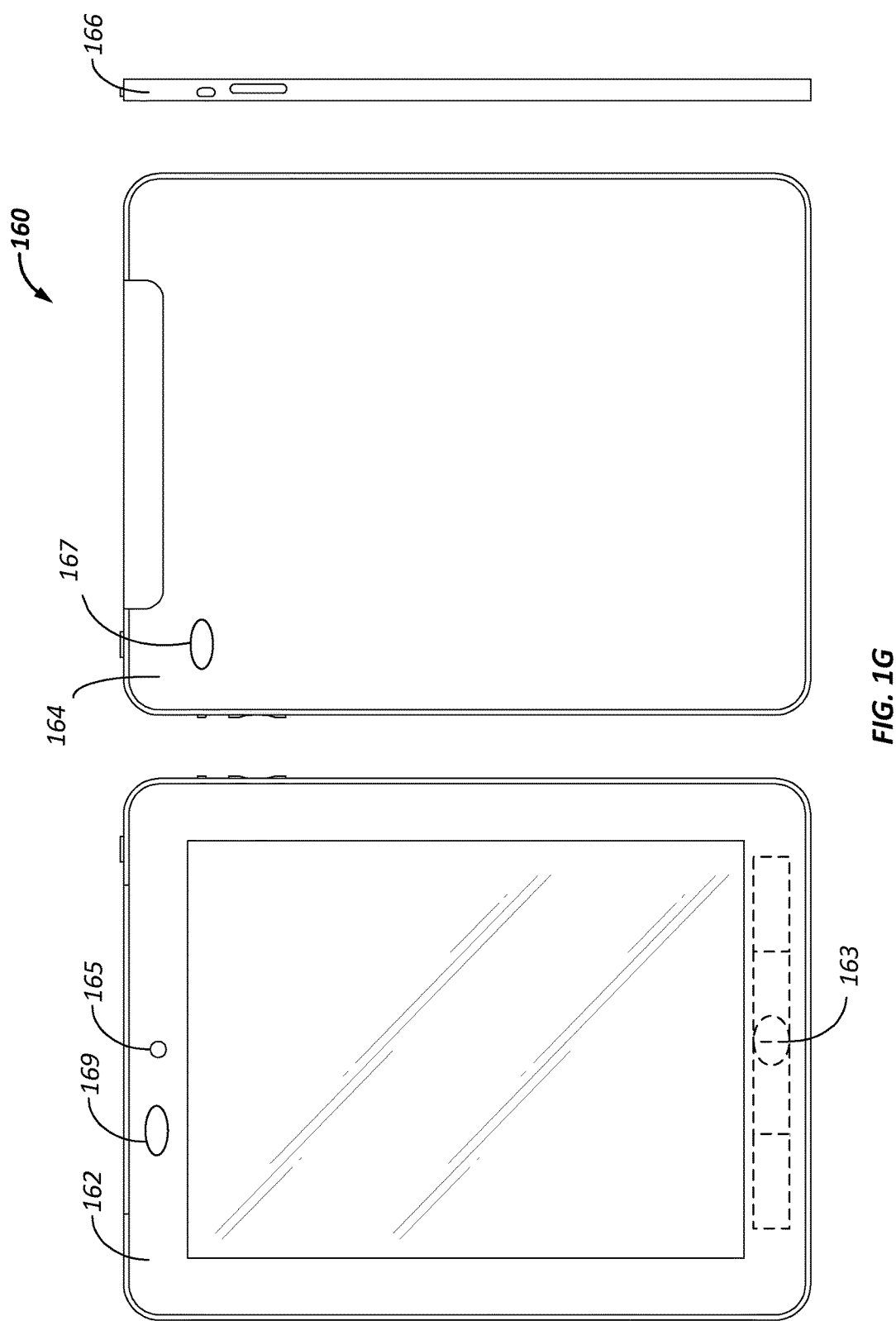
FIG. 1G illustrates another embodiment of a computing system.

Referring now to FIG. 1G, shown are illustrations of a tablet computer in accordance with an embodiment of the present invention. In one embodiment, tablet computer 160 may be an Apple® iPad™ such as the original iPad™, an iPad2™ the new iPad™, a Samsung® Galaxy™ Tablet, Asus® Eee Pad, and Acer® Aspire, an Acer® Iconia, an Amazon® Kindle, a Barnes and Noble® Nook, an Asus® table, a Dell® Streak, a Google® Nexus, a Microsoft® Surface, a Sony® tablet, and Android™ based tablet, a Windows® based tablet, or other known tablet device. As seen in the front illustration 162, one or more input/interface buttons may be present. In addition, a speaker 165 and a camera 169, which in an embodiment may be an iSight™ camera (e.g., a 5 megapixel camera), HD camera, or other known camera may be present. Note that the display as seen in front view 162 may be a retina display to provide high resolution or any other known tablet display. FIG. 1G also shows a rear view 164 and a side view 166. Note that back surface 164 also has a camera. Here, cameras 169 and 167 may be provided for taking pictures, videos, or live video feed.

Referring now to FIG. 1H, shown are illustrations of a smartphone 170 in accordance with an embodiment of the present invention. In the illustrations of FIG. 1H, smartphone 170 may be an Apple® iPhone™ (e.g. an iPhone 3GS, an iPhone 4, an iPhone 4S, an iPhone 5, a Blackberry™, a Samsung® smartphone (e.g. a Samsung® Galaxy™ S3), a Motorola® Droid™, and HTC One™, an Intel® Orange™, an Android™-based, Windows®-based, or other known smartphone. As seen in the front view illustration 172, smartphone 170 includes a speaker 173, a front camera module 174, and one or more input buttons 171. Similarly, a rear camera 176 may be provided as shown in the rear view 175. Various controls and so forth may be present, even though such control buttons (e.g. power, volume, mute) are not shown in side view 178.

Figure 2:
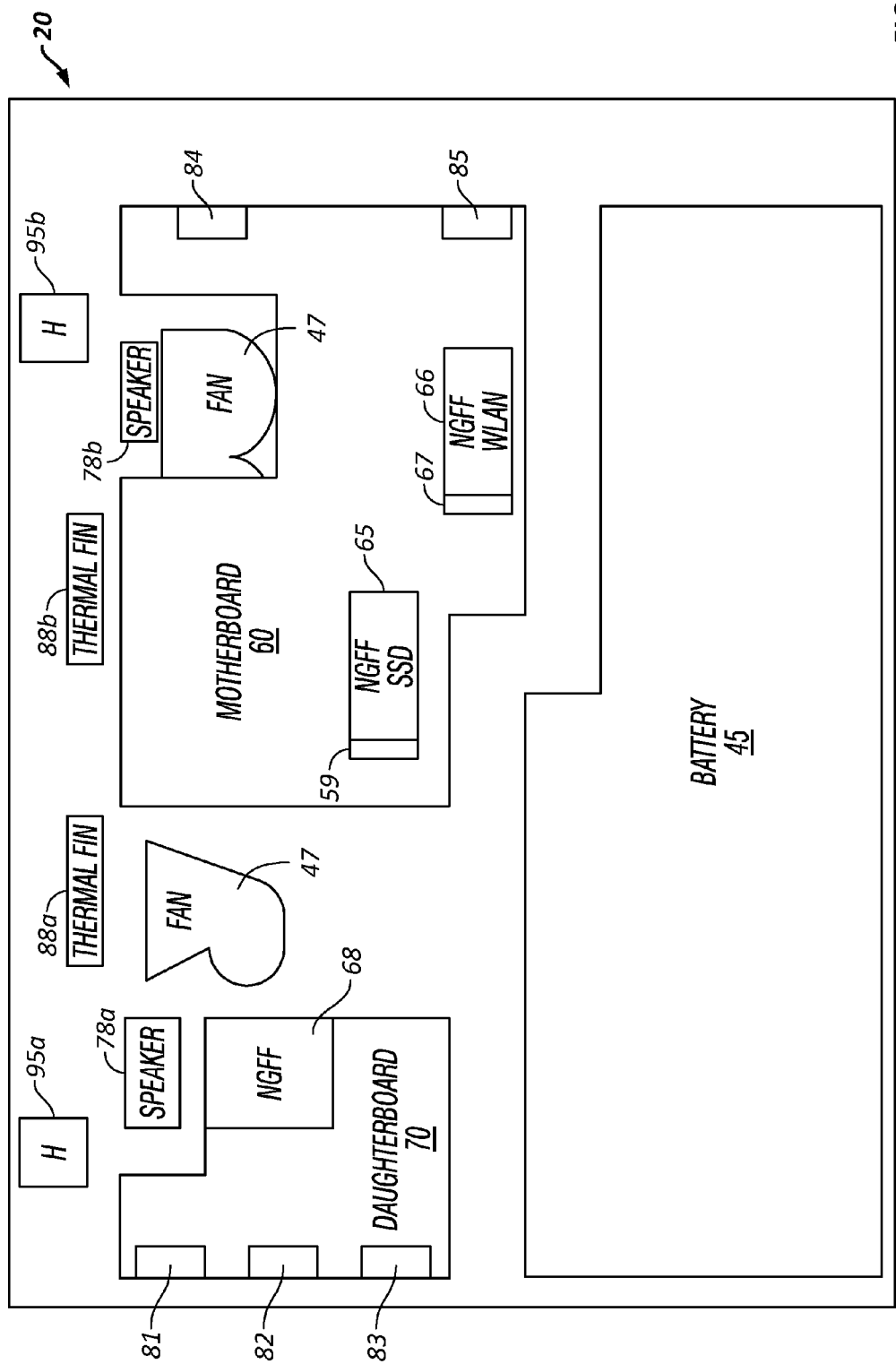
FIG. 2 illustrates one embodiment of a top view of a placement of some exemplary components within a base portion of a chassis.

Referring now to FIG. 2, shown is a top view of an exemplary placement of certain components within a base portion of a chassis in accordance with an embodiment of the present invention. As shown in FIG. 2, base portion 20, in one embodiment, includes a majority of the electronics in the system, other than those associated with the display panel and any touch screen. Of course, the view shown in FIG. 2 is purely an illustrative example; as such, understand that different arrangements of components, including different components, different sizes and locations of components and other placement issues may occur in other embodiments.

In general, the view in FIG. 2 is of the components within a chassis, other than a keyboard and touch pad which would generally be adapted or disposed over the components shown in FIG. 2 (with the keyboard over an upper portion of the view in FIG. 2, and the keypad generally in a lower and central portion of the view in FIG. 2).

Motherboard 60 includes various integrated circuits (ICs) and/or circuitry. Here, motherboard 60 electronically, wirelessly, and/or communicatively couples a processor, such as a central processing unit (CPU), system memory and other ICs. Additional ICs and other circuitry, in one embodiment, are implemented on a daughterboard 70 that may similarly electrically or communicatively couple to motherboard 60. Daughterboard 70, in one scenario, includes interfaces to various ports and other peripheral connectors, including ports 81, 82 and 83, which potentially correspond to exemplary ports: USB, Ethernet, Firewire, Thunderbolt, or any other type of user-accessible connection. Also depicted is add-in card 68 coupled to daughterboard 70 (e.g., via a next generation form factor (NGFF) connector). Such connector in accordance with a NGFF design may provide a single connection type that is used for add-in cards of different sizes with potentially different keying structures to ensure only appropriate add-in cards are inserted into such connectors. In the embodiment shown, this add-in card 68 includes a wireless connectivity circuitry, e.g., for 3G/4G/LTE circuitry.

Similarly, motherboard 60, in some embodiments, provides interconnection to certain other user accessible ports; namely ports 84 and 85 in the illustration. In addition, several add-in cards 65 and 66 may also be coupled to motherboard 60. In the embodiment shown, add-in card 65 includes a solid state drive (SSD), which is coupled to motherboard 60 via a connector, such as NGFF connector 59. Add-in card 66 includes any known computing add-in component, such as a wireless local area network (WLAN), audio device, video device, network controller, etc.

Note that FIG. 2, as described above, depicts a configuration with motherboard 60 that couples together multiple ICs, circuitry, and/or devices. However, as semi-conductor manufacturing increases the ability to put more transistors on a single die and/or package also ramps up. As a result, in some embodiments, a few of these devices (and potentially even all of them) may be integrated on a single IC, die, chip, package, etc. For example, memory controller hubs were previously separate integrated circuit controllers coupled to a central processor through a front-side-bus that resided on motherboard 60. However, as manufacturing has progressed, the memory controller hubs have now started to be integrated on a CPU package and/or die. Moreover, other systems have become even more integrated providing much of the 'system' circuitry described above on a single integrated circuit to form a System On a Chip (SOC). As a result, the embodiments described herein may similarly be applied to a ultraportable computing device that includes an SOC.

Returning to the discussion of the embodiment illustrated in FIG. 2, to provide cooling, some implementations may include one or more fans. In the embodiment shown, two such fans 47 are provided. Here, fans 47 conduct heat away from the CPU and other electronics via thermal fins 88a and 88b. As on example, heat is transferred to vents within the chassis or to the chassis directly. However other embodiments may provide for a fanless system where cooling is achieved by a reduction in power consumption of the CPU and other components, other known heat dissipation elements, other known ventilation elements, or any other known or available mechanism for transferring heat from one space/element to another.

To provide for advanced audio features, in on embodiment, multiple speakers 78a and 78b are provided. In one scenario, speakers 78a, 78b radiate out from a top portion of the chassis via a mesh or other ventilated pattern to provide for an enhanced sound experience. To enable interconnection between base portion 20 and a lid portion (not shown for ease of illustration in FIG. 2), a pair of hinges 95a and 95b are provided. In addition to providing hinge capabilities, these hinges, in one embodiment, further include pathways to provide connections between circuitry within the lid portion and base portion 20. For example, wireless antennas, touch screen circuitry, display panel circuitry and so forth all can communicate via connectors adapted through these hinges. Furthermore, hinges, in a hybrid environment, are capable of aiding or supporting conversion between form-factors. As one example, the hinges enable the system to convert from a laptop/notebook to a tablet form. As is readily apparent, hinges are not the only mechanism for coupling a display to a chassis. As a result, any known physical coupling may be utilized to connect a display to a chassis or electronics of computing system 10, whether computing system 10 is convertible between form factors or not.

As further shown, battery 45 is present. In one embodiment, battery 45 includes a lithium-ion or other known/available high capacity battery. Although shown with this particular implementation of components and placement of circuitry in FIG. 2, the scope of the present invention is not limited in this regard. That is, in a given system design there can be trade offs to more efficiently consume the available X-Y-Z space in the chassis.

Figure 3:
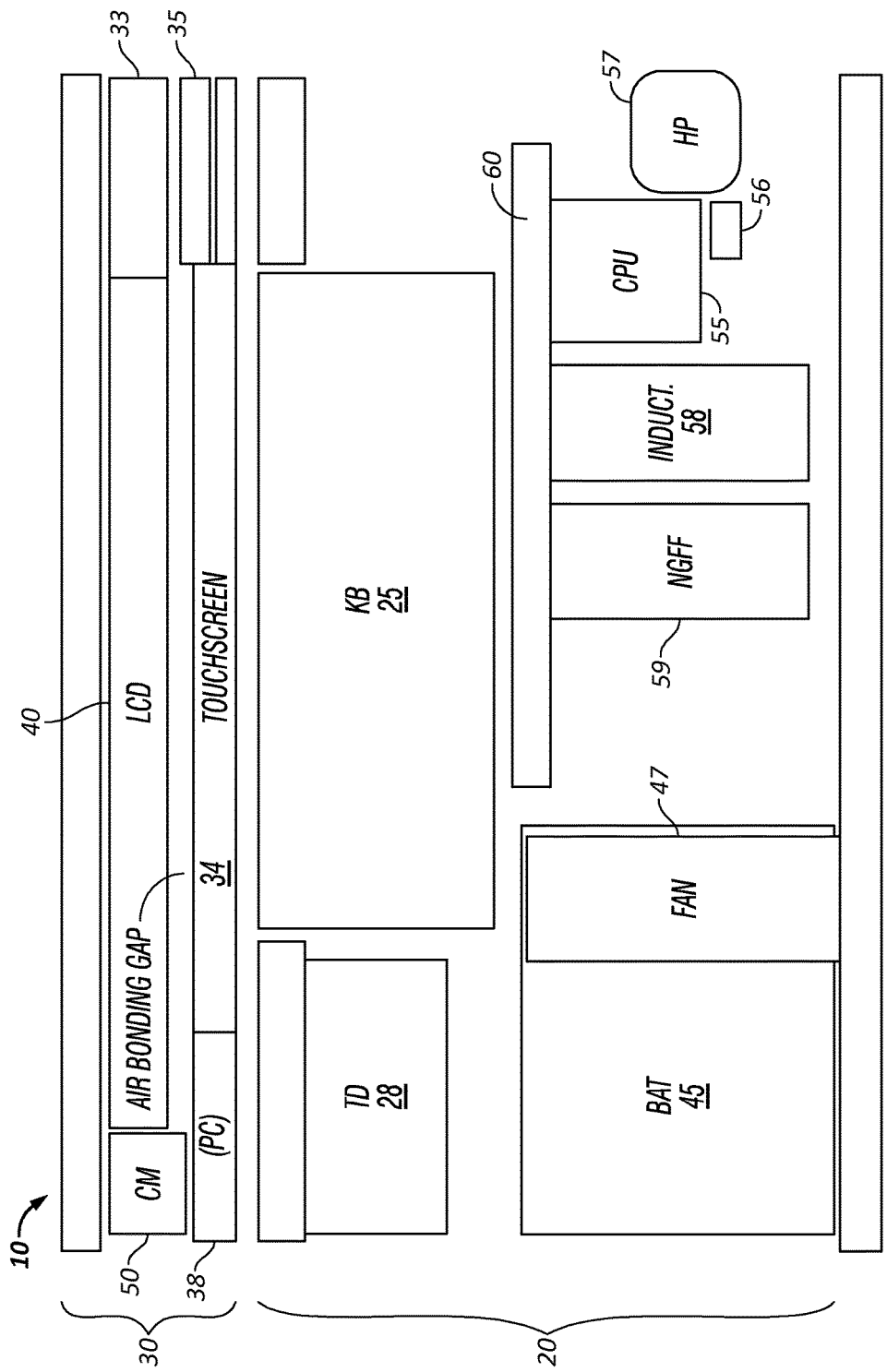
FIG. 3 illustrates one embodiment of a cross-sectional view of an embodiment of a computing system.

Referring now to FIG. 3, shown is a cross-sectional view of a computer system in accordance with an embodiment of the present invention. As shown in FIG. 3, system 10 corresponds to a clamshell-based ultrathin laptop computer having a low-profile and lightweight design. The view in FIG. 3 is a cross-sectional view through a substantial midpoint of the system and is intended to show a high level view of the vertical stack-up or layout of components within the chassis.

In general, the chassis is split into a lid portion 30 and a base portion 20. Here, lid portion 30 includes the display, related circuitry, and components, while base portion 20 includes the main processing elements along with battery and keyboard. However, note that in other implementations of a clamshell design, virtually all of the components other than the keyboard are adapted within the lid portion to enable a detachable, removable, or convertible lid portion that doubles as a tablet-based form factor computer.

The lid portion 30 includes a display panel 40 in one embodiment. In one embodiment, display panel 40 includes a LCD or other type of thin display such as an OLED. As an example, display panel 40 is coupled to a display circuit board 33. In addition, a touch screen 34, in one embodiment, is adapted (or disposed) above, below, or integrated with display panel 40. In an embodiment, touch screen 34 is implemented via a capacitive sense touch array configured along a substrate. As illustrative examples, the substrate includes glass, plastic or other known or otherwise available transparent substrate. In turn, touch screen 34 is operatively coupled to a touch panel circuit board 35. Note that any known touch display technology may be utilized as or in conjunction with a display.

As further depicted, lid portion 30 also includes a camera module 50. In one embodiment, camera module 50 includes a high definition camera capable of capturing image data; both of still and motion video types. Camera module 50, in some implementations, is coupled to a circuit board 38. Note that all of these components of lid portion 30, in other embodiments, may be configured, disposed, or reside within a chassis that includes a cover assembly. The cover assembly may be fabricated utilizing any known or available material suitable for providing chassis functionality, such as a plastic or metal material. As a specific illustrative example, such a cover assembly is fabricated from or includes a magnesium aluminum (Mg—Al) composite.

Still referring to FIG. 3, the majority of the processing circuitry of system 10 is depicted as present within base portion 20. However, as discussed above in an embodiment that provides for a detachable lid portion, these components may instead be implemented in the lid portion.

From view of the top of base portion 20 down, included is a keyboard 25 that can be of various types to enable a thin profile device and can include chicklet type keys or other thin form factor keys. In addition, a touch pad 28 is provided as another user interface.

The majority of the components are configured on a circuit board 60 which may be a motherboard such as a Type IV motherboard that includes various integrated circuits that coupled/adapted to the circuit board in a variety of manners, including soldered, surface mounted and so forth. With specific reference to FIG. 3, a CPU 55, such as an ultra low voltage multi-core processor, may be adapted to circuit board 60, e.g., via a socket or other type of connection. As seen, to provide a thermal solution, a heat sink 56, in one example, is placed in close relation to CPU 55 and in turn to heat pipe 57, which transfers heat from the processor and/or other components, e.g., to various cooling locations such as vents, fans or so forth. Also shown configured to circuit board 60 is an inductor 58 and a NGFF edge connector 59. Although not shown for ease of illustration, understand that an add-in card, in some embodiments, is coupled to connector 59 to provide additional components. As examples, these components may include wireless solutions and a solid state device (SSD), among other types of peripheral devices.

As further seen in FIG. 3, a battery 45 is included in or associated with base portion 20. Here, battery 45 is located in close connection to a portion of the cooling solution, such as fans 47. Although shown with this particular implementation in the example of FIG. 3, the placement and inclusion of such components is not limited, as in other embodiments additional and different components may be present. For example, instead of providing mass storage by way of an SSD, a hard drive may be implemented within base portion 40. To this end, a mini-serial advanced technology attach (SATA) connector is further coupled to circuit board 60 to enable connection of this hard drive to the processor and other components adapted on circuit board 60. Furthermore, the components may be placed in different locations to more efficiently use (or reduce) the Z-space.

In one embodiment, an Ultrabook™ refers to maximum heights based on the size of screen 40 (i.e. the diagonal size of screen 40). As one example, an Ultrabook™ includes a maximum height for base portion 20 and lid portion 30 combined of 18 mm for display 40 that is 13.3 inches and smaller. As a second example, an Ultrabook™ includes a maximum height for base portion 20 and lid portion 30 combined of 21 mm for display 40 that is 14 inches and larger. Furthermore, as yet another example, an Ultrabook™ includes a maximum height for base portion 20 and lid portion 30 combined of 23 mm for convertible or hybrid displays (i.e. convert between a notebook/laptop and a tablet). Yet, as sizes of all market segments (desktops, notebooks, Ultrabook™, tablets, and phones collectively shrink, the range of height for an Ultrabook™ may also be reduced in size. Therefore, in one embodiment, a maximum height for an Ultrabook™ is variable between a tablet and notebook based on the market conditions.

Figure 4:
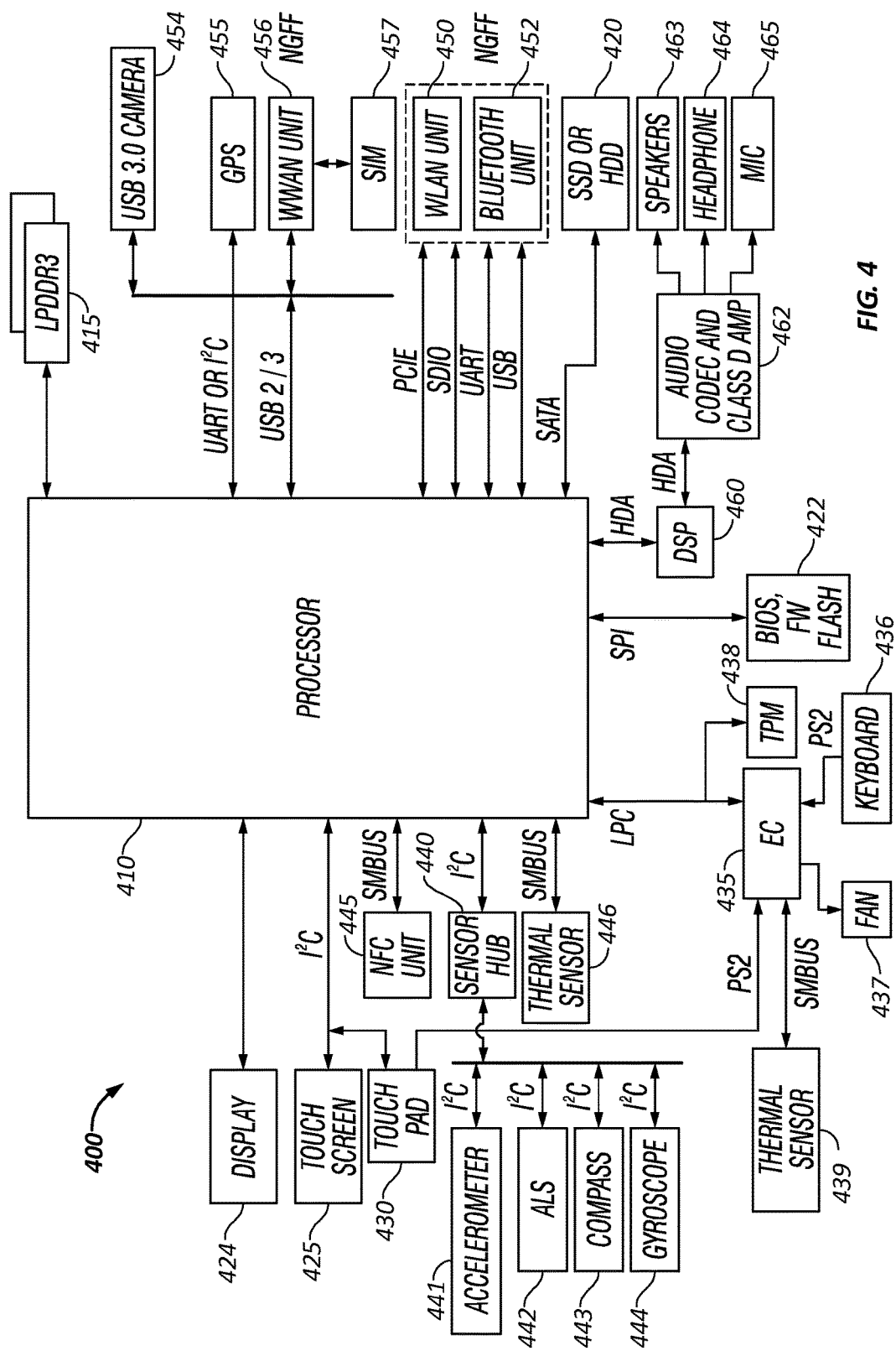
FIG. 4 illustrates one embodiment of a block diagram of components present in a computing system.

Referring now to FIG. 4, a block diagram of components present in a computer system in accordance with an embodiment of the present invention. As shown in FIG. 4, system 400 may include any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 4 is intended to show a high level view of many components of the computer system. However, it is to be understood that some of the components shown may be omitted, additional components may be present, and different arrangement of the components shown may occur in other implementations.

As seen in FIG. 4, a processor 410, in one embodiment, includes a microprocessor, multi-core processor, multi-threaded processor, an ultra low voltage processor, an embedded processor, or other known processing element. In the illustrated implementation, processor 410 acts as a main processing unit and central hub for communication with many of the various components of the system 400. As one example, processor 400 is implemented as a system on a chip (SoC). As a specific illustrative example, processor 410 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or TI OMAP processor. Certain details regarding the architecture and operation of processor 410 in one implementation will be discussed further below.

Processor 410, in one embodiment, communicates with a system memory 415. As an illustrative example, the system memory 415 is implemented via multiple memory devices or modules to provide for a given amount of system memory. In one embodiment, the memory is operable in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. As examples, 2/4/8/12/16 gigabytes (GB) of system memory may be present and can be coupled to processor 410 via one or more memory interconnects. In various implementations the individual memory devices may be of different package types such as single die package (SDP), dual die package (DDP) or quad die package (QDP). These devices, in some embodiments, are directly soldered onto a motherboard to provide a lower profile solution, while in other embodiments the devices are configured as one or more memory modules that in turn couple to the motherboard by a given connector. Other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 420 may also couple to processor 410. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 4, a flash device 422 may be coupled to processor 410, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 400. Specifically shown in the embodiment of FIG. 4 is a display 424 which may be a high definition LCD or LED panel configured within a lid portion of the chassis. This display panel may also provide for a touch screen 425, e.g., adapted externally over the display panel such that via a user's interaction with this touch screen, user inputs can be provided to the system to enable desired operations, e.g., with regard to the display of information, accessing of information and so forth. In one embodiment, display 424 may be coupled to processor 410 via a display interconnect that can be implemented as a high performance graphics interconnect. Touch screen 425 may be coupled to processor 410 via another interconnect, which in an embodiment can be an I2C interconnect. As further shown in FIG. 4, in addition to touch screen 425, user input by way of touch can also occur via a touch pad 430 which may be configured within the chassis and may also be coupled to the same I2C interconnect as touch screen 425.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multi-touch panel that is multi-touch capacitive and being at least 5 fingers capable. And in some embodiments, the display may be 10 fingers capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flushed with the panel surface, and limited IO interference when using multi-touch.

For perceptual computing and other purposes, various sensors may be present within the system and may be coupled to processor 410 in different manners. Certain inertial and environmental sensors may couple to processor 410 through a sensor hub 440, e.g., via an I2C interconnect. In the embodiment shown in FIG. 4, these sensors may include an accelerometer 441, an ambient light sensor (ALS) 442, a compass 443 and a gyroscope 444. Other environmental sensors may include one or more thermal sensors 446 which in some embodiments couple to processor 410 via a system management bus (SM Bus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where in this second state, the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 4, various peripheral devices may couple to processor 410 via a low pin count (LPC) interconnect. In the embodiment shown, various components can be coupled through an embedded controller 435. Such components can include a keyboard 436 (e.g., coupled via a PS2 interface), a fan 437, and a thermal sensor 439. In some embodiments, touch pad 430 may also couple to EC 435 via a PS2 interface. In addition, a security processor such as a trusted platform module (TPM) 438 in accordance with the Trusted Computing Group (TCG) TPM Specification Version 1.2, dated Oct. 2, 2003, may also couple to processor 410 via this LPC interconnect. However, the scope of the present invention is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 400 can communicate with external devices in a variety of manners, including wirelessly. In the embodiment shown in FIG. 4, various wireless modules, each of which can correspond to a radio configured for a particular wireless communication protocol, are present. One manner for wireless communication in a short range such as a near field may be via a near field communication (NFC) unit 445 which may communicate, in one embodiment with processor 410 via an SMBus. Note that via this NFC unit 445, devices in close proximity to each other can communicate. For example, a user can enable system 400 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 4, additional wireless units can include other short range wireless engines including a WLAN unit 450 and a Bluetooth unit 452. Using WLAN unit 450, Wi-Fi™ communications in accordance with a given Institute of Electrical and Electronics Engineers (IEEE) 802.11 standard can be realized, while via Bluetooth unit 452, short range communications via a Bluetooth protocol can occur. These units may communicate with processor 410 via, e.g., a USB link or a universal asynchronous receiver transmitter (UART) link. Or these units may couple to processor 410 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 456 which in turn may couple to a subscriber identity module (SIM) 457. In addition, to enable receipt and use of location information, a GPS module 455 may also be present. Note that in the embodiment shown in FIG. 4, WWAN unit 456 and an integrated capture device such as a camera module 454 may communicate via a given USB protocol such as a USB 2.0 or 3.0 link, or a UART or I2C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. Another additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 460, which may couple to processor 410 via a high definition audio (HDA) link. Similarly, DSP 460 may communicate with an integrated coder/decoder (CODEC) and amplifier 462 that in turn may couple to output speakers 463 which may be implemented within the chassis. Similarly, amplifier and CODEC 462 can be coupled to receive audio inputs from a microphone 465 which in an embodiment can be implemented via dual array microphones (such as a digital microphone array) to provide for high quality audio inputs to enable voice-activated control of various operations within the system. Note also that audio outputs can be provided from amplifier/CODEC 462 to a headphone jack 464. Although shown with these particular components in the embodiment of FIG. 4, understand the scope of the present invention is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 410 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 435. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 435 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 4, the scope of the present invention is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

While the present invention has been described with respect to a limited number of embodiments, those skilled in the art will appreciate numerous modifications and variations therefrom. It is intended that the appended claims cover all such modifications and variations as fall within the true spirit and scope of this present invention.

Figure 5:
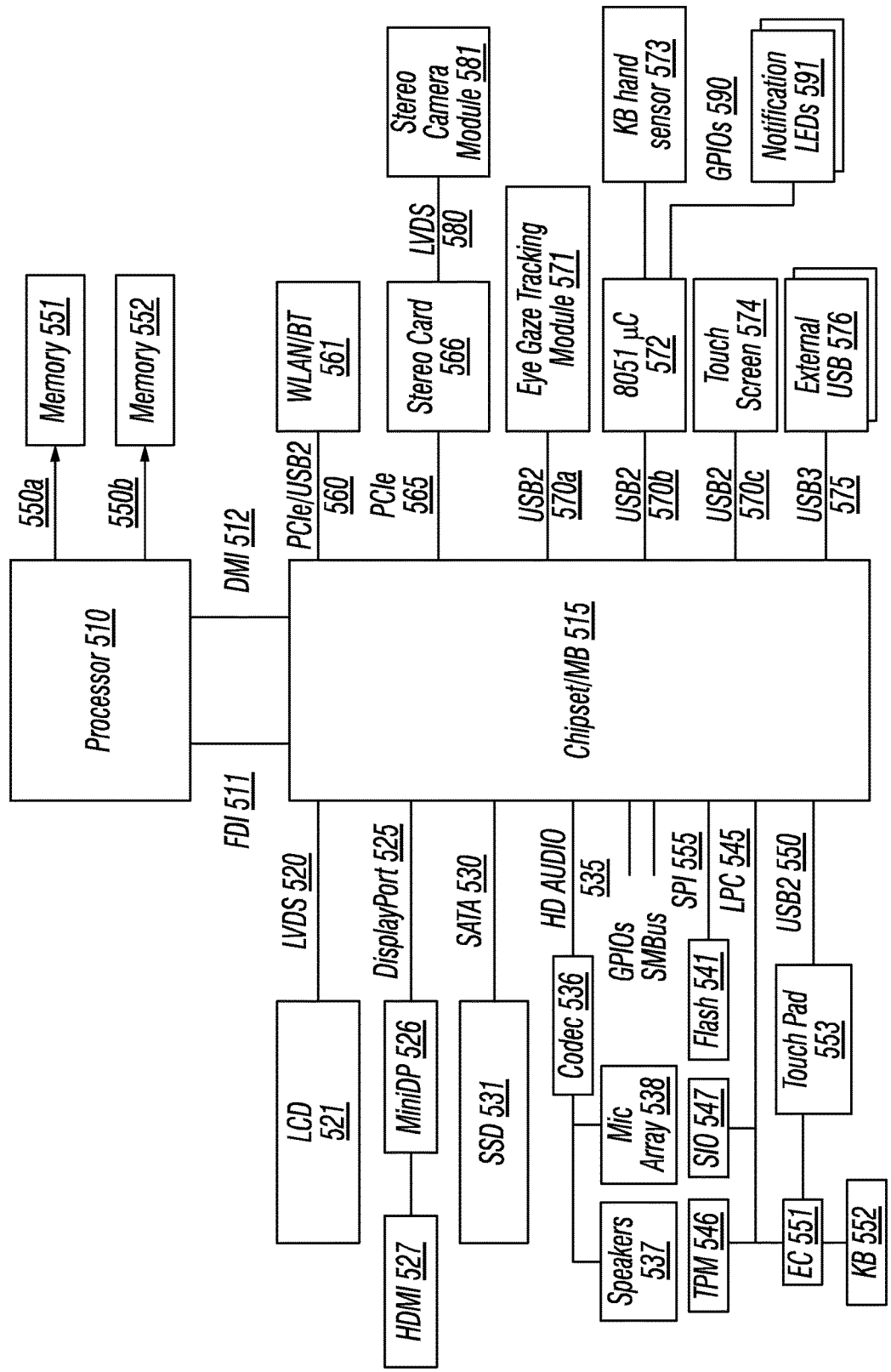
FIG. 5 illustrates another embodiment of a block diagram of components present in a computing system.

Referring now to FIG. 5, shown is a block diagram of components present in a second computer system in accordance with an embodiment of the present invention. As shown in FIG. 5, system 500 may include any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 5 is intended to show a high level view of many components of the computer system. However, it is to be understood that some of the components shown may be omitted, additional components may be present, and different arrangement of the components shown may occur in other implementations.

As seen in FIG. 5, a processor 510, in one embodiment, includes a microprocessor, multi-core processor, multi-threaded processor, an ultra low voltage processor, an embedded processor, or other known processing element. In the illustrated implementation, processor 510 acts as a main processing unit of the system 500. As a specific illustrative example, processor 510 may be any of the processors described above as available from Intel Corporation, AMD, an ARM-based design, a MIPS-based design, Qualcomm, TI or other such manufacturer. Certain details regarding the architecture and operation of processor 510 in one implementation will be discussed further below.

Processor 510, in one embodiment, communicates with a system memory 551 and 552. As an illustrative example, multiple memory communication paths can be provided via memory interconnects 550*a* and 550*b*. As one such example, each of the memory devices (and the interconnects) can be of a different speed, and can be controllably powered based on a given power consumption target of a LPDDR2 or a next generation LPDDR standard. As examples, 2/4/8 gigabytes (GB) of system memory may be provided via these memory devices that can be of a SDP, DDP or QDP form factor, and can be connected to a motherboard in a given manner.

As seen in FIG. 5, processor 510 may couple to a chipset 515 via multiple interfaces including a direct media interface (DMI) 512 and a flexible display interface (FDI) 511. Although shown with these particular interconnections to chipset 515 in the embodiment of FIG. 5, the connection to a chipset can be made in other manners in different embodiments. In some embodiments, chipset 515 may also be referred to as a peripheral controller hub (PCH) as it provides an interface to various peripherals of the system.

To provide for persistent storage of information such as data, applications, one or more operating systems and so forth, a SSD 531 may couple to chipset 515 via a serial advanced technology attach (SATA) interconnect 530. Although shown as implemented via an SSD, in other embodiments, the mass storage may primarily be implemented using a HDD with a smaller amount of SSD storage to act as a SSD cache to enable non-volatile storage of context state and other such information during power down events so that a fast power up can occur on re-initiation of system activities.

Also shown in FIG. 5, a flash device 541 may be coupled to processor 510, e.g., via a serial peripheral interface (SPI) 555. This flash device may provide for non-volatile storage of system software, including a BIOS as well as other firmware of the system.

Various IO devices may be present within system 500. Specifically shown in the embodiment of FIG. 5 is a display 521 which may be a high definition LCD configured within a lid portion of the chassis. This display panel may be coupled to chipset 515 via a low voltage differential signaling (LVDS) interconnect 520. Although shown with this particular type of interconnection and LCD type display, understand that other types of displays such as an LED or other type of display and a different interconnect arrangement may be provided.

As further seen, an additional video interface may be via a display port interconnect 525 that couples to a display adapter 526 which in an embodiment can be a mini display port adapter (miniDP) 526. In turn, this adapter can provide interconnection to an external video output device via, e.g., a HDMI device 527, which in an embodiment can be a flat panel television display of various types such as a plasma device, LED device, LCD device or so forth.

Still referring to FIG. 5, a touch screen 574 can be adapted externally over the display panel such that via a user's interaction with this touch screen, user inputs can be provided to the system to enable desired operations as to the display of information, accessing of information and so forth. Touch screen 574 may be coupled to processor 510 via a USB2 interconnect 570C.

Also seen in FIG. 5, various peripheral devices may couple to chipset 515 via a low pin count (LPC) interconnect 545. In the embodiment shown, various components can be coupled through an embedded controller 551. Such components can include a keyboard 552 (e.g., coupled via a PS2 interface). In some embodiments, a touch pad 553 may couple to chipset 515 via a USB2 interconnect 550, and also couple to EC 551 via a PS2 interface. In addition, a security processor such as a TPM 546 may also couple to chipset 515 (and embedded controller 551) via this LPC interconnect 545.

As further seen in FIG. 5, a serial input/output (SIO) module 547 may also couple to LPC interconnect 545 to provide communication of serial data. Other interconnects that can couple to chipset 515 in a given implementation can include one or more general purpose IO devices via a GPIO interconnect and one or more system management devices that can couple via a system management (SM) bus.

System 500 can communicate with external devices in a variety of manners, including wirelessly. In the embodiment shown in FIG. 5, a wireless module 561 can include one or more radios configured for a particular wireless communication protocol, are present. In the embodiment shown, these radios of module 561 can include short range wireless engines including a WLAN unit and a Bluetooth unit 552. Using the WLAN unit, Wi-Fi™ communications in accordance with a given IEEE 802.11 standard can be realized, while via the Bluetooth unit, short range communications via a Bluetooth protocol can occur. These units may communicate with chipset 515 via a PCIe™ protocol or a USB2 protocol along interconnect 560. Of course, the actual physical connection between these peripheral devices, which may be configured on one or more add-in cards, can be by way of the NGFF connectors adapted to a motherboard.

To provide for audio inputs and outputs, a CODEC 536 can be coupled to chipset 515 via an HD audio interconnect 535. As seen, CODEC 536 may provide for coding and decoding of audio information in both input and output directions. For purposes of output audio data that is decoded in CODEC 536, it can be provided as an output via speakers 537. In turn, incoming audio information may be received via a microphone array 538 that in turn may also couple to CODEC 536.

To provide for input of video data, which as described above can be still or video images, a stereo camera module 581 may be coupled via an LVDS interconnect 580 to a stereo card 566 that in turn can couple to chipset 515 via a PCIe™ interconnect 565. Of course, different manners of interconnecting a camera module can occur in different embodiments. Camera module 581 may include multiple capture devices to provide for a stereo effect and can be implemented by way of one or more cameras configured within a lid portion of the system and which may be a 2.0-8.0 MP cameras in some embodiments.

To provide for enhanced gesture and authentication operations, an eye gaze tracking module 571 may be provided. As seen, this module may couple to chipset 515 via an interconnect 570a, which in an embodiment can be a USB2 to interconnect. Eye gaze tracking module 571 may be used to track a user's eye movements that can be used for gesture input purposes to thus provide a dynamic display to the user. Information from this module may also be used for power management purposes to reduce power consumption when a user does not engage with the system.

Additional gesture information can be received via a hand sensor 573 that can couple to a microcontroller 572 that in turn couples to chipset 515 via an interconnect 570b which in an embodiment can be a USB2 interconnect. In the embodiment shown, microcontroller 572 may be an 8051-based microcontroller to receive hand information received via hand sensor 573. This gesture information may similarly be used by the system to perform various operations responsive to a user's gestures.

As further shown, one or more notification LEDs 591 may couple to microcontroller 572 via one or more GPIO interconnects 590.

To provide interconnection to various peripheral devices, multiple external USB ports 576 may be provided which can enable a user, via a physical interconnection to couple a variety of external devices such as storage devices, media devices, playback devices, capture devices and so forth to couple to chipset 515 via an interconnect 575, which in an embodiment can be a USB3 interconnect. Although shown at this high level in the embodiment of FIG. 5, understand that a system can include many other alternatives and options in other embodiments.

Figure 6:
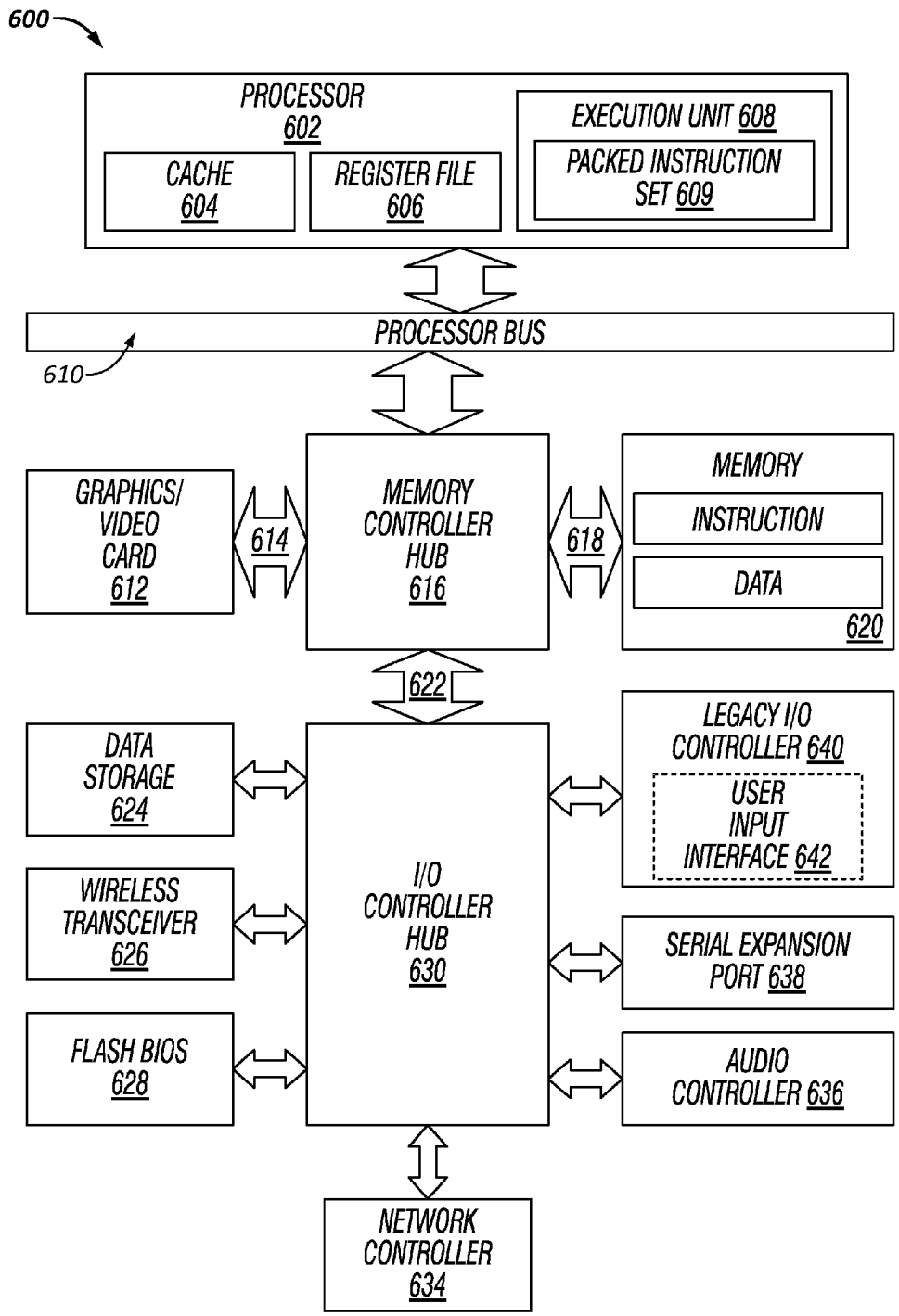
FIG. 6 illustrates another embodiment of a block diagram of components present in a computing system.

FIG. 6 is a block diagram of an exemplary computer system formed with a processor that includes execution units to execute an instruction in accordance with one embodiment of the present invention. System 600 includes a component, such as a processor 602 to employ execution units including logic to perform algorithms for process data, in accordance with the present invention, such as in the embodiment described herein. System 600 is representative of processing systems based on the Pentium® III, Pentium® 4, Intel® Xeon®, Itanium®, and/or Intel XScale® microprocessors available from Intel Corporation of Santa Clara, Calif., although other systems (including PCs having other microprocessors, engineering workstations, set-top boxes and the like) may also be used. In one embodiment, sample system 600 may execute a version of the WINDOWS® operating system available from Microsoft® Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

FIG. 6 is a block diagram of a computer system 600 formed with a processor 602 that includes one or more execution units 608 to perform an algorithm to perform at least one instruction in accordance with one embodiment of the present invention. One embodiment may be described in the context of a single processor desktop or server system, but alternative embodiments can be included in a multiprocessor system. System 600 is an example of a 'hub' system architecture. The computer system 600 includes a processor 602 to process data signals. The processor 602 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 602 is coupled to a processor bus 610 that can transmit data signals between the processor 602 and other components in the system 600. The elements of system 600 perform their conventional functions that are well known to those familiar with the art.

In one embodiment, the processor 602 includes a Level 1 (L1) internal cache memory 604. Depending on the architecture, the processor 602 can have a single internal cache or multiple levels of internal cache. Alternatively, in another embodiment, the cache memory can reside external to the processor 602. Other embodiments can also include a combination of both internal and external caches depending on the particular implementation and needs. Register file 606 can store different types of data in various registers including integer registers, floating point registers, status registers, and instruction pointer register.

Execution unit 608, including logic to perform integer and floating point operations, also resides in the processor 602. The processor 602 also includes a microcode (ucode) ROM that stores microcode for certain macroinstructions. For one embodiment, execution unit 608 includes logic to handle a packed instruction set 609. By including the packed instruction set 609 in the instruction set of a general-purpose processor 602, along with associated circuitry to execute the instructions, the operations used by many multimedia applications may be performed using packed data in a general-purpose processor 602. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 608 can also be used in micro controllers, embedded processors, graphics devices, DSPs, and other types of logic circuits. System 600 includes a memory 620. Memory 620 can be a dynamic random access memory (DRAM) device, a static random access memory (SRAM) device, flash memory device, or other memory device. Memory 620 can store instructions and/or data represented by data signals that can be executed by the processor 602.

A system logic chip 616 is coupled to the processor bus 610 and memory 620. The system logic chip 616 in the illustrated embodiment is a memory controller hub (MCH). The processor 602 can communicate to the MCH 616 via a processor bus 610. The MCH 616 provides a high bandwidth memory path 618 to memory 620 for instruction and data storage and for storage of graphics commands, data and textures. The MCH 616 is to direct data signals between the processor 602, memory 620, and other components in the system 600 and to bridge the data signals between processor bus 610, memory 620, and system I/O. In some embodiments, the system logic chip 616 can provide a graphics port for coupling to a graphics controller 612. The MCH 616 is coupled to memory 620 through a memory interface 618. The graphics card 612 is coupled to the MCH 616 through an Accelerated Graphics Port (AGP) interconnect 614.

System 600 uses a proprietary hub interface bus 622 to couple the MCH 616 to the I/O controller hub (ICH) 630. The ICH 630 provides direct connections to some I/O devices via a local I/O bus. The local I/O bus is a high-speed I/O bus for connecting peripherals to the memory 620, chipset, and processor 602. Some examples are the audio controller 636, firmware hub (flash BIOS) 628, wireless transceiver 626, data storage 624, legacy I/O controller 610 containing user input and keyboard interfaces 642, a serial expansion port 638 such as Universal Serial Bus (USB), and a network controller 634. The data storage device 624 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 7:
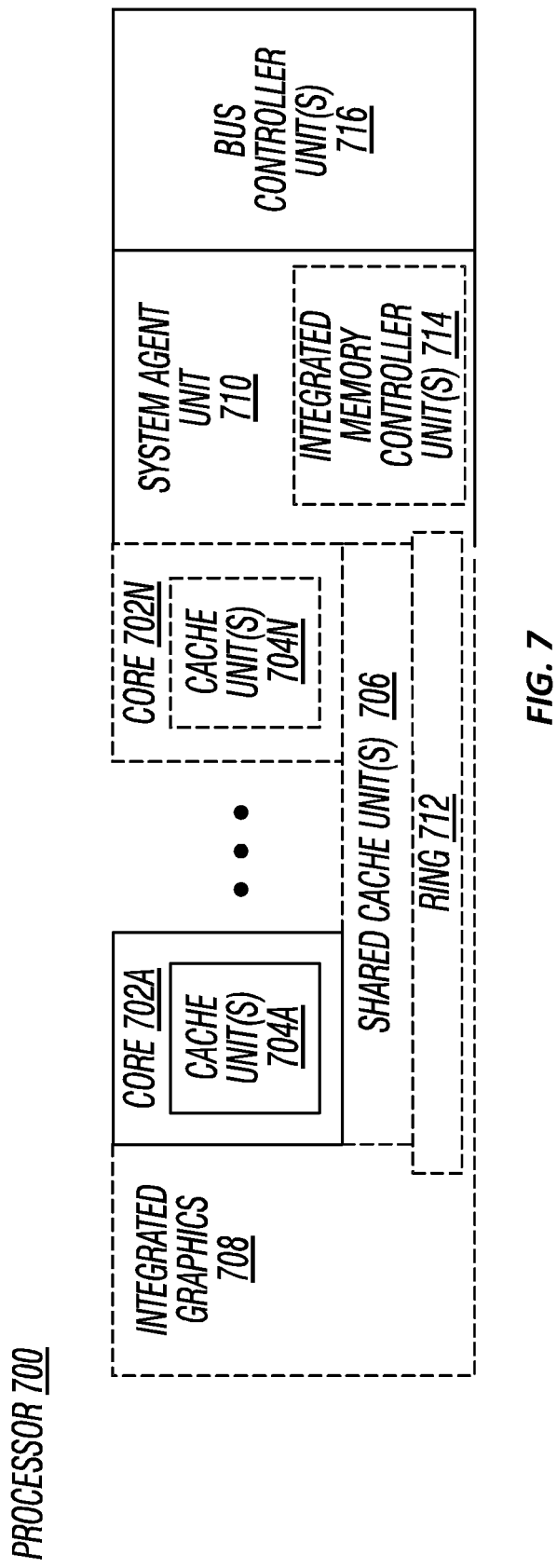
FIG. 7 illustrates another embodiment of a block diagram of components present in a computing system.

FIG. 7 is a block diagram of a single core processor and a multicore processor 700 with integrated memory controller and graphics according to embodiments of the invention. The solid lined boxes in FIG. 7 illustrate a processor 700 with a single core 702A, a system agent 710, a set of one or more bus controller units 716, while the optional addition of the dashed lined boxes illustrates an alternative processor 700 with multiple cores 702A-N, a set of one or more integrated memory controller unit(s) 714 in the system agent unit 710, and an integrated graphics logic 708.

The memory hierarchy includes one or more levels of cache units 704A-704N within the cores, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof. While in one embodiment a ring based interconnect unit 712 interconnects the integrated graphics logic 708, the set of shared cache units 706, and the system agent unit 710, alternative embodiments may use any number of well-known techniques for interconnecting such units.

In some embodiments, one or more of the cores 702A-N are capable of multi-threading.

The system agent 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture and/or instruction set. For example, some of the cores 702A-N may be in order while others are out-of-order. As another example, two or more of the cores 702A-N may be capable of execution the same instruction set, while others may be capable of executing only a subset of that instruction set or a different instruction set.

The processor may be a general-purpose processor, such as a Intel® Core™ i3, Intel® Core™ i5, Intel® Core™ i7, Intel® Core™2 Duo and Intel® Core™2 Quad, Intel® Xeon®, Itanium®, or Intel XScale® processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 700 may be a part of and/or may be implemented on one or more substrates using any of a number of process technologies, such as, for example, BiCMOS, CMOS, or NMOS.

Figure 8:
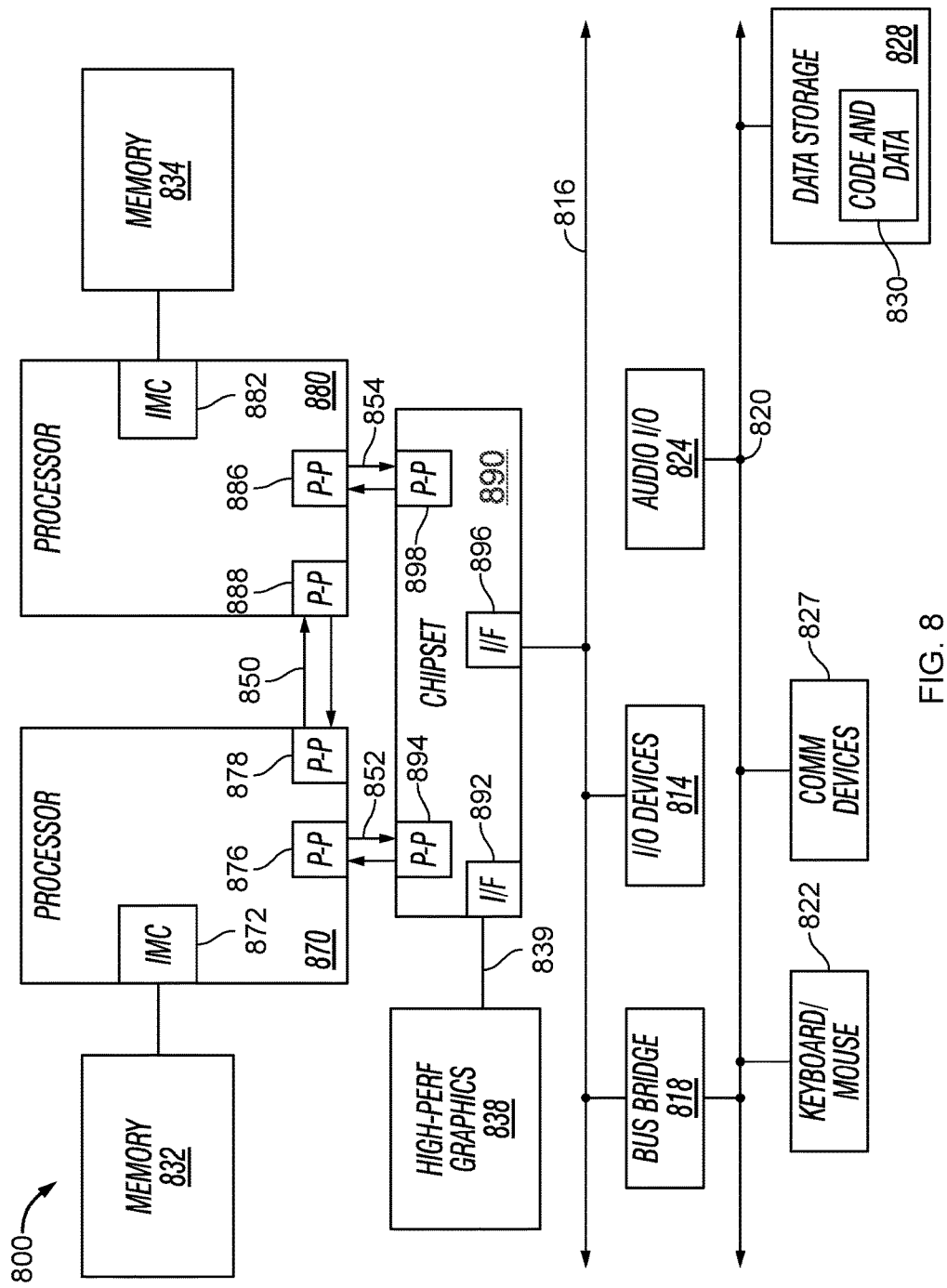
FIG. 8 illustrates another embodiment of a block diagram of components present in a computing system.

Referring now to FIG. 8, shown is a block diagram of a second system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 700.

While shown with only two processors 870, 880, it is to be understood that the scope of the present invention is not so limited. In other embodiments, one or more additional processors may be present in a given processor.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via an interface circuit 892 along a high-performance graphics interconnect 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
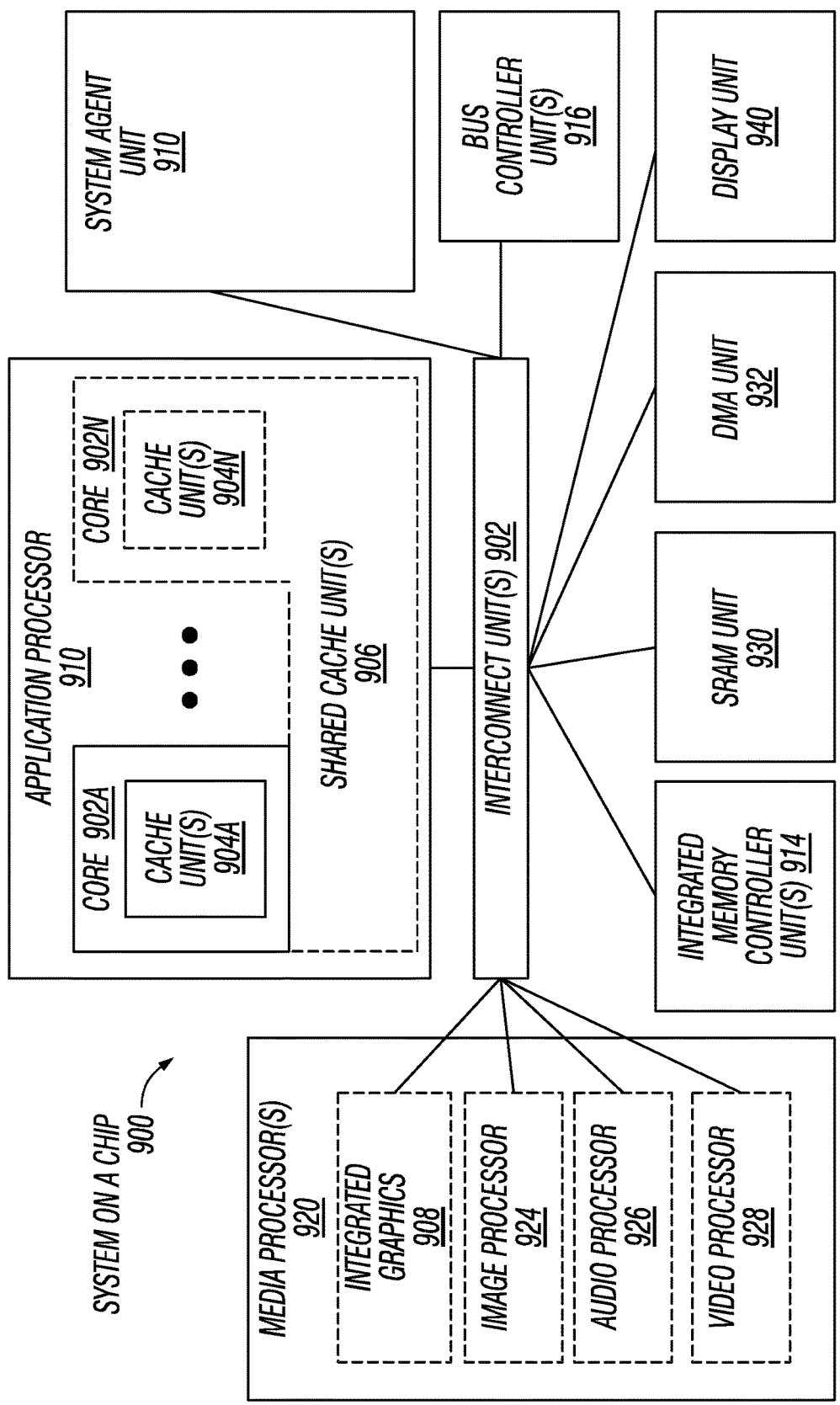
FIG. 9 illustrates another embodiment of a block diagram of components present in a computing system.

Referring now to FIG. 9, shown is a block diagram of a SoC 900 in accordance with an embodiment of the present invention. Also, dashed lined boxes are optional features on more advanced SoCs. In FIG. 9, an interconnect unit(s) 902 is coupled to: an application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments®, Qualcomm®, Apple®, or Samsung® and implemented in processors produced by these customers or licensees.

FIGS. 6-8 are exemplary systems suitable for including the processor 700, while FIG. 9 is an exemplary system on a chip (SoC) that may include one or more of the cores 702.

Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
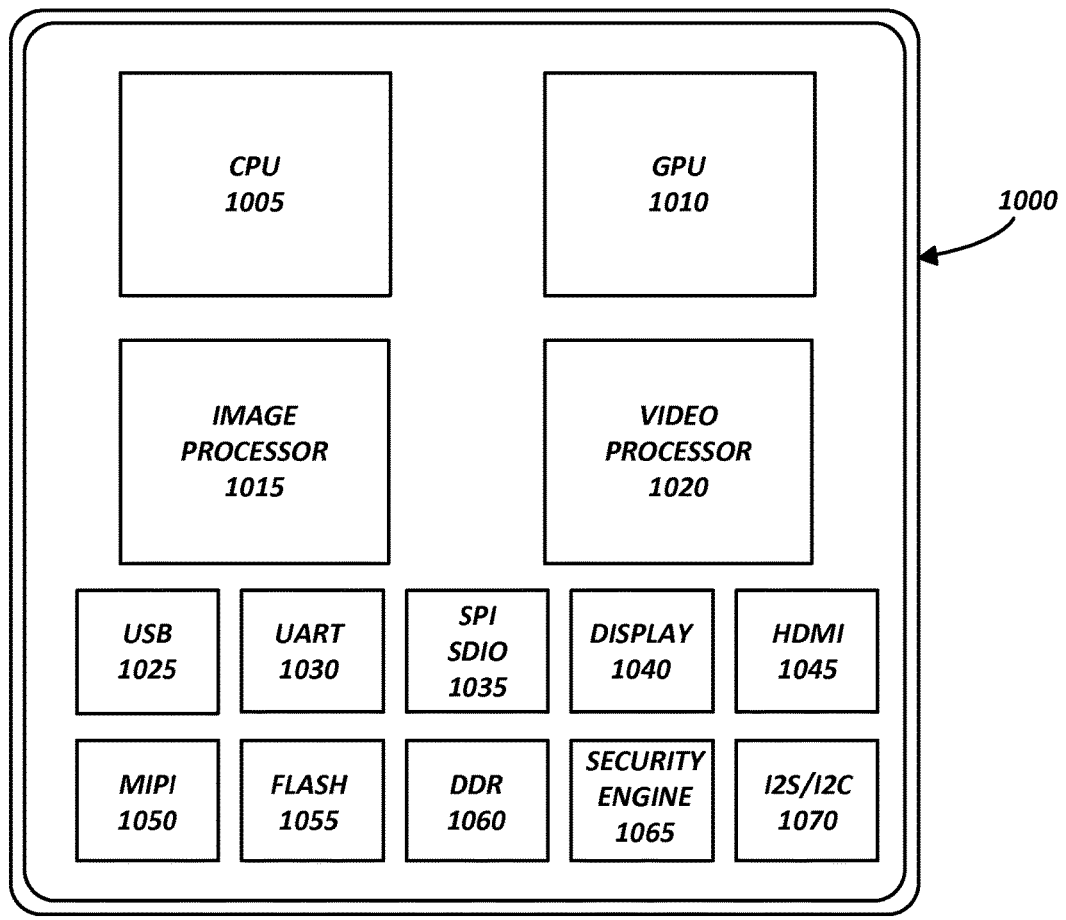
FIG. 10 illustrates another embodiment of a block diagram of components present in a computing system.

FIG. 10 illustrates a processor containing a central processing unit (CPU) and a graphics processing unit (GPU), which may perform at least one instruction according to one embodiment. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and I2S/I2C controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments®, Qualcomm®, Apple®, or Samsung® and implemented in processors produced by these customers or licensees.

Figure 11:
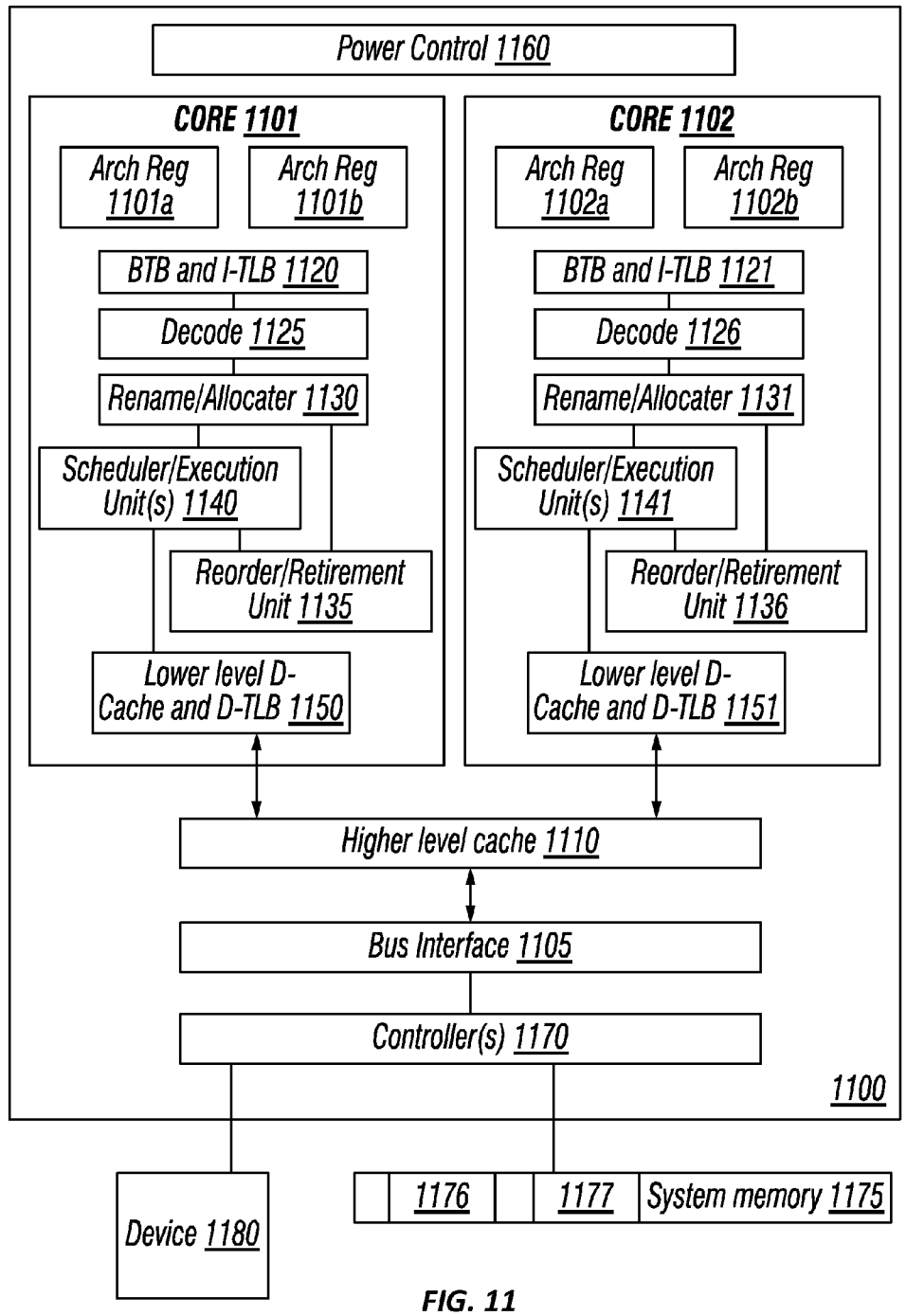
FIG. 11 illustrates another embodiment of components present in a computing system.

Referring to FIG. 11, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—core 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 11, includes two cores, core 1101 and 1102. Here, core 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native Instruction Set Architecture (ISA), a core adapted to execute a translated Instruction Set Architecture (ISA), a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 11, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, as discussed in more detail below decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further way from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or include an instruction cache. A trace cache—a type of instruction cache—instead may be coupled after decoder 1125 to store recently decoded traces.

In the depicted configuration, processor 1100 also includes bus interface module 1105. Historically, controller 1170, which is described in more detail below, has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

In one embodiment, processor 1100 is capable of executing a compiler, optimization, and/or translator code 1177 to compile, translate, and/or optimize application code 1176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 12A:
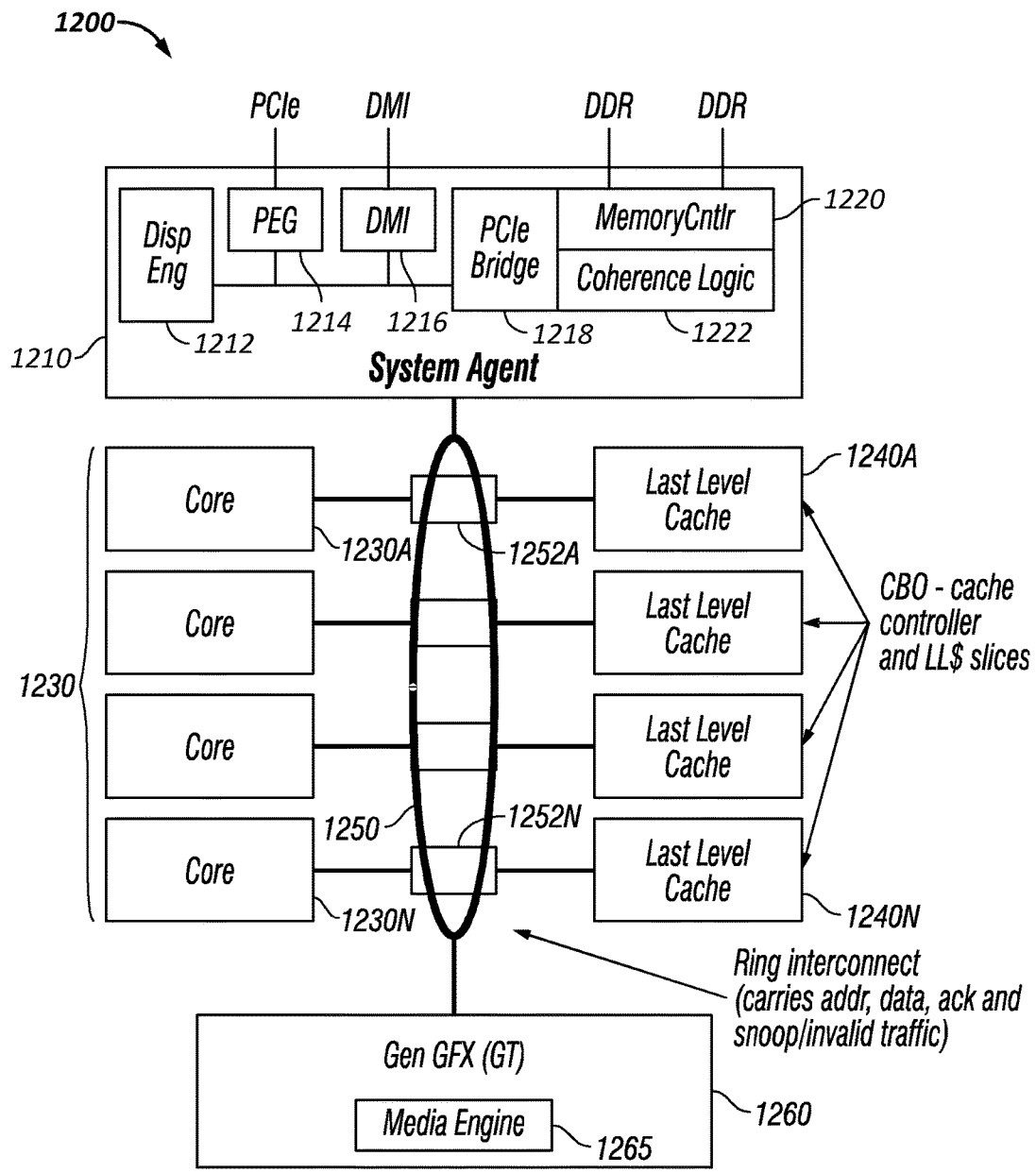
FIG. 12A illustrates an embodiment of a block diagram of a processor.

Referring now to FIG. 12A, shown is a block diagram of an embodiment of a multicore processor. As shown in the embodiment of FIG. 12A, processor 1200 includes multiple domains. Specifically, a core domain 1230 can include a plurality of cores 1230A-1230N, a graphics domain 1260 can include one or more graphics engines including a media engine 1265, and a system agent domain 1210 may further be present.

In various embodiments, system agent domain 1210 may handle power control events and power management such that individual units of domains 1230 and 1260 such as cores and/or graphics engines can be controlled to independently dynamically operate at an appropriate power mode (including a low power state or an active, and possibly turbo mode state) in light of the activity (or inactivity) occurring in the given unit. Each of domains 1230 and 1260 may operate at different voltage and/or power, and furthermore the individual units within the domains each may operate at an independent frequency and voltage. Note that while only shown with three domains, understand the scope of the present invention is not limited in this regard and additional domains can be present in other embodiments.

In general, each core 1230 may further include low level caches in addition to various execution units and additional processing elements. In turn, the various cores may be coupled to each other and to a shared cache memory formed of a plurality of units or slices of a last level cache (LLC) 1240A-1240N, which may include storage and cache controller functionality. In various embodiments, LLC 1240 may be shared amongst the cores and the graphics engine, as well as various media processing circuitry.

As seen, a ring interconnect 1250 couples the cores together, and provides interconnection between the core domain 1230, graphics domain 1260 and system agent circuitry 1210, via a plurality of ring stops 1252A-1252N, each at a coupling between a core and LLC slice. As seen in FIG. 12A, interconnect 1250 can be used to carry various information, including address information, data information, acknowledgement information, and snoop/invalid information.

As further seen, system agent domain 1210 may include display engine 1212 which may provide control of and an interface to an associated display. System agent domain 1210 can further include an integrated memory controller 1220 that can provide for an interface to a system memory, such as a DRAM (e.g., implemented with multiple DIMMs), and which may be coupled to a coherence logic 1222 to perform memory coherence operations. Multiple interfaces may be present to enable interconnection between the processor and other circuitry. For example, in one embodiment at least one direct media interface (DMI) 1216 interface may be provided as well as one or more PCIe™ interfaces 1214. As seen, the display engine and these interfaces can couple to memory via a PCIe™ bridge 1218. Still further, to provide for communications between other agents such as additional processors or other circuitry, one or more other interfaces such as in accordance with an Intel® Quick Path Interconnect (QPI) protocol may also be provided.

Figure 12B:
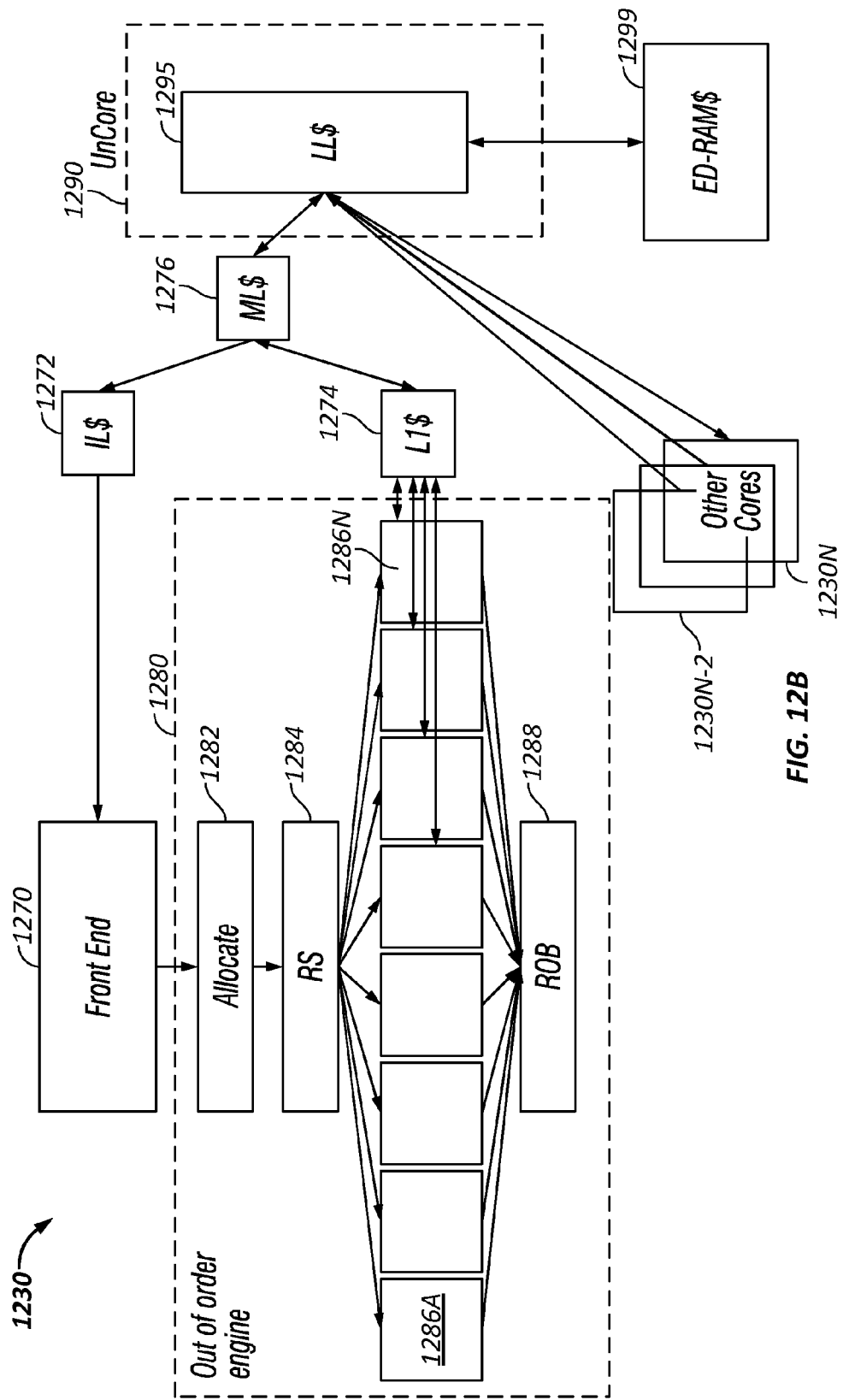
FIG. 12B illustrates an embodiment of a core of a processor.

Referring now to FIG. 12B, shown is a block diagram of a representative core such as one of cores 1230 of FIG. 12A. In general, the structure shown in FIG. 12B may be of an out-of-order processor that includes a front end unit 1270 that generally is used to fetch incoming instructions, perform various processing including decoding, and pass them along to an out-of-order engine 1280 that can perform further processing on these decoded instructions, including obtaining data to be processed, processing the data, and then reordering the processed data.

Specifically in the embodiment of FIG. 12B, out-of-order engine 1280 may include an allocate unit 1282 to receive decoded instructions, which may be in the form of one or more micro-instructions or uops, from front end unit 1270 and allocate them to appropriate resources such as registers and so forth. Next, the instructions can be provided to a reservation station 1284, which can schedule them for execution on one of a plurality of execution units 1286A-1286N. Various types of execution units may be present, including, for example, arithmetic logic units (ALUs), vector processing units (VPUs), floating point execution units, among others. Results from these different execution units can be provided to a reorder buffer (ROB) 1288 which can take these unordered results and return them to correct program order.

Still referring to FIG. 12B, note that both front end unit 1270 and out-of-order engine 1280 can be coupled to different levels of a memory hierarchy. Specifically shown is an instruction level cache 1272, that in turn can couple to a mid-level cache 1276, that in turn can couple to a last level cache 1295, which, in an embodiment can be implemented in an uncore unit 1290, that generally corresponds to system agent circuitry, such as system agent domain 1210 of FIG. 12B. In turn, last level cache 1295 can be in communication with higher levels of a memory hierarchy, including a system memory 1299 which can be implemented via ED RAM in an embodiment. Note also that the various execution units 1286 within out-of-order engine 1280 may be in communication with a first level cache 1274 that also is in communication with mid-level cache 1276. Note also that additional cores 1230N-2-1230N can couple to LLC 1295. Although shown at this high level in the embodiment of FIG. 12B, understand that various alterations and additional components may be present.

Figure 13:
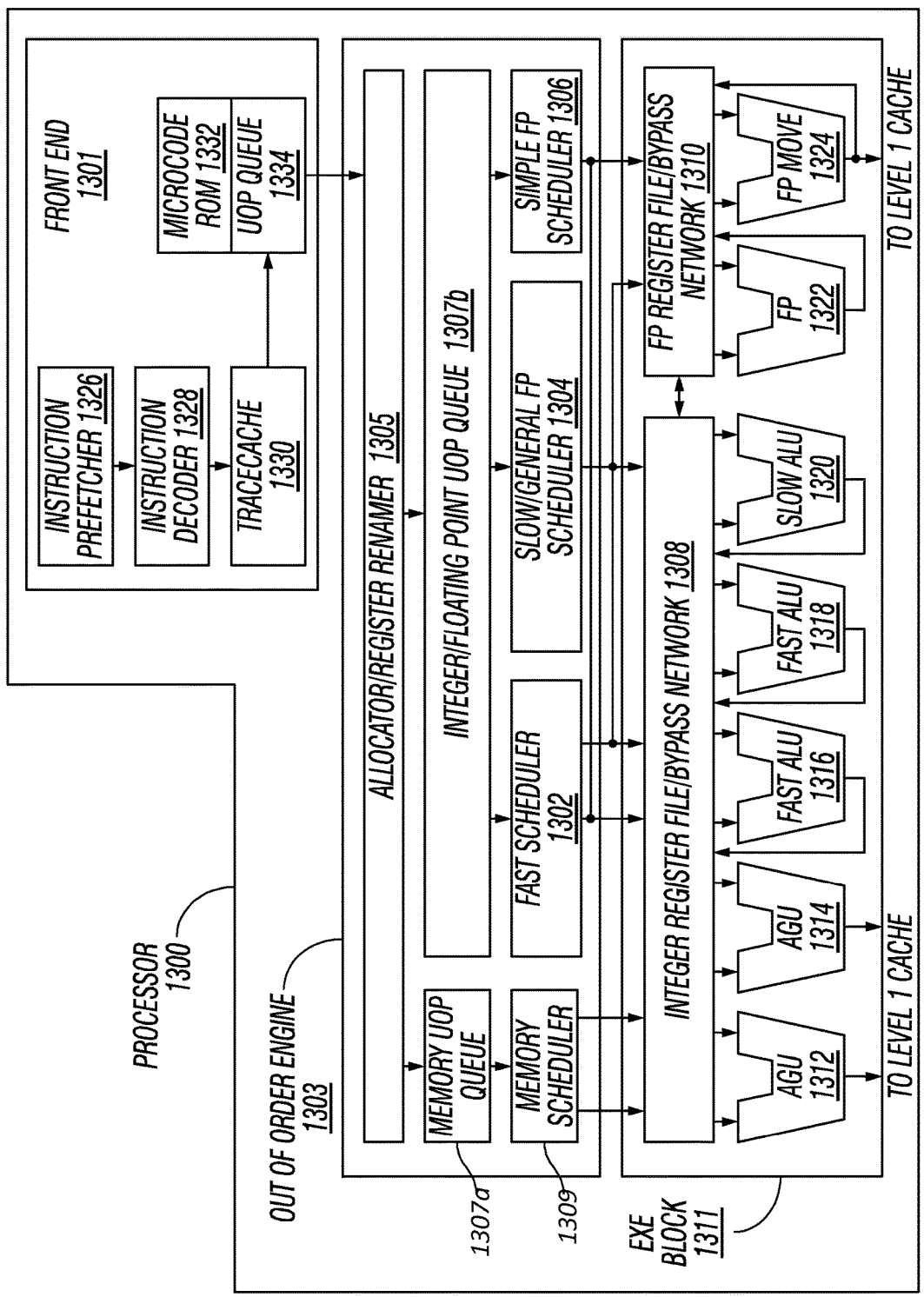
FIG. 13 illustrates another embodiment of a block diagram for a processor.

FIG. 13 is a block diagram of the micro-architecture for a processor 1300 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 1301 is the part of the processor 1300 that fetches instructions to be executed and prepares them to be used later in the processor pipeline. The front end 1301 may include several units. In one embodiment, an instruction prefetcher 1326 fetches instructions from memory and feeds them to an instruction decoder 1328 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1330 takes decoded uops and assembles them into program ordered sequences or traces in the uop queue 1334 for execution. When the trace cache 1330 encounters a complex instruction, the microcode ROM 1332 provides the uops needed to complete the operation.

Some instructions are converted into a single micro-op, whereas others need several micro-ops to complete the full operation. In one embodiment, if more than four micro-ops are needed to complete a instruction, the decoder 1328 accesses the microcode ROM 1332 to do the instruction. For one embodiment, an instruction can be decoded into a small number of micro ops for processing at the instruction decoder 1328. In another embodiment, an instruction can be stored within the microcode ROM 1332 should a number of micro-ops be needed to accomplish the operation. The trace cache 1330 refers to an entry point programmable logic array (PLA) to determine a correct micro-instruction pointer for reading the micro-code sequences to complete one or more instructions in accordance with one embodiment from the micro-code ROM 1332. After the microcode ROM 1332 finishes sequencing micro-ops for an instruction, the front end 1301 of the machine resumes fetching micro-ops from the trace cache 1330.

The out-of-order execution engine 1303 is where the instructions are prepared for execution. The out-of-order execution logic has a number of buffers to smooth out and re-order the flow of instructions to optimize performance as they go down the pipeline and get scheduled for execution. An allocator/register renamer 1305 includes allocator logic and register renaming logic. The allocator logic allocates the machine buffers and resources that each uop needs in order to execute. The register renaming logic renames logic registers onto entries in a register file. The allocator also allocates an entry for each uop in one of the two uop queues, a memory uop queue 1307a for memory operations and an integer/floating point uop queue 1307b for non-memory operations, in front of the instruction schedulers: memory scheduler 1309, fast scheduler 1302, slow/general floating point scheduler 1304, and simple floating point scheduler 1306. The uop schedulers 1302, 1304, 1306, 1309, determine when a uop is ready to execute based on the readiness of their dependent input register operand sources and the availability of the execution resources the uops need to complete their operation. The fast scheduler 1302 of one embodiment can schedule on each half of the main clock cycle while the other schedulers can only schedule once per main processor clock cycle. The schedulers arbitrate for the dispatch ports to schedule uops for execution.

Register files 1308, 1310, sit between the schedulers 1302, 1304, 1306, 1309, and the execution units 1312, 1314, 1316, 1318, 1320, 1322, 1324 in the execution block 1311. There is a separate register file 1308, 1310, for integer and floating point operations, respectively. Each register file 1308, 1310, of one embodiment also includes a bypass network that can bypass or forward just completed results that have not yet been written into the register file to new dependent uops. The integer register file 1308 and the floating point register file 1310 are also capable of communicating data with the other. For one embodiment, the integer register file 1308 is split into two separate register files, one register file for the low order 32 bits of data and a second register file for the high order 32 bits of data. The floating point register file 1310 of one embodiment has 128 bit wide entries because floating point instructions typically have operands from 64 to 128 bits in width.

The execution block 1311 contains the execution units 1312, 1314, 1316, 1318, 1320, 1322, 1324, where the instructions are actually executed. This section includes the register files 1308, 1310, that store the integer and floating point data operand values that the micro-instructions need to execute. The processor 1300 of one embodiment is comprised of a number of execution units: address generation unit (AGU) 1312, AGU 1314, fast ALU 1316, fast ALU 1318, slow ALU 1320, floating point ALU 1322, floating point move unit 1324. For one embodiment, the floating point execution blocks 1322, 1324, execute floating point, MMX, SIMD, and SSE, or other operations. The floating point ALU 1322 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 1316, 1318. The fast ALUs 1316, 1318, of one embodiment can execute fast operations with an effective latency of half a clock cycle. For one embodiment, most complex integer operations go to the slow ALU 1320 as the slow ALU 1320 includes integer execution hardware for long latency type of operations, such as a multiplier, shifts, flag logic, and branch processing. Memory load/store operations are executed by the AGUs 1312, 1314. For one embodiment, the integer ALUs 1316, 1318, 1320, are described in the context of performing integer operations on 64 bit data operands. In alternative embodiments, the ALUs 1316, 1318, 1320, can be implemented to support a variety of data bits including 16, 32, 128, 256, etc. Similarly, the floating point units 1322, 1324, can be implemented to support a range of operands having bits of various widths. For one embodiment, the floating point units 1322, 1324, can operate on 128 bits wide packed data operands in conjunction with SIMD and multimedia instructions.

In one embodiment, the uops schedulers 1302, 1304, 1306, 1309, dispatch dependent operations before the parent load has finished executing. As uops are speculatively scheduled and executed in processor 1300, the processor 1300 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 14:
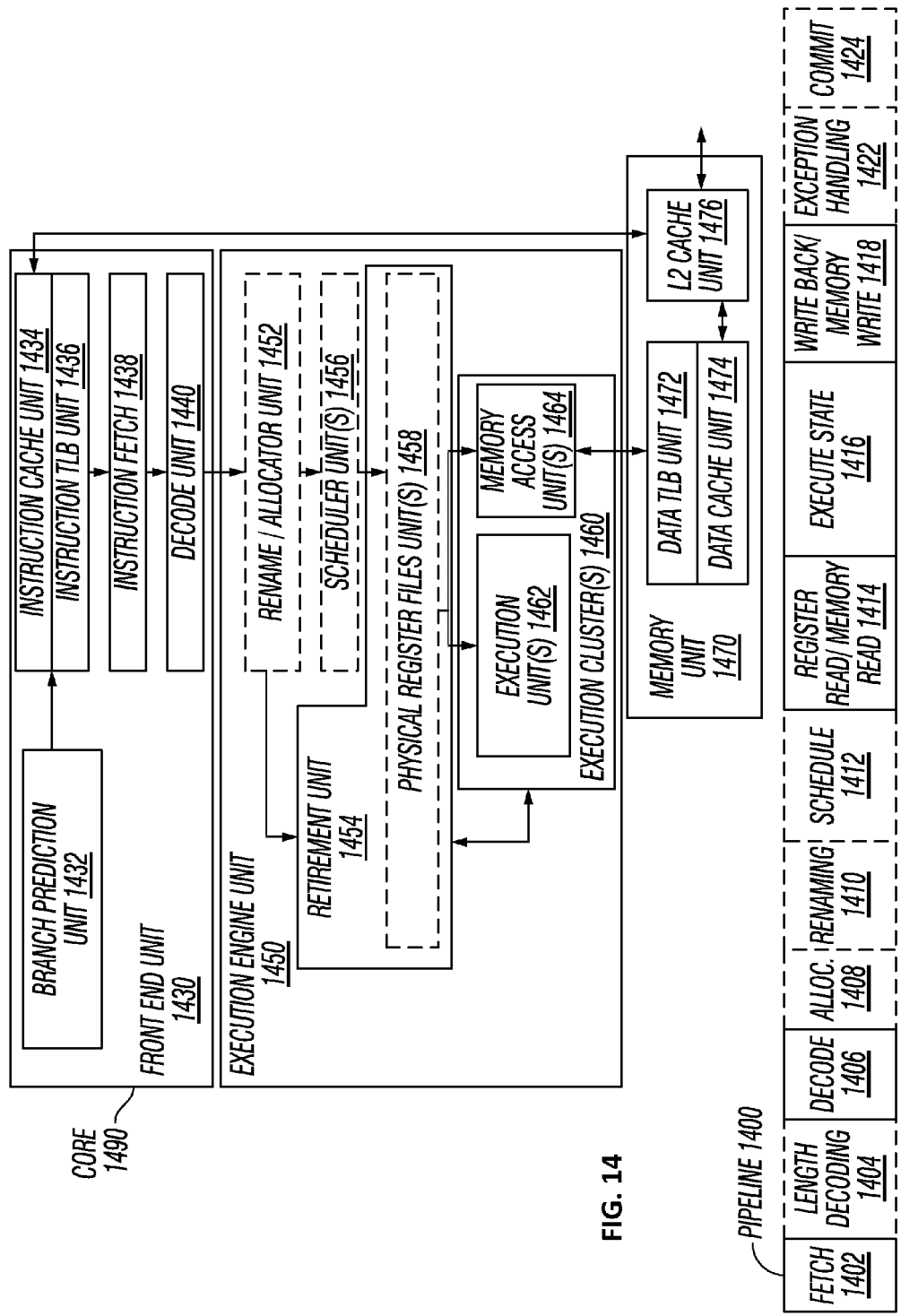
FIG. 14 illustrates another embodiment of a block diagram for a processor.

FIG. 14 is a block diagram illustrating an in-order pipeline and a register renaming stage, out-of-order issue/execution pipeline according to at least one embodiment of the invention. FIG. 14 is a block diagram illustrating an in-order architecture core and a register renaming logic, out-of-order issue/execution logic to be included in a processor according to at least one embodiment of the invention. The solid lined boxes in FIG. 14 illustrate the in-order pipeline, while the dashed lined boxes illustrate the register renaming, out-of-order issue/execution pipeline. Similarly, the solid lined boxes in FIG. 14 illustrate the in-order architecture logic, while the dashed lined boxes illustrate the register renaming logic and out-of-order issue/execution logic.

In FIG. 14, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

In FIG. 14, arrows denote a coupling between two or more units and the direction of the arrow indicates a direction of data flow between those units. FIG. 14 shows processor core 1490 including a front end unit 1430 coupled to an execution engine unit 1450, and both are coupled to a memory unit 1470.

The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 1434 is further coupled to a level 2 (L2) cache unit 1476 in the memory unit 1470. The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1458 is overlapped by the retirement unit 1454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 470. The L2 cache unit 1476 is coupled to one or more other levels of cache and eventually to a main memory.

By way of example, the exemplary register renaming, out-of-order issue/execution core architecture may implement the pipeline 400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

In an embodiment a display includes a touchscreen or other touch-sensitive display. The touch-sensitive display (or touchscreen) may include an active area and an inactive area. The active area may be an area that receives a touch input and a component of the platform responds to the touch input (such as via the display). The inactive area may be an area of the touch-sensitive display (or touchscreen) that does not respond to a touch input. In other words, even though the touch input is provided to the inactive area, the platform may not change the display or perform any other action. The platform may appear as if the touch input (to the inactive area) is not recognized by the platform.

Embodiments may also be applicable to a convertible computing device that may convert between a clamshell mode and a tablet mode. In the convertible computing device, the lid or display may be called a tablet or tablet display (that includes a touch-sensitive display). However, in the convertible computing device the tablet display (or lid) may not detach from the base.

Embodiments may control an active area (or active display area) of the touch-sensitive display (or touchscreen) based on the operational mode of the tablet or based on a user input. For example, in the clamshell mode, the touch-sensitive display (or touchscreen) may have a large active area (or large display area) as compared to when in the tablet mode in which the touch-sensitive display (or touchscreen) may have a small active area (or small display area). A size of the inactive area (or virtual bezel) of the touch-sensitive display (or touchscreen) may also change based on the changed size of the active area. This may allow a user to more easily hold the tablet while accidently touching the active area. The inactive area may be called a virtual bezel, which is a bezel area that decreases or increases in size by changing the active display area of the display.

A user may hold a tablet in their hands. As such, when using a touch enabled tablet, a large bezel area may be desired so that the user does not block the display area (or active display area) or cause inadvertent touch events while holding the tablet. However, when in the clamshell mode, the bezel may no longer be needed and it may be desirable to have as small a bezel as possible to maximize the active display area. In an electronic device that is operated in both a tablet mode and a clamshell mode (e.g., a detachable tablet or convertible laptop), a virtual bezel may provide an optimal display area depending on how the electronic device is being used.

The virtual bezel may be an adjustable color border around the outer edge of the display. By increasing or decreasing the border around the display, the display may appear to change sizes. The change in pixel size may be performed by display hardware and/or OS driver, so the OS may not be affected by the physical change in display area size.

Embodiments enable effective usage of the bezel by displaying content via dynamic real time decisions to render content in the bezel area for displays with touchscreen capability. The bezel areas where content can be rendered dynamically are referred to as virtual bezels, and systems where the bezel area is dynamically turned on or off to present content are referred as virtual bezel-based systems. Virtual bezels enable display rendering in the bezel area in addition to the primary display.

Embodiments use intelligence to determine when and how to use the bezel area for displaying content, where this intelligent enabling of the bezel for display rendering may be via a combination of criteria. Decision vectors (such as sensors, device configuration, content type, primary display activity) are used in an intelligent manner to enable/disable display areas for rendering. Each side of the bezel (left, right, top, down) may be independently controlled with respect to enabling/disabling them as well as the type of content that is rendered. Content can be rendered based on what is being displayed in the display (primary display content), around the display (environment, other devices) and user preferences. Seamless content movement and interaction between the primary display and bezel area display may be realized.

Embodiments may provide a computing device that includes a touch-sensitive display and display logic at least a portion of which is hardware. This display logic may control a size of the active area of the touch-sensitive display and a size of an inactive area of the touch-sensitive display based on a configuration of the device, content to be displayed or so forth. As described herein, the display logic may perform further operations in different embodiments.

In various embodiments, a platform may enable distributed pre-processing of human interface device (HID) data in such a manner to enable a processor of the platform such as a system on chip (SoC) or other processor to enter into and remain in a low power state. More specifically, embodiments perform distributed filtering of HID information that is received from a user when that information is present in a non-active portion of a HID. Although embodiments described herein are with regard to distributed pre-processing in the context of a touchscreen HID, understand the scope of the present invention is not limited in this regard and other implementations may be used in connection with other HIDs including touchpads or other touch input devices, mouses, other gesture input devices and so forth.

A controller associated with the HID such as a touchscreen controller may include logic to perform this distributed pre-processing to thus filter out any touch inputs received within a non-active zone. As examples described herein, these non-active zones may correspond to portions of a touchscreen that overlay non-active portions of a display such as a virtual bezel. Other examples include non-active zones that correspond to locations outside of active soft buttons or other enabled user input features.

In some implementations, instead of controlling a secondary display region to be configured at a periphery of a display and around a primary display region, multiple arbitrary-shaped windows may be provided to enable receipt of user input. For example, a movie or other video content may be displayed in a primary display region and a set of active arbitrary display regions, e.g., at the bottom of the display may be provided as movie and/or audio control buttons, e.g., next scene, previous scene, pause, stop, play, audio up/down, views, etc. In this example, while in a virtual bezel mode and running the movie in a minimal display area (e.g., a 720 pixel version), any touch within the movie image or predetermined subregions or pixels which correspond to soft buttons may be communicated to the host processor. Other touch events such as thumbs around the virtual bezel may be filtered in the touchscreen controller and not communicated.

Many displays strive for low power capabilities using various features. For example, light emitting diode (LED) displays can selectively illuminate pixels within the display while leaving other pixels off (which can be used for turning off most of the primary display but leaving a small status image visible). Similarly, electronic ink (E-ink) or bi-stable displays consume zero power while presenting a static image to the user. And displays with panel self refresh technology consume power while displaying a static image to the user, but allow the rest of the platform to enter a lower power state. These low power states are particularly effective when they are only displaying a static image, such as when reading an E-book, or a portable document format (PDF) document.

Using an embodiment, touch contact in an invalid region of a touchscreen such as around an exterior portion of a display can be filtered by the touchscreen controller. This filtering thereby avoids generation of interrupts which would keep a host processor running to analyze and discard the invalid touch data, thus preventing the processor/platform from transitioning to a low power state (or forcing exit from the low power state).

In general, the touchscreen controller is configured to analyze analog touchscreen inputs and map them into a digital representation of the human interaction with the touchscreen, and pass this information to the processor. In other implementations, the touch controller function may be integrated into the touchscreen itself, or the touchscreen and touchscreen controller may both be integrated into the display panel itself.

The distributed pre-processing of touchscreen data may reduce platform power, where the pre-processing components analyze (raw) touchscreen data or a subset of the touchscreen data, to determine relevance within this touchscreen data. In different embodiments, these pre-processing components may be embodied in hardware such as register transfer level (RTL) or microcode. The pre-processing components may be proximate to or within a touchscreen. This touchscreen may be proximate to a platform's primary (or secondary, etc.) display or an external display (or displays). For example, the distributed processing may be implemented anywhere within the datapath between the touchscreen and the processor.

Referring now to FIG. 15A, shown is a block diagram of a portion of a system in accordance with an embodiment of the present invention. As shown in FIG. 15A, system 1500 may be any type of platform that provides a capability for user input by way of touch data. As examples, platform 1500 may be a mobile low power device such as a smartphone, tablet computer, Ultrabook™ computer, or other laptop or notebook device. As seen in FIG. 15A, platform 1500 includes a processor 1510 which in an embodiment is a central processing unit (CPU). Processor 1510 may be a multicore processor and is coupled to a peripheral controller hub (PCH) 1520 via an interconnect 1515. In some embodiments, processor 1510 and PCH 1520 may be integrated in a single integrated circuit (IC) such as a SoC that in some embodiments may be implemented on a single semiconductor die. In other implementations processor 1510 and PCH 1520 may be separate integrated circuits.

Platform 1500 further includes a display 1530 which in an embodiment may be a given type of display such as a liquid crystal display (LCD), a LED display, an organic LED (OLED) display or so forth. As seen, processor 1510 provides display information to display 1530 via a video interface 1535. In the embodiment shown, display 1530 is active in a primary display region 1534, which is surrounded by an inactive or virtual bezel region 1532. Note that the terms "virtual bezel" and "secondary display region" are used interchangeably herein to refer to a region of a display panel outside of a main display region.

Overlaying display 1530 is a touchscreen 1540 that includes input circuitry such as a grid to sense touch input from a user. In some embodiments, the touchscreen controller display and the touchscreen are an integrated module. As an example, a display may be formed of a single piece of glass having the display printed on one side and the touchscreen laminated on the other side, and further including an integrated touchscreen controller. In turn, touchscreen 1540 is coupled to a touchscreen controller 1550 that includes a logic 1555 configured to perform distributed pre-processing as described herein. In an embodiment, touch controller 1550 may be implemented as a microcontroller including microcode and/or configured to execute touch firmware. To provide incoming touch data for processing in processor 1510, touch controller 1550 couples to PCH 1520 via an interconnect 1545 which may be configured as a universal serial bus (USB) interface, an inter-integrated circuit ($I^2C$) interface or a universal asynchronous receiver transmitter (UART) transmission path. While shown in FIG. 15A as being communicated by a wired interconnect, understand that communications may be by wireless or wireline communications, such as WiFi™ or Ethernet connection to a remote/external All-In-One (AIO) display with a touchscreen (for digital signage applications).

To enable processor 1510 to process valid touch data, the processor and PCH are in an active state. When in an active state, such components cannot be in a low power state, or at least the components are prevented from being placed into deeper low power states. To enable reduced power consumption using an embodiment of the present invention, touchscreen controller 1550 may perform distributed pre-processing to prevent or filter invalid touch data from being passed along to processor 1510, enabling the processor to enter into and remain in a low power state (and/or deeper low power states). Note that as described herein, invalid touch data corresponds to user touch data that is received in a region of a touchscreen for which no user input is anticipated. For example in the context of the virtual bezel described above, when a user is holding a tablet computer or other computing device around the edges such that fingers touch this virtual bezel that does not include an active display and/or does not include active soft buttons, such touch data is invalid. Similarly, when this same portion of a display or other portions include soft buttons to enable user selection, user touches outside of these active soft buttons may similarly correspond to invalid touch data. Using embodiments of the present invention all such touch data received from such inactive regions may be filtered and thus prevented from being communicated to the processor/PCH, enabling entry and maintenance in low power and/or deeper low power states.

Also note that while in FIG. 15A, only a single active display region 1534 and a single inactive display region 1532 are shown, understand that in other implementations multiple ones of both of these different areas are possible. For example, a low power display may include a first active display region to display content such as video content or a page of an E-book, while a second active region may display a control panel that is configured to receive user input to perform various functions to control information to be displayed or other operations to be performed by the system. In such cases, touchscreen controller 1550 may be configured to prevent invalid touch interrupts from outside this control panel region to be communicated to processor 1510.

In still other examples, one or more active display regions may be enabled while other portions of the display are powered down. In this way, only valid touch interrupts within these active display regions are communicated from touchscreen controller 1550 to processor 1510, while the remainder of the display is unpowered. As one such example, only a control panel may be displayed as an active display region with the remainder of the display powered down. Also, the platform may be configured within a housing such as a protective cover that includes a physical opening with a window to allow access to the control panel region to thus enable inputs while the remainder of the display (and system) are in a low power state.

Figure 15B:
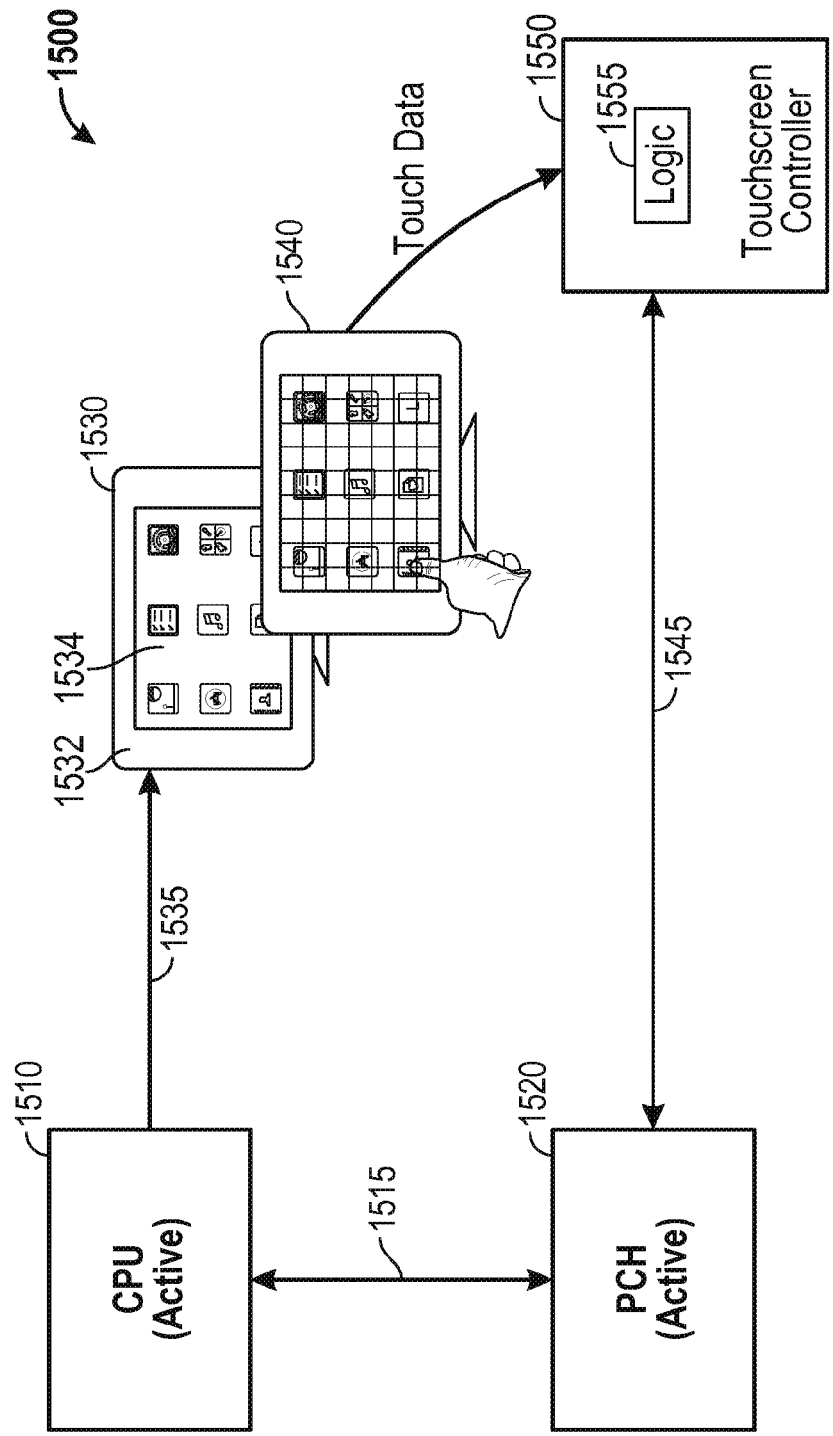
FIG. 15B is a block diagram of a portion of a system illustrating valid touch region handling in accordance with an embodiment of the present invention.

Thus the illustration in FIG. 15A shows a situation in which incoming touch data received via touchscreen 1540 is in an inactive area and is to be filtered via logic 1555 executing on touchscreen controller 1550. In contrast, FIG. 15B shows further operation when valid touch data is received for a user touch input in an active touch region. Here, after pre-processing in logic 1555, the touch data is communicated via interconnect 1545 and through PCH 1520 to processor 1510 for appropriate processing, such as passing the user input to an appropriate OS, firmware, or application executing on processor 1510. Although shown at this high level in FIGS. 15A and 15B, understand the scope of the present invention is not limited in this regard.

Figure 16:
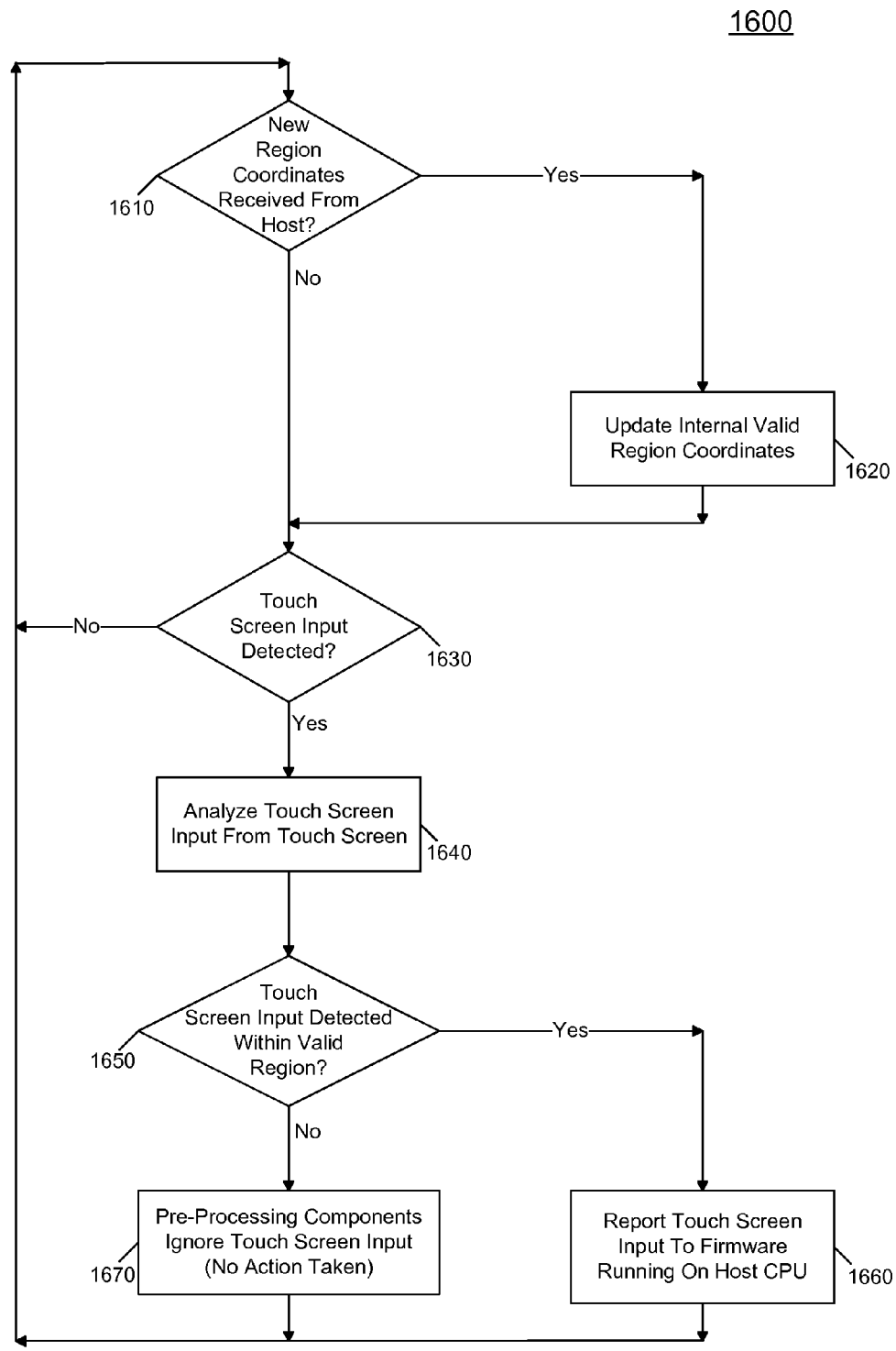
FIG. 16 is a flow diagram of a method for pre-processing touch data in accordance with an embodiment of the present invention.

Referring now to FIG. 16, shown is a flow diagram of a method for pre-processing touch data in accordance with an embodiment of the present invention. As shown in FIG. 16, method 1600 may be performed using a filter logic of a touch controller such as logic 1555 of FIG. 15A.

As seen, method 1600 begins at diamond 1610 where it is determined whether new region coordinates are received from a host. Although the scope of the present invention is not limited in this regard in an embodiment, such region coordinates may provide an indication of active and inactive touch input regions for a touchscreen and may be received from touchscreen firmware that executes on a processor of the platform. If it is determined that such inputs are received, control passes to block 1620 where valid region coordinates may be updated. More specifically, this information, which corresponds to mapping information, may be used to update coordinates stored in an appropriate memory accessible by the logic such as an internal memory of the microcontroller or a memory coupled thereto. In different embodiments, this coordinate information may be in terms of an X-Y axis system to thus identify valid touch input regions and invalid touch input regions. Note that touchscreen firmware may define multiple regions within the touchscreen that may generate valid touchscreen data, and these regions may have different sizes and shapes.

The relevance for the touchscreen input may be defined as a specific region within the touchscreen. In some embodiments there may be multiple specific regions within the touchscreen, which may have similar or different sizes and shapes. These regions may be as small as a single touchscreen pixel or as large as the entire touchscreen pixel array. In addition, the relevance for the touchscreen input can be determined by the touchscreen firmware or by higher-level firmware or software operation. This relevance may be changed dynamically by the same controlling logic. Also, relevance for the touchscreen input, passed by the touchscreen firmware to the pre-processing components, may include security/privacy policies.

Still referring to FIG. 16, control passes to diamond 1630 where it is determined whether a touch input is detected. If so, control passes to block 1640 where the touch input may be analyzed to determine whether the touch input is within a valid touch region or an invalid touch region. Pre-processing may include analysis of groups or combinations of human interactions, such as pressing combinations of buttons simultaneously. If the determination at diamond 1650 is that the touch input is from a valid touch region, control passes to block 1660 where the touch input may be reported to the host. More specifically in the embodiment of FIG. 15A, this touch data may be communicated via PCH 1520 to processor 1510 on which touch firmware executes to process this touch data to provide an indication of the location and type of user touch to an appropriate agent such as system software or an application.

In another embodiment, pre-processing components may be interrogated by touchscreen firmware, such as by reading registers. The touchscreen controller may report the touchscreen information as a HID-class device, such as a touchscreen device or as an extended-HID-class device. Similarly, the touchscreen firmware or higher-level firmware or software operation may dynamically load and unload (one or more) instantiations of HID-class devices or extended-HID-class devices to report the touchscreen information derived from a single touchscreen, such as when a user temporally progresses through a hierarchy of menus with different human interaction requirements for each menu display. Here, touchscreen regions may overlap (like Venn diagrams), so that a single touchscreen interaction may be interpreted as touchscreen information reported to multiple HID devices simultaneously.

Note that this communication at block 1660 occurs when the processor (and PCH) are in an active state. Or this communication causes these components to enter into an active state from a low power state. In contrast, when it is determined by the pre-processing performed in the touchscreen controller that the touch input is in an invalid touch region (as determined at described in 1640 and thus such input is ignored, e.g., discarded at block 1670), no communication occurs with these upstream components. Accordingly, these components may remain in a low power state or may be allowed to enter into such low power state. That is, these components may be configured to enter into a low power state when an interrupt (such as a touch data interrupt) is not received within a given time frame. Although shown at this high level in the embodiment of FIG. 16, understand the scope of the present invention is not limited in this regard.

By combining region-based reporting of touchscreen input as described herein with low power display technologies, the user will have the same visual experience at lower power (longer battery life). In general, higher-level software dynamically communicates graphical images that are to be displayed to a graphics (GFX) driver, and also communicates their respective windows or pixel regions. The GFX driver sends the video pixel data and control signals to the display panel to display the desired image. This higher-level software also dynamically communicates valid touchscreen windows that map to their respective graphical windows to touchscreen firmware, which in turn communicates this information about valid touchscreen regions to the touchscreen controller.

In the best case, power can be supplied to the display/touchscreen module for valid touch inputs to display the desired image and wait, while the platform power to the rest of the system (including CPU, PCH) can be shut down, or the rest of the system can be placed into a very low power management state.

The touch controller thus prevents invalid touch interrupts from outside touch regions in E-book example and passes valid touch interrupts from within touch regions to the host firmware. As such, the touch controller only passes valid touch interrupts to the host firmware from within the control panel touch regions, while the rest of the display is unpowered.

Thus mappings of displayed regions of pixels on the display panel with valid touch input regions on the touchscreen may be controlled by reporting this information to the GFX driver and touchscreen firmware respectively, which in turn pass this information to their respective display and touchscreen controller subsystems, along with any control signals used to power manage these devices.

Many platforms include haptic feedback to enable the user to sense localized feedback in specific regions within the touchscreen. By combining the virtual bezel's region-based reporting of touchscreen input with haptic feedback, the user may have a better experience. That is, the user will only receive haptic feedback when touching the display/touchscreen module within the valid display/touchscreen regions.

In some embodiments, a combined microcontroller/application specific integrated circuit (ASIC) can be implemented that performs both touchscreen input pre-processing (with virtual bezel invalid region masking) and haptic feedback. In this way, significantly lower power may be consumed instead of performing these functions in host firmware running on the CPU. In an embodiment, the haptic generator may be an eccentric cam controlled to move responsive to user input. This movement causes a vibration to the user as a feedback. Or the haptic generator may be implemented using an electric ring around the display to cause haptic feedback by controlling electrostatic charge around the ring. In still other embodiments, a haptic generator may be integrated into a touchscreen and controlled by the touchscreen controller.

As such, haptic feedback may be provided to the user when the user's touchscreen data is from a valid touchscreen region (and otherwise, such haptic feedback is not communicated). In some embodiments, the haptic feedback is localized to specific regions. For example when using a multi-touch touchscreen with 1+ fingers in contact with the touchscreen, a haptic response from placing another finger on the touchscreen is only provided to the newly touching finger (and not for any other already touching fingers). Note that as relevance for touchscreen input changes, so too do the regions that define whether haptic feedback is given to the user.

Figure 15C:
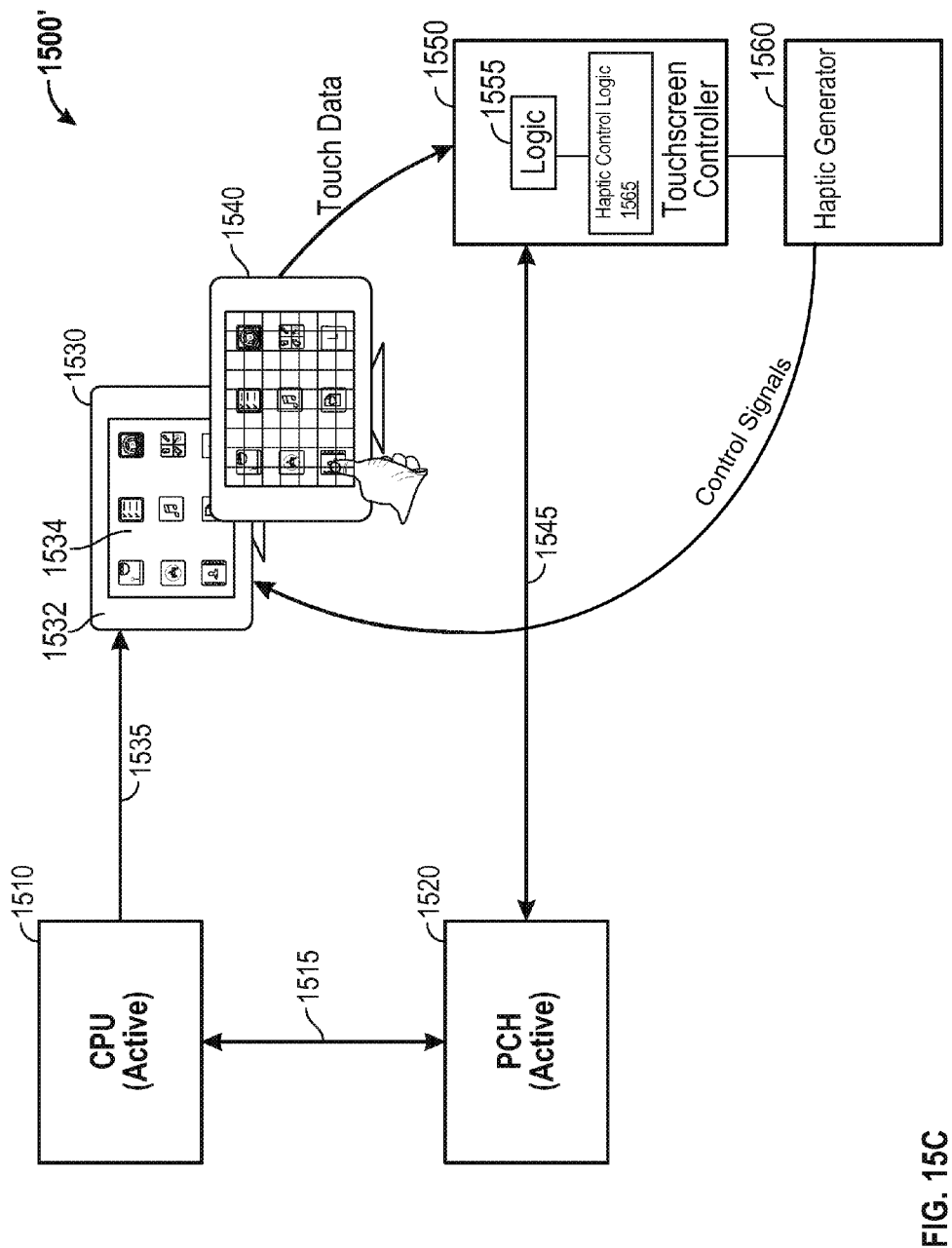
FIG. 15C is a block diagram of a haptic feedback control in accordance with another embodiment of the present invention.

Referring now to FIG. 15C, shown is a block diagram of a portion of a system in accordance with another embodiment of the present invention. As shown in FIG. 15C, system 1500' is configured substantially the same as system 1500 of FIG. 15A. However here note the presence of a haptic generator 1560. In the embodiment shown in FIG. 15C, haptic generator 1560 is implemented as an electronic field generator such as a capacitive haptic generator to provide haptic feedback to a user. Note further in this implementation that touchscreen controller 1550 further includes a haptic control logic 1565 configured to receive valid touch data processed in logic 1555 and responsive thereto to generate control signals to provide to haptic generator 1560 to cause localized haptic feedback such as the excitation of a localized region on display 1530 in the specific localized area of a user touch event, such as placement of an additional finger touch on the display.

In some embodiments, an optical scanning display may be provided in which an optical scanner is integrated into each pixel, making the screen capable of scanning user input such as finger touches, business cards and other visual information placed on its face. Soft touchscreen buttons described herein, along with the distributed pre-processing of touchscreen data, whether inside the primary display area or outside the primary display area, may be used to trigger the display to activate the optical scanners (as located inside selected pixels) and capture an image. In this way, the power consumption of the scanner is reduced as its duty cycle is so low. As different examples, such scanner can be used for security purposes, e.g., to scan fingerprints, consumer purposes such as to scan barcodes, two dimensional barcodes (QR codes), and so forth. Also, the display may further only illuminate one or more selected local touchscreen regions instead of the whole display, which lowers power even further. As such, the user input (e.g., fingerprint) is used as a security mechanism. Thus when the user's finger is located over the indicated region, a local scan of the fingerprint occurs which may include illuminating a flash for that local region.

Also by locally illuminating selected regions, the disruption to the user of flashing/illuminating the entire display instead of only illuminating the local region where the finger or QR code is placed is avoided. This is particularly the case if the illumination disrupts the viewing experience of video information running on other portions of the display. Another example usage case is using a portable computing device such as smartphone or tablet computer to authorize credit, debit or other financial transactions using fingerprint authorization via localized illumination and scan of a selected input region of the display.

Further an interrupt resulting from a user input, touch pre-processing and optical scanning control can be locally serviced within the display/touchscreen/scanner module assembly, avoiding a system level interrupt service performed by the host processor. And further, this distributed pre-processing proximate to the display module assembly is done at lower power consumption levels than waking the platform to service the interrupt with the host firmware running on the CPU.

As one such example, a touch controller registers touch input within a valid button region (corresponding to a specific navigation button), and triggers localized optical scanning of the user's thumbprint to enable fingerprint recognition to pass a security clearance. As this optical scanning is a local event co-mapped to the button's touchscreen region, there is no visual impact (e.g., brightness, blooming, flashing) on a video within the primary display region instructing the user. Touch input elsewhere within invalid regions can be masked and ignored by the touchscreen controller.

Figure 17:
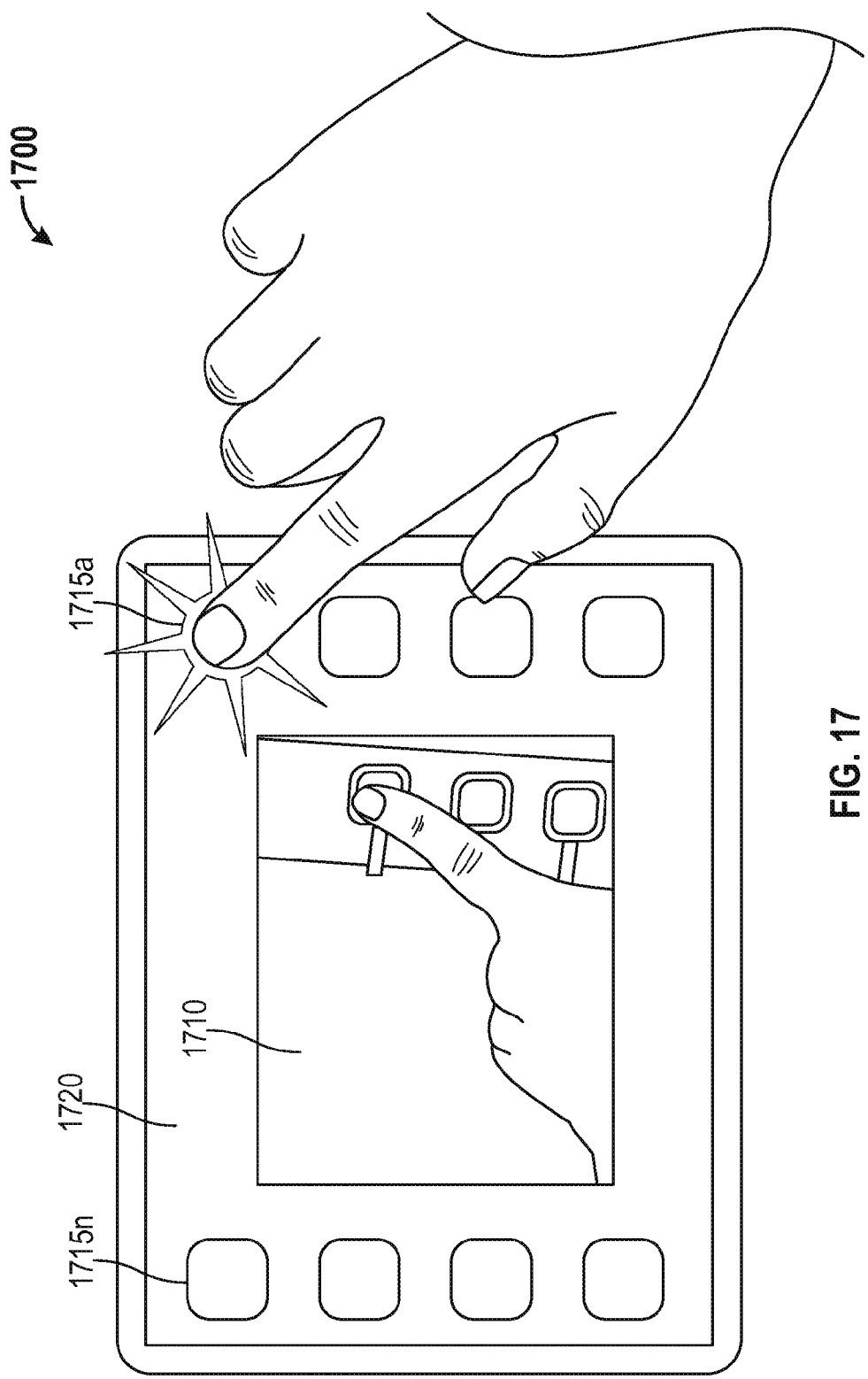
FIG. 17 is an illustration of a display that includes an active display region and a virtual bezel region that includes a plurality of soft buttons in accordance with an embodiment of the present invention.

Referring now to FIG. 17, shown is an illustration of a display 1700 that includes an active display region 1710 and a virtual bezel region 1720 that includes a plurality of soft buttons 1715 each configured to receive a user input. As further shown in FIG. 17, active display region 1710 is providing instructions for a user to enter fingerprint authorization via a first soft button 1715a. When activated responsive to the user's placement of a finger on the appropriate button, a scan is performed in which only this localized region is illuminated and an integrated scanner of display 1700 performs a localized scan of the user's fingerprint, enabling security/privacy policies to be implemented, e.g., before allowing the user to perform a secure financial or other transaction.

Thus the activation of an optical scanner of or associated with a display may be controlled to scan within a local region of the display dependent upon valid touchscreen input received from a co-mapped touchscreen region, to reduce platform power. In turn, an optical scanning imager may report the captured image from the co-mapped region to the host processor. This captured image may have associated security/privacy policies that may limit certain activities performed on the captured images, such as the storage, transmission, analysis, or public dissemination of the captured images. In some embodiments, the optical scanner may perform a scan based on analyzing groups or combinations of human interactions, such as pressing combinations of buttons simultaneously.

Embodiments may further intelligently determine when it is appropriate to render content in a secondary display region such as a bezel area. Although the scope of the present invention is not limited in this regard, dynamic real time decisions to render content in such regions may be based on one or more of the following criteria: device configuration (e.g., clamshell mode versus tablet mode); sensor information such as touch, pressure, ambient light and/or proximity sensors or combinations thereof to recognize presence of a user to determine one or more portions of a secondary display region in which to enable rendering; content type such as a video mode or gaming mode, in which a full screen display uses the secondary display region; and state of a primary display region (e.g., active, inactive or a given other such low power state).

In some embodiments, a secondary display region may include multiple independent regions (e.g., left, right, top and bottom) each of which can be independently controlled with respect to enabling and/or disabling content rendering in these regions, as well as the type of content to be rendered therein.

Embodiments thus enable content to be rendered in one or more portions of a secondary display region based on one or more criteria as above. Understand that in other embodiments additional criteria may also be considered.

Logic to intelligently determine whether to enable display rendering in a bezel or other secondary display region (and if so to determine the appropriate content for rendering) may be located in various places within a system. As one such example, display logic located within or which executes on one or more cores of a processor may make such decisions responsive to a variety of different inputs. These inputs may be received from various sensors, input devices and information from other locations of the system, including content being rendered in a primary display region.

In some embodiments, the display logic may include a registration entity to enable the logic to register events occurring on these sensors and other information including device configuration, content type and primary display region activity mode. After such registration, this registration entity of the display logic may receive indications of events from these sources. Responsive to event receipt, a decision vector may be generated and can be used by decision logic, which may be part of the display logic or located in another portion of the processor to generate decisions as to whether display rendering is to be enabled for a bezel area or other secondary display region, and if so, the appropriate content to be displayed in such locations.

In some embodiments this display logic may be implemented at least in part within an OS context as a dynamic bezel framework that operates in conjunction with a display manager that controls management of content rendering for the primary display region. In other embodiments, a software development kit (SDK) may be provided to enable applications to register with this dynamic bezel framework. For example, different applications may register with this framework to indicate requests to cause content to be rendered into secondary display regions. That is, various applications such as user-level applications can register, e.g., via an SDK or another mechanism, with a dynamic bezel framework to enable appropriate content associated with a given application to be pushed into one or more secondary display regions as appropriate during execution of the application and corresponding display of primary content of such applications within a primary display region.

Figure 18A:
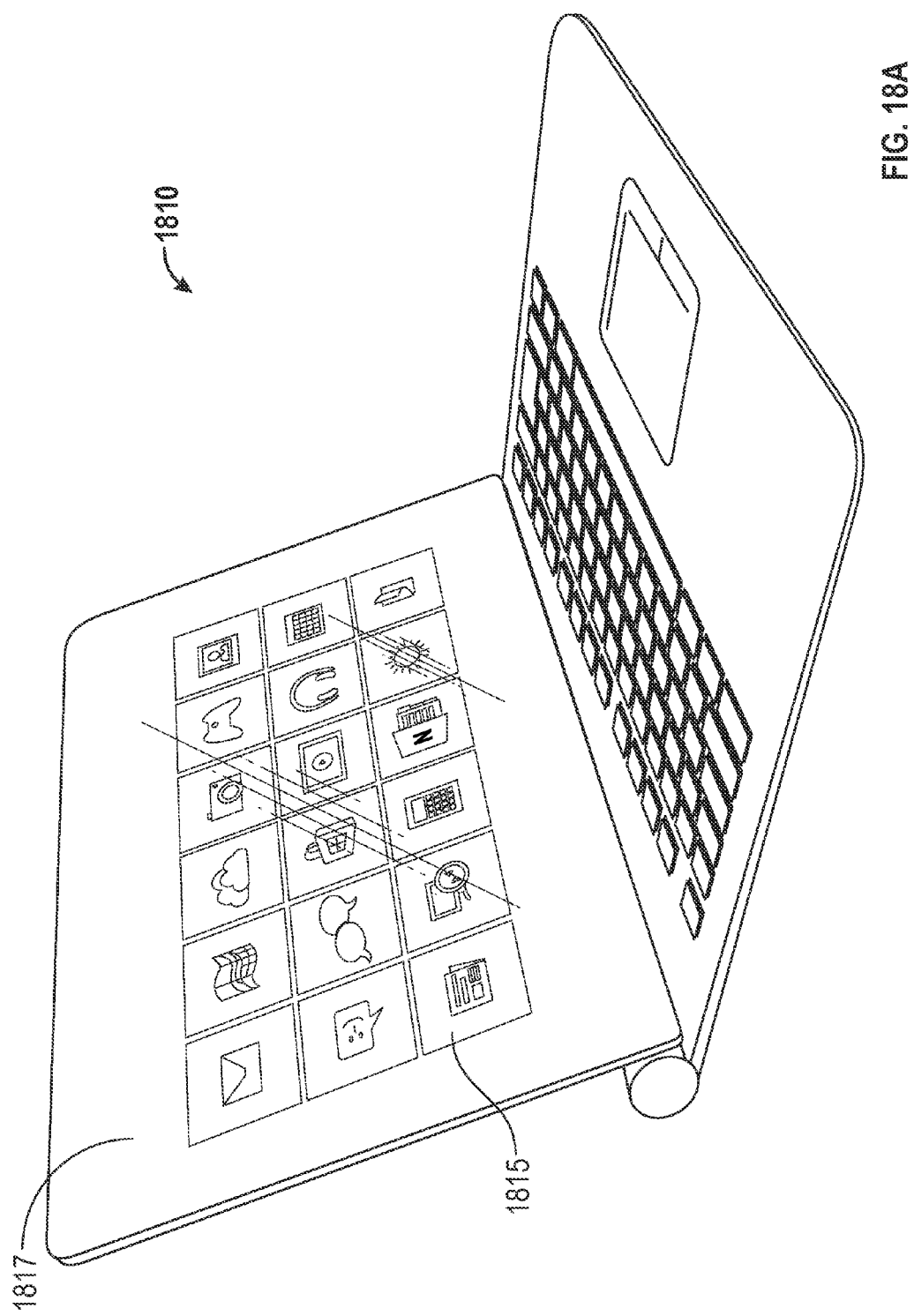

Referring now to FIG. 18A, shown are graphical illustrations of dynamic control of content rendering in different regions of a display in accordance with various embodiments. As shown in example 1810, when a clamshell-based device is used in a clamshell mode, a primary display region 1815 renders content while a secondary display region 1817 does not render content and instead acts as a bezel.

Figure 18B:
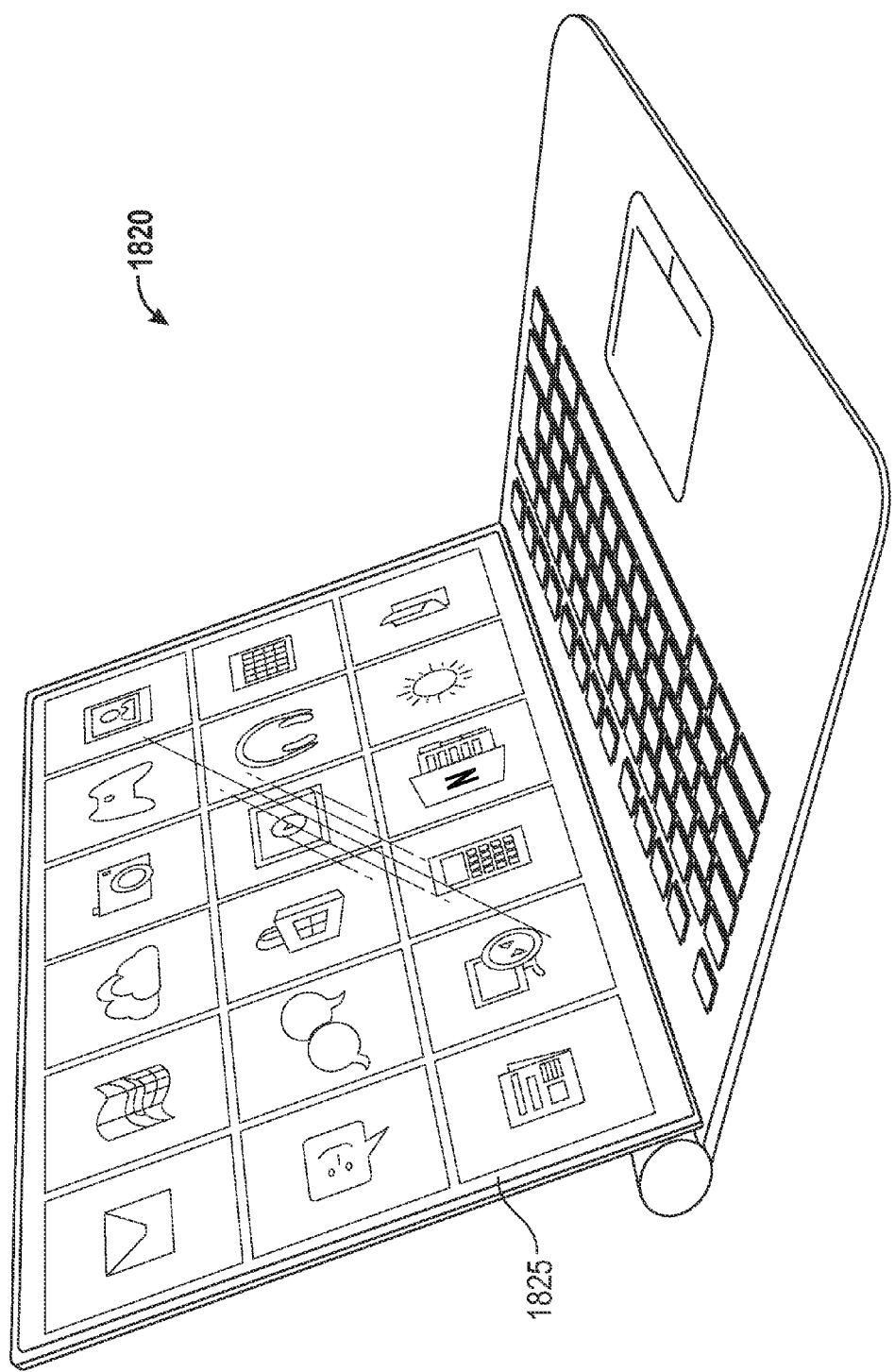

In another mode, e.g., where there is full screen video being rendered, this same display may be configured without a bezel region such that both a primary display region and a secondary display region act as a single user interface to display the full screen video as shown at display region 1825 in example 1820 of FIG. 18B.

Figure 18C:
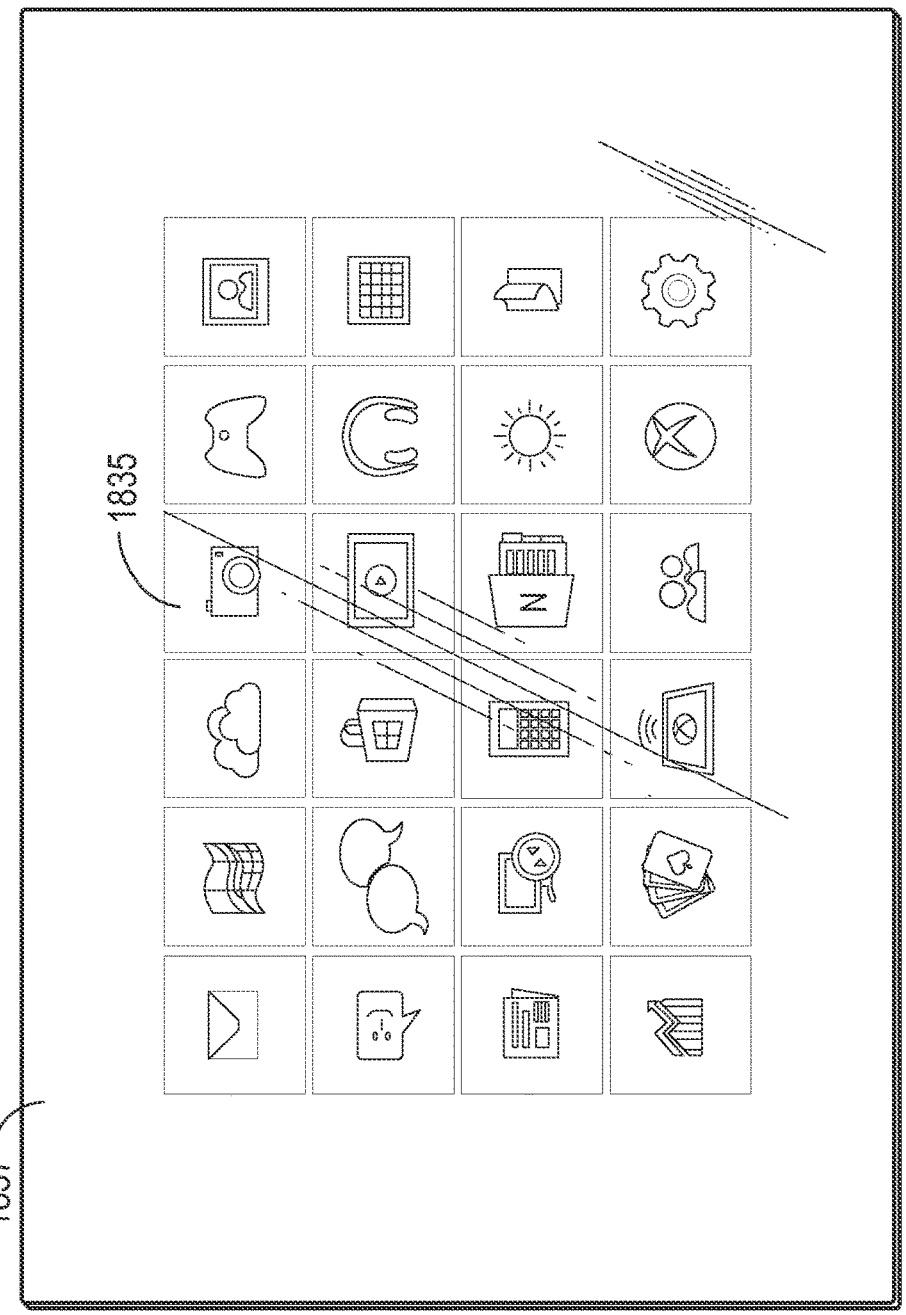

In a still further example 1830 illustrated in FIG. 18C, a secondary display region 1837 may not render content and instead act as a bezel while the primary display region 1835 displays rendered content. This example may occur when a device is used in a tablet mode with a bezel as touch sensor on the sides (recognizing user-based touch) or in a situation in which this bezel is enabled based on the device being in a tablet mode. In other embodiments, the filtering may include turning off or disabling touch sensors in the inactive region of the touchscreen. In such instances, the filtering is still performed outside of the peripheral controller, e.g., via the touch controller.

Figure 18D:
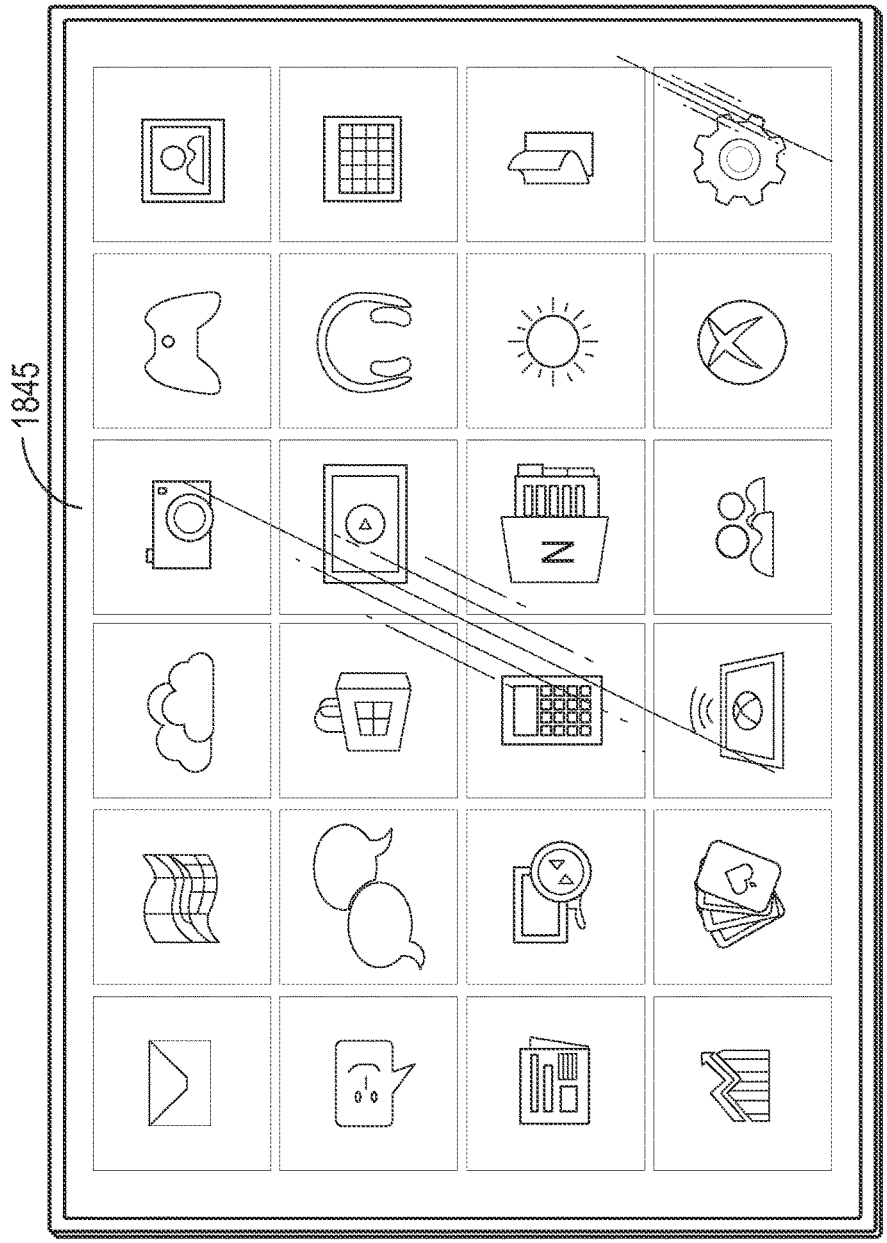

In yet another example 1840 illustrated in FIG. 18D, a tablet mode may occur without a bezel when rendered content is full screen video. Thus both a primary display region and a secondary display region are combined to present a single user interface 1845. This may be the case even where touch input is recognized on peripheral portions of the tablet.

In yet another example 1850 illustrated in FIG. 18E, only secondary display regions may be enabled while a primary display region 1855 is controlled to be in a low power mode. Thus in the illustration of example 1850, independent secondary display regions 1856-1859 may be independently controlled to render content, e.g., user selectable soft buttons to enable various user inputs.

To enable controllable secondary display region rendering based on a combination of criteria, unique frame buffers may be provided for the different display regions. In some embodiments, a dynamic bezel framework layer such as may be implemented in a display controller may register for the different decision vectors (e.g., device configuration, sensor, content type and display state) and take appropriate action to enable/disable the secondary display region for display rendering. Furthermore, in some examples more than two independent display panels may be provided via a single display. For example, a primary display region and four independent secondary display regions, each corresponding to a bezel side, may provide for independently driving content to these different regions. At the same time, with a different control, these five independent display panels may be seamlessly integrated as a single primary display region to enable full screen video or other unitary content rendering.

Embodiments may further provide the ability to access content in one or more of the secondary display regions to enable appropriate relevant content to be rendered in the primary display region for larger viewing. For example, application shortcuts in a bezel display region, when selected by user touch, may enable the corresponding application to be launched with a user interface in the primary display region. And it is possible to enable multiple independent user interfaces to be displayed within the primary display region responsive to such user selections.

Figure 19:
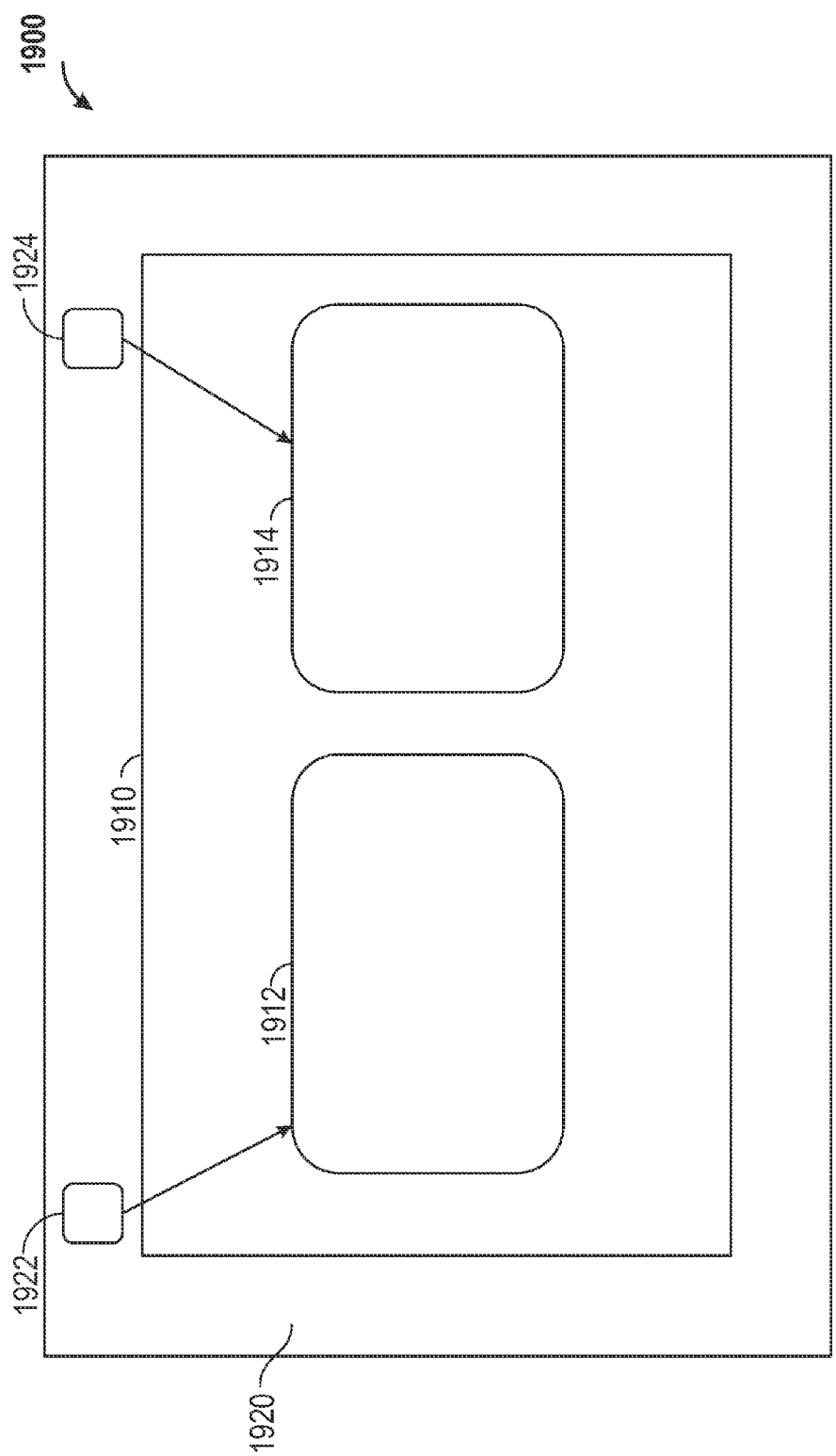
FIG. 19 is a graphical illustration of seamless interaction between a secondary display region and a primary display region in accordance with an embodiment.

Referring now to FIG. 19, shown is a graphical illustration of the seamless interaction between a secondary display region and a primary display region in accordance with an embodiment. As shown in FIG. 19, a display 1900 includes a primary display region 1910 and a secondary display region 1920, which in the embodiment shown corresponds to a bezel area region. In this secondary display region 1920 first and second application shortcut display elements 1922 and 1924, such as icons or other application identifiers, are provided. When selected by a user, e.g., via a touch, the corresponding application may be launched and a user interface for the corresponding application is displayed in at least a portion of primary display region 1920. Thus as shown in FIG. 19, a first user interface 1912 for a first application is displayed in primary display region 1920 alongside a second user interface 1914 for a second application. Of course understand that it is possible for only a single application user interface to be displayed in the primary display region, e.g., under program or other control. Thus by providing enabled application shortcuts in the bezel area display region, application launch in the primary display region may occur.

In addition, content to be rendered in a secondary display region may be based on awareness of the content displayed in a primary display region and/or awareness of device context. For example, when a browser application is executing in the primary display region, the secondary display region may display content showing browser content-based data. When a corporate email/calendar application is executing in the primary display region, the secondary display region may display personal email notifications. As another example, a dictionary application may be displayed in the secondary display region when an E-reader application executes within the primary display region. Or the secondary display region may be used to show timings, provide entertainment information, or so forth while multimedia content is displayed within the primary display region. In addition, personal settings may be used to change what content is to be displayed in a secondary display region. In some embodiments, different users may provide this display control by controllable user login.

Embodiments may further provide for display of location aware content in a secondary display region. For example, when the system is being used at an office location, an office news ticker may be displayed in the secondary display region. Instead with the system is being used at home, the secondary display region may show Facebook™ updates, television show timings and so forth. When in another environment such as a shopping environment, e.g., at a mall, the secondary display region may show deals and/or store information.

Embodiments may further provide for display of content in the secondary display region based on awareness of a proximity device. For example, when a system is in close proximity to a mobile station such as a smartphone, incoming call information to that station may be displayed in the secondary display region, e.g., during meetings or other times as controlled by a user. In similar manner, information regarding incoming short message service (SMS) messages, missed calls and so forth may also be displayed.

Embodiments further provide for display of user aware content in a secondary display region. For example, personal settings-based content may be displayed within the secondary display region. For example, a dad using a system may cause the system to be controlled to display news, stock tickers, sports information, shortcuts to office applications or so forth in the secondary display region. Instead a mom using the system may cause fashion news, recipes, book reviews among other things to be displayed in the secondary display region. And for a kid using a system, the secondary display region may be caused to show animation characters, shortcuts for games and so forth.

Embodiments further provide for display of content based on awareness of the device power state. For example, when a primary display is inactive in a low power mode, the secondary display region may be used to display notifications such as email notifications, shortcuts such as application shortcuts, or provide a backlight.

Embodiments thus provide a framework to enable various context (e.g., location, user, primary display content, device context and so forth) to be used to determine the appropriate context for how and what content to render in a secondary display region. This context data may be used to generate a content decision in a content decision logic to determine the appropriate content, which in turn can be communicated to a content engine to generate the appropriate content for rendering. Using embodiments, a device may be personalized for given users. In addition, a user may realize greater battery life as major portions of a display may be turned off while still enabling display of real time content via a secondary display region.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

The following examples pertain to further embodiments.

In one example, a system comprises a peripheral controller to interface with a touch controller and to communicate mapping information to the touch controller, where the mapping information includes identification of a primary region of a display of the system and a secondary region of the display, the touch controller coupled to the peripheral controller and including a first logic to filter touch data received from a touch device when the touch data corresponds to a user touch within the secondary region and to communicate the touch data to the peripheral controller when the touch data corresponds to the user touch within the primary region, the touch device coupled to the touch controller to receive the user touch and to communicate the touch data to the touch controller; a display logic coupled to the display to control the display to render content in the secondary region based on one or more of configuration of the system, information from one or more environmental sensors, a type of content to be rendered, and a mode of the primary region; and the display coupled to the display logic, where display content in the primary region is independent of display content in the secondary region.

In an example, the peripheral controller is to be in a low power state when the touch controller performs the touch data filtering. The peripheral controller may be in a low power state when the user touch is within the secondary region.

In an example, a processor includes at least one core and the peripheral controller. The processor is to be in a low power state when the touch controller performs the touch data filtering. The peripheral controller is to receive the mapping information from system software that executes on the at least one core.

Note that the above processor can be implemented using various means.

In an example, the processor comprises a SoC incorporated in a user equipment touch-enabled device.

In another example, a system comprises a display and a memory, and includes the processor of one or more of the above examples.

In an example, the display comprises a touchscreen including the touch device coupled to the touch controller, the peripheral controller is to wirelessly communicate the mapping information to the touch controller, where the touch controller is included in an external display.

In an example, a memory coupled to the touch controller is to store the mapping information, where the touch controller is to access the mapping information in the memory to determine whether to filter the touch data.

In an example, the peripheral controller is to communicate an identification of a control panel region of the display to the touch controller, and the touch controller is to communicate the touch data to the peripheral controller when the touch data is within the control panel region and to otherwise filter the touch data. The system may wake up from a low power state responsive to receipt of the touch data communication.

In an example, the secondary region includes at least one soft button, and the touch controller is to cause haptic feedback to be provided to the user when the touch data is received within the at least one soft button, while the peripheral controller is in a low power state. The touch controller is to enable an optical scanner within a first scan region of the touch device responsive to receipt of the touch data within the first scan region, and to cause illumination of the first scan region responsive to receipt of the touch data within the first scan region. The touch controller may further enable the optical scanner within the first scan region and the first scan region illumination while a remainder of the touch device is in a low power state.

In an embodiment, at least one sensor is to sense presence of the user and the display logic is to receive an output of the at least one sensor and to control a first size of the primary region and a second size of the secondary region based at least in part on the output. The display logic may control the first size and the second size based at least in part on content to be rendered on the display. The display logic may cause the display to display user selected content for a first user in the secondary region when the at least one sensor senses presence of the first user. The display logic is to control the secondary region to display at least one application shortcut, and responsive to user selection of the at least one application shortcut, to control at least a portion of the primary region to display a user interface of the user selected application. The display logic may cause the display to render second content in the secondary region based at least in part on first content rendered in the primary region. The display logic may cause the display to render content based on an interaction with a second system in proximity to the system. The display logic may cause the display to render call information in the secondary region when the second system receives a call, where the second system comprises a smartphone. The display logic may cause the primary region and the secondary region to display a unitary user interface when the system is in a full screen video mode. The display logic may enable the secondary region when the primary region is in a low power state. The display logic may render notification content in the secondary region when the primary region is in the low power state.

In an example, a location sensor is coupled to the display logic, where the display logic is to cause the display to render first content in the secondary region when the system is in a first location and to cause the display to render second content in the secondary region when the system is in a second location, the first and second locations detected by the location sensor.

In another example, an apparatus comprises a controller coupled to a touch input device, the controller including a filter logic to receive at least one of valid region information and invalid region information for the touch input device; store the at least one of the valid region information and the invalid region information in a storage, and receive touch data from the touch input device and filter the touch data from being communicated to a host processor coupled to the controller when the touch data is within an invalid region of the touch input device.

In an example, the filter logic is to report the touch data to the host processor when the touch data is within a valid region of the touch input device. The filter logic may access the invalid region information in the storage to determine whether the touch input device is within the invalid region. The valid region comprises at least one soft button present on a display.

In another example, a system comprises a SoC including at least one core, a peripheral controller coupled to the at least one core to control communication with at least one peripheral device coupled to the SoC, and a power controller to enable the SoC to enter into and exit from a low power state, a HID to receive input from a user; and a HID controller coupled to the HID to receive data associated with the user input and including a first logic to filter the data when the user input is within an invalid region of the HID and to communicate the data to the SoC when the user input is within a valid region of the HID, where the SoC is to remain in the low power state when the user input is within the invalid region.

In an example, a haptic generator is to provide haptic feedback to the user, where the HID controller is to cause the haptic generator to provide the haptic feedback when the user input is within the valid region of the HID. An optical scanner may scan a second user input of the user, where the HID controller is to enable the optical scanner responsive to receipt of the user input within the valid region of the HID. The HID controller may cause illumination of the valid region responsive to receipt of the user input within the valid region of the HID.

In another example, a system comprises a touchscreen to display a user interface including a valid region in which user touch information is to be processed and an invalid region in which the user touch information is to be discarded, and a touchscreen controller coupled to the touchscreen to receive the user touch information and including a logic to discard the user touch information received from the touchscreen when the user touch information is within the invalid region and to communicate the user touch information received from the touchscreen when the user touch information is within the valid region.

The system may further include a peripheral controller coupled to the touchscreen controller to receive the communicated user touch information from the touchscreen controller and a processor coupled to the peripheral controller to receive the communicated user touch information from the peripheral controller and to process the communicated user touch information to determine an action requested by the user, where the processor is to remain in a low power state when the user touch information is discarded by the touchscreen controller.

In another example, a system comprises a touchscreen to display a first user interface in a primary region and to display a second user interface or no user interface in a secondary region, and a touchscreen controller coupled to the touchscreen and including a first logic to filter touch data received from the touchscreen when the touch data corresponds to a user touch within the secondary region and to communicate the touch data to a peripheral controller coupled to the touchscreen controller when the touch data corresponds to the user touch within the primary region.

The system may further include a plurality of sensors each to sense an environmental parameter and to generate environmental information regarding an environment in which the system is operating, a sensor controller coupled to the plurality of sensors to receive the environmental information, where the peripheral controller is coupled to sensor controller and the touchscreen controller to receive the touch data from the touchscreen controller when the touch data corresponds to the user touch within the primary region, and a processor coupled to the peripheral controller to receive the touch data from the peripheral controller and to process the touch data to determine an action requested by the user, where the processor is to remain in a low power state when the touch data is filtered by the first logic.

In a yet further example, a system includes a touchscreen to display a first user interface in a primary region in which a user touch is to be processed and to display no user interface in a secondary region in which the user touch is to be ignored, a touchscreen controller coupled to the touchscreen and including a first logic to receive and store mapping information including identification of the primary region and the secondary region, to filter touch data received from the touchscreen when the touch data corresponds to the user touch within the secondary region based at least in part on the mapping information, and to communicate the touch data to a peripheral controller of a SoC coupled to the touchscreen controller when the touch data corresponds to the user touch within the primary region based at least in part on the mapping information.

The system may further include an ambient light sensor to detect a level of ambient light in an environment in which the system is operating, a sensor controller coupled to the ambient light sensor and to receive the detected level of ambient light, where the SoC is coupled to the sensor controller and the touchscreen controller.

In an example, the SoC comprises a plurality of cores, the peripheral controller coupled to the plurality of cores to control communication with a plurality of peripheral devices coupled to the SoC including the sensor controller and the touchscreen controller, where the peripheral controller is to receive the detected level of ambient light from the sensor controller and to communicate the detected level of ambient light to the touchscreen controller to enable the touchscreen controller to control an operating parameter of the touchscreen based thereon, the peripheral controller further to communicate the mapping information to the touchscreen controller and to receive the touch data from the touchscreen controller when the touch data corresponds to the user touch within the primary region.

The SoC may further include a power controller to enable the SoC to enter into and exit from a low power state, where the power controller is to enable the SoC to remain in the low power state when the touch data corresponding to the user touch within the secondary region is filtered in the first logic of the touchscreen controller and to cause the SoC to exit the low power state when the touch data is communicated corresponding to the user touch within the primary region.

The system may further include a PMIC coupled to the SoC to control power consumption of the system.

In another example, at least one storage medium includes instructions that when executed cause a system to receive, in a display logic, a registration message from a first application to indicate applicability of the first application for dynamic content rendering in a secondary display region of a display of the system during execution of the first application, the secondary display region separate from a primary display region in which a user interface of the first application is to be rendered; include information regarding the first application on a secondary display region list; during execution of the first application, receive a request to display content in the secondary display region, and cause the display to render the content in the secondary display region while the user interface is rendered in the first display region, the content independent of the user interface, where the content in the second display region is selected using first application information in the secondary display region list.

In yet another example, a system includes a touch device to receive a user touch input to generate touch data corresponding to the user touch input; a touch controller coupled to the touch device, where the touch controller is to receive mapping information to identify a primary region of a display and a secondary region of the display and where the touch controller includes a first logic to communicate the touch data to a peripheral controller when the touch data corresponds to touch input within the primary region and to filter the touch data received from the touch device when the touch data corresponds to touch input within the secondary region.

In an example, the touch controller is to perform at least one of: receive the mapping information from the peripheral controller and filter the touch data when the peripheral controller is in a low power state.

In an example, system software to execute on at least one core is to provide the mapping information to the peripheral controller.

In an example, a display may include a control panel region, where the touch controller is to communicate the touch data to the peripheral controller when the touch data corresponds to a user touch within the control panel region, whether or not the control panel region is located within the primary region or the secondary region. The touch controller may receive an identification of the control panel region from the peripheral controller. The system may exit a low power state when the touch controller sends the touch data to the peripheral controller, and the system may remain in a low power state when the touch controller filters the touch data.

In an example, an optical scanner is included within a first scan region of the touch device, where the touch controller is to enable the optical scanner when a user touches the first scan region and the touch controller is to cause the first scan region to be illuminated when the user touches the first scan region. The touch controller may enable the optical scanner and cause the first scan region to become illuminated while one or more of the peripheral controller, a processor, or a memory of the touch device is in a low power state.

In another example, a system comprises a HID to receive input from a user and a HID controller coupled to the HID to receive data associated with the user input and including a first logic to filter the data when the user input is within an invalid region of the HID and to communicate the data to a SoC when the user input is within a valid region of the HID.

In another example, a method comprises receiving, in a touch controller of a system, valid region information for a touch input device of the system to indicate a valid region in which a user touch is to be processed and invalid region information for the touch input device to indicate an invalid region in which the user touch is to be ignored, storing the valid region information and the invalid region information in a storage coupled to the touch controller, receiving, in the touch controller, first touch data from the touch input device, the first touch data corresponding to a user touch in the invalid region, determining that the user touch is in the invalid region based at least in part on the invalid region information, and filtering the first touch data from being communicated to a host processor coupled to the touch controller, and receiving, in the touch controller, second touch data from the touch input device, the second touch data corresponding to a user touch in the valid region, determining that the user touch is in the valid region based at least in part on the valid region information, and communicating the second touch data to the host processor.

In another example, a method comprises receiving a request to display a first user interface on a touchscreen of a system, instructing the touchscreen to display the first user interface, communicating, to a touch controller of the system, valid region information for a touch input device of the system to indicate a valid region in which a user touch is to be processed, and invalid region information for the touch input device to indicate an invalid region in which the user touch is to be ignored, determining, upon receipt of first touch data from the touch input device corresponding to a user touch in the invalid region, that a user touch is in the invalid region, based at least in part on the invalid region information, and filtering the first touch data from being communicated to a host processor coupled to the touch controller, to enable the host processor to remain in a low power state.

In another example, a computer readable medium including instructions is to perform the methods of any of the above examples.

In another example, an apparatus comprises means for performing the methods of any one of the above examples.

Understand that various combinations of the above examples are possible.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™ technology, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to' and or 'operable to', in one embodiment, refers to some apparatus, logic, hardware, and/or element designed in such a way to enable use of the apparatus, logic, hardware, and/or element to utilize the function without having to modify the apparatus, logic, hardware, and/or element. Note as above that use of capable to or operable to, in one embodiment, refers to the latent state of an apparatus, logic, hardware, and/or element, where the apparatus, logic, hardware, and/or element is not operating but is designed in such a manner to enable use of the function without modification.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
   a host processor including at least one core and a peripheral controller, wherein the peripheral controller is coupled to the host processor,
   wherein the peripheral controller is further configured to interface with a touch controller and to receive mapping information from the host processor and to communicate the mapping information to the touch controller,
   wherein the mapping information comprises coordinate information to identify a primary region of a display of the system including an active touch input region and a secondary region of the display including an inactive touch input region;
   a memory, coupled to the touch controller, configured to store the mapping information, wherein the touch controller is coupled to the peripheral controller, wherein the touch controller includes a first logic to use the mapping information in the memory to filter touch data received from a touchscreen from being communicated to the peripheral controller when the touch data corresponds to a user touch within the secondary region and to communicate the touch data to the peripheral controller and when the touch data corresponds to the user touch within the primary region, the first logic is further configured to communicate the touch data to the peripheral controller when the touch data is within a control panel region of the display and to otherwise filter the touch data, wherein the touch data is separate from the mapping information, wherein the host processor is to be in a low power state when the touch controller performs the touch data filtering, and wherein the host processor is inactive in the low power state, wherein the touchscreen, coupled to the touch controller, is configured to receive the user touch and to communicate the touch data to the touch controller; and
   a display logic, coupled to the processor, and the display, configured to control the display to display content in the secondary region based on one or more of configuration of the system, information from one or more environmental sensors, a type of content to be displayed, and a mode of the primary region wherein a content in the primary region is independent of the content in the secondary region.

2. The system of claim 1, wherein the peripheral controller is to be in a low power state when the touch controller performs the touch data filtering, wherein the peripheral controller is inactive in the low power state.

3. The system of claim 1, wherein the peripheral controller is to be in a low power state when the user touch is within the secondary region, wherein the peripheral controller is inactive in the low power state.

4. The system of claim 1, wherein the peripheral controller is configured to receive the mapping information from system software that executes on the at least one core.

5. The system of claim 1, wherein the peripheral controller is configured to communicate an identification of the control panel region of the display to the touch controller, and the system is to wake up from the low power state responsive to receipt of the touch data.

6. The system of claim 1, wherein the secondary region includes at least one soft button, and the touch controller is to cause haptic feedback to be provided to the user when the touch data is received within the at least one soft button, while the peripheral controller is in a low power state.

7. The system of claim 1, wherein the touch controller is to enable an optical scanner within a first scan region of the touchscreen responsive to receipt of the touch data within the first scan region, to cause illumination of the first scan region responsive to receipt of the touch data within the first scan region, and to enable the optical scanner within the first scan region and the first scan region illumination while a remainder of the touchscreen is in a low power state.

8. The system of claim 1, further comprising:
   at least one sensor to sense presence of the user; and
   the display logic to receive an output of the at least one sensor and to control a first size of the primary region and a second size of the secondary region based at least in part on the output.

9. The system of claim 8, wherein the display logic is to cause the display to display user selected content for a first user in the secondary region when the at least one sensor senses presence of the first user.

10. The system of claim 1, wherein the display logic is to control the secondary region to display at least one application shortcut, and responsive to user selection of the at least one application shortcut, to control at least a portion of the primary region to display a user interface of the user selected application.

11. The system of claim 1, wherein the display logic is to cause the display to render content based on an interaction with a second system in proximity to the system, including to cause the display to render call information in the secondary region when the second system receives a call, the second system comprising a smartphone.

12. The system of claim 1, wherein the display logic is to enable the secondary region when the primary region is in a low power state, and to render notification content in the secondary region when the primary region is in the low power state.

13. The system of claim 1, further comprising a location sensor coupled to the display logic, wherein the display logic is to cause the display to render first content in the secondary region when the system is in a first location and to cause the display to render second content in the secondary region when the system is in a second location, the first and second locations detected by the location sensor.

14. A system comprising:
a touchscreen configured to display a user interface including a valid region where user touch information is to be processed and an invalid region where the user touch information is to be discarded;
a touchscreen controller, coupled to the touchscreen, configured to receive the user touch information from the touchscreen, wherein the touchscreen controller includes a logic to discard the user touch information received from the touchscreen when the user touch information is within the invalid region and to communicate the user touch information received from the touchscreen when the user touch information is within the valid region, the logic is further configured to communicate the user touch information when the user touch information is within a control panel region of the touchscreen and to otherwise filter the user touch information;
a peripheral controller, coupled to the touchscreen controller, configured to receive the communicated user touch information from the touchscreen controller; and
a processor, coupled to the peripheral controller, configured to receive the communicated user touch information from the peripheral controller and to process the communicated user touch information to determine an action requested by the user, wherein the processor is to remain in a low power state where the processor is inactive when the user touch information is discarded by the touchscreen controller, and wherein the processor comprises the peripheral controller and at least one core.

15. A system comprising:
a touchscreen configured to display a first user interface in a primary region and to display a second user interface or no user interface in a secondary region;
a touchscreen controller coupled to the touchscreen, wherein the touchscreen controller includes a first logic to filter touch data received from the touchscreen when the touch data corresponds to a user touch within the secondary region and to communicate the touch data to a peripheral controller coupled to the touchscreen controller when the touch data corresponds to the user touch within the primary region, the first logic is further configured to communicate the touch data when the touch data is within a control panel region of the touchscreen and to otherwise filter the touch data, wherein the touchscreen controller is further configured to receive and store mapping information from a processor, the mapping information including coordinate information to identify the primary region and the secondary region;
a plurality of sensors configured to sense an environmental parameter and to generate environmental information where the system operates;
a sensor controller, coupled to the plurality of sensors, configured to receive the environmental information;
wherein the peripheral controller is configured to receive the touch data communicated from the touchscreen controller when the touch data corresponds to the user touch within the primary region, and wherein the peripheral controller does not receive the filtered touch data; and
the processor, coupled to the peripheral controller, configured to receive the touch data from the peripheral controller and to process the touch data to determine an action requested by the user, wherein the processor is to remain in a low power state when the touch data is filtered by the first logic, the processor comprises the peripheral controller and at least one core.

* * * * *